US009441979B2

(12) United States Patent
Barnard et al.

(10) Patent No.: US 9,441,979 B2
(45) Date of Patent: Sep. 13, 2016

(54) INTERACTIVE APPLICATIONS USING DATA FROM LIGHT SENSORY NETWORKS

(71) Applicant: Sensity Systems Inc., Sunnyvale, CA (US)

(72) Inventors: Chris Barnard, Sunnyvale, CA (US); Kent W. Ryhorchuk, Sunnyvale, CA (US)

(73) Assignee: Sensity Systems Inc., Sunnyvale, CA (US)

(*) Notice: Subject to any disclaimer, the term of this patent is extended or adjusted under 35 U.S.C. 154(b) by 0 days.

(21) Appl. No.: 14/743,743

(22) Filed: Jun. 18, 2015

(65) Prior Publication Data

US 2015/0369618 A1 Dec. 24, 2015

Related U.S. Application Data

(60) Provisional application No. 62/013,571, filed on Jun. 18, 2014.

(51) Int. Cl.

| | |
|---|---|
| *G01S 1/00* | (2006.01) |
| *G01C 21/34* | (2006.01) |
| *H04W 4/04* | (2009.01) |
| *G08G 1/14* | (2006.01) |
| *H04W 4/02* | (2009.01) |

(Continued)

(52) U.S. Cl.
CPC .............. *G01C 21/34* (2013.01); *G01S 19/39* (2013.01); *G08G 1/14* (2013.01); *H04L 1/08* (2013.01); *H04L 12/28* (2013.01); *H04W 4/005* (2013.01); *H04W 4/006* (2013.01); *H04W 4/008* (2013.01); *H04W 4/021* (2013.01); *H04W 4/046* (2013.01); *H04W 40/244* (2013.01); *H04W 84/18* (2013.01); *H05B 37/0218* (2013.01); *H05B 37/0227* (2013.01); *H05B 37/0272* (2013.01); *H04W 88/16* (2013.01)

(58) Field of Classification Search
CPC ........ G01C 21/34; G01S 19/39; G08G 1/14; H04L 12/28; H04L 1/08
USPC .................. 701/491; 398/115, 128; 370/338
See application file for complete search history.

(56) References Cited

U.S. PATENT DOCUMENTS

| | | | |
|---|---|---|---|
| 2007/0174490 A1* | 7/2007 | Choi ........................ | G06F 8/70 709/246 |
| 2014/0255036 A1* | 9/2014 | Jovicic ................ | H04B 10/116 398/115 |
| 2014/0279596 A1* | 9/2014 | Waris ................... | G06Q 10/083 705/317 |
| 2014/0344061 A1* | 11/2014 | Choi .................. | G06Q 30/0267 705/14.64 |

(Continued)

*Primary Examiner* — McDieunel Marc
(74) *Attorney, Agent, or Firm* — Schwegman Lundberg & Woessner, P.A.

(57) ABSTRACT

In various example embodiments, a system and method for interactive applications that use location-based information from a light sensor network are presented. In example embodiments, data indicating a destination location inside a geofence is received. The geofence represents a boundary around multiple private beacon nodes, which are associated with a light sensor network, and their associated beacon communications ranges. Navigation and tracking outside the geofence is based on at least one of global positioning system (GPS) signals and beacon signals received by the mobile device from at least one public beacon device within a beacon communications range of the mobile device located outside the geofence. Navigation and tracking inside the geofence is based on the beacon signals received by the mobile device from at least one private beacon node within the beacon communications range of the mobile device located inside the geofence and a virtual map including an area within the geofence.

20 Claims, 24 Drawing Sheets

| (51) | Int. Cl. | |
|---|---|---|
| | G01S 19/39 | (2010.01) |
| | H04L 1/08 | (2006.01) |
| | H04L 12/28 | (2006.01) |
| | H04W 4/00 | (2009.01) |
| | H04W 40/24 | (2009.01) |
| | H04W 84/18 | (2009.01) |
| | H05B 37/02 | (2006.01) |
| | H04W 88/16 | (2009.01) |

(56) References Cited

U.S. PATENT DOCUMENTS

2015/0254570 A1\* 9/2015 Florence ................ G06N 7/005
706/52
2015/0256623 A1\* 9/2015 Ryhorchuk ............. H04L 67/12
709/217
2015/0373482 A1\* 12/2015 Barnard ................... H04L 1/08
370/338

\* cited by examiner

INTERACTIVE APPLICATIONS USING DATA FROM LIGHT SENSORY NETWORKS

RELATED APPLICATIONS

The present application claims the benefit of priority to U.S. Provisional Application No. 62/013,571, entitled "APPLICATION FRAMEWORK BASED ON INTERACTIVE WIRELESS SENSOR NETWORKS" filed Jun. 18, 2014, the entire contents of which may be hereby incorporated by reference.

This application is related to U.S. patent application Ser. No. 14/743,726 entitled "APPLICATION FRAMEWORK FOR INTERACTIVE LIGHT SENSOR NETWORKS" and PCT Application No. PCT/US2015/036521 entitled "APPLICATION FRAMEWORK FOR INTERACTIVE LIGHT SENSOR NETWORKS" which are filed concurrently herewith.

TECHNICAL FIELD

Embodiments of the present disclosure relate generally to use of a wireless network of devices and supporting equipment that act as a framework for interactive applications.

BACKGROUND

Today, sensor networks are being used in a wide range of application areas. For example, data collected by sensor networks may be used for environmental monitoring, security and surveillance, logistics and transportation, control and automation, and traffic monitoring. The applications that use the data collected by the sensor networks are not interactive applications that rely on location-based information.

BRIEF DESCRIPTION OF THE DRAWINGS

The accompanying drawings, which may be incorporated herein and constitute part of this specification, illustrate exemplary embodiments of the invention, and together with the general description given above and the detailed description given below, serve to explain the features of the inventive subject matter.

DETAILED DESCRIPTION

The various embodiments will be described in detail with reference to the accompanying drawings. Wherever possible, the same reference numbers will be used throughout the drawings to refer to the same or like parts. References made to particular examples and implementations may be for illustrative purposes, and may be not intended to limit the scope of the inventive subject matter or the claims.

The word "exemplary" is used herein to mean "serving as an example, instance, or illustration." Any implementation described herein as "exemplary" is not necessarily to be construed as preferred or advantageous over other implementations.

The terms "computing system" and "computing device" may be used herein to refer to any one or all of: servers, mobile computing devices, desktop computers, server blades, laptop computers, personal computers, and similar electronic devices equipped with at least a processor and a network transceiver configured to establish a wide area network (WAN) and/or local area network (LAN) connection (e.g., a Long-Term Evolution (LTE), 3G or 4G wireless wide area network transceiver, a wired connection to the Internet, Wi-Fi®, Bluetooth®, etc.). Further, the term "mobile device" is used herein to refer to a mobile computing device utilized by a user, such as a smartphone, tablet, etc.

Figure 6:
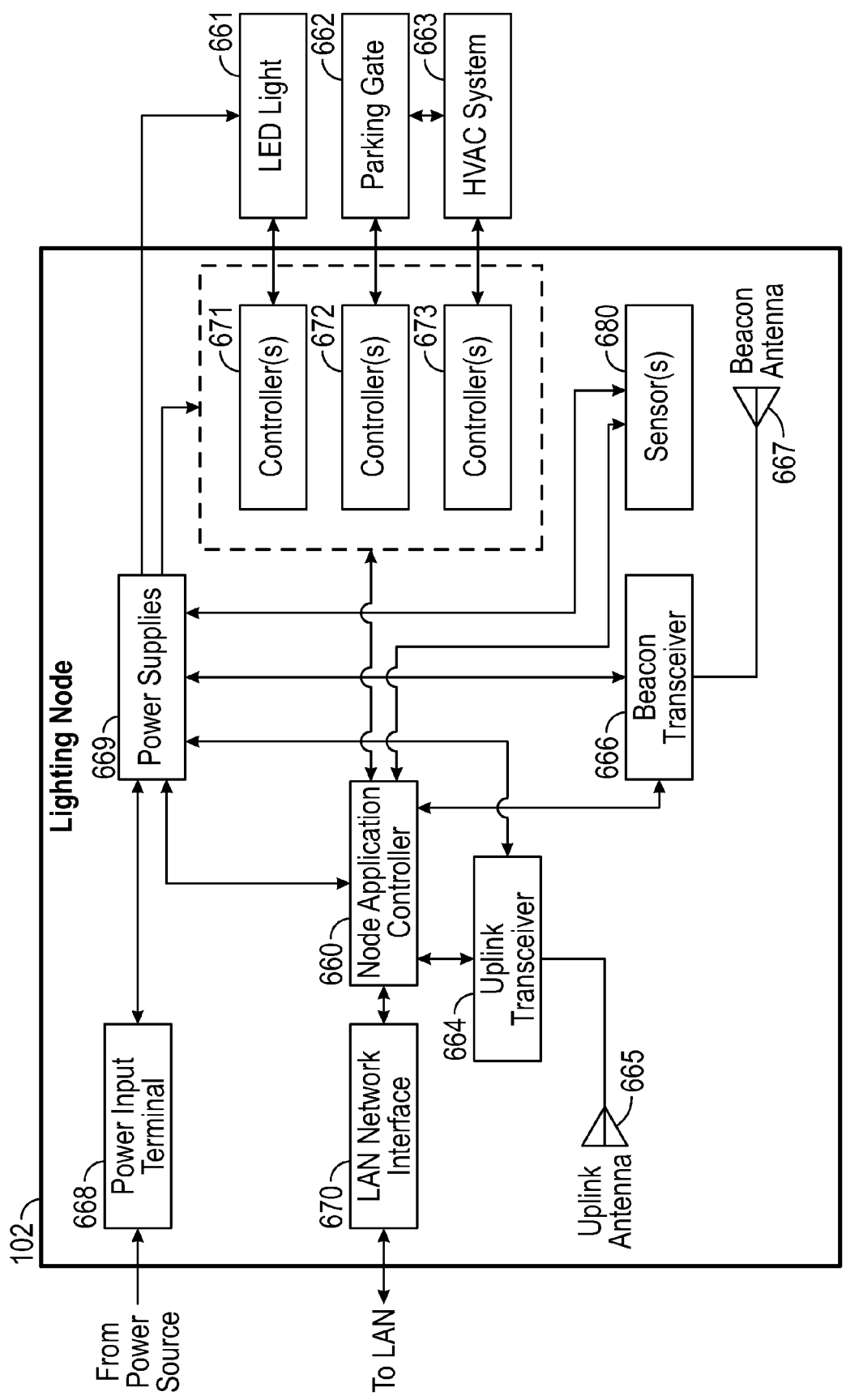
FIG. 6 is a component block diagram of a lighting node with sensors and controllers according to an example embodiment.

The term "lighting node" is used herein to refer to devices of a light sensor network (and thus an interactive application network) having, at least, a processing unit (e.g., a processor, an SOC, etc.), a light source (e.g., a controllable light bulb or other light source), and one or more transceivers for exchanging signals with various devices (e.g., Wi-Fi, Bluetooth, etc.). A lighting node may also connect to one or more sensors (e.g., camera, microphone, heat, light, etc.) and actuators to control facilities such as HVAC, signaling mechanisms, parking gates, etc. In some lighting nodes a transceiver may be configured to transmit beacon signals that can be received by a wireless receiver on a mobile device such as a smartphone. An example of such a node is illustrated in FIG. 6. In various embodiments, the lighting node may be referred to as a beacon node. In an example embodiment, the beacon node includes a beacon transceiver that exchanges signals with other devices within range using a Bluetooth® low energy (BLE) communications protocol. In further embodiments, the beacon node includes a transceiver that is configured to receive and/or transmit beacon signals. In example embodiments, a beacon signal includes a unique identifier for particular beacon device and the transmitter power of the device transmitting the beacon signal. In some embodiments, a beacon device within a node may transmit sensor data (e.g., a parking space occupancy state). In example embodiments, the sensor data may include or represent a sensor state.

The term "sensor controller node" or "SCN" is used herein to refer to devices of an interactive light sensor network having at least a processing unit (e.g., a processor, an SOC, etc.), and a transceiver for exchanging signals with a nearby lighting node. The interactive light sensor network may also be referred to as light sensor network. A sensor controller node may also connect to one or more sensors (e.g., camera, microphone, heat, light, etc.) and actuators to control facilities such as heating, ventilation and air conditioning (HVAC), signaling mechanisms, parking gates, etc. In some sensor controller nodes a transceiver may be configured to transmit beacon signals that can be received by a wireless receiver on a mobile device such as a smartphone. For some embodiments, the sensor controller node, may be referred to as a remote node because it is not located at (or in close proximity) to a lighting fixture in a lighting infrastructure to receive power from the lighting infrastructure. In further embodiments, the sensor controller node does not include a light or control a light. In other embodiments, the sensor controller node does not include a second transceiver, such as a beacon transceiver.

The network architecture may support mesh applications. This means that some lighting nodes may receive signals from other lighting nodes or sensor controller nodes and re-transmit the information in those signals with the same transceiver or a different transceiver. And, some sensor controller nodes may receive signals from other lighting nodes or sensor controller nodes and re-transmit the information in those signals with the same transceiver or a different transceiver.

European Patent Publication EP 2,709,428 discloses a lighting infrastructure application framework wherein a network of nodes consisting of sensors integrated with controlled lights enables applications such as lighting control, energy management, and asset management. U.S. Patent Publication No. 2013/346,229 discloses revenue models that enable the network operator, application provider, and lighting infrastructure owner to earn revenue by providing data and services based on light sensor networks. Both publications may be herein incorporated by reference.

In various embodiments, a light sensor network uses location-based interactivity to enable interactive applications and revenue models. Accordingly, embodiment systems and methods may be disclosed for providing access to sensor information integrated within a networked application framework that may be deployed in streets, parking garages, and/or other lighting infrastructures or systems. Such embodiment systems and methods may include various models for providing access to sensor information from such a network as part of various revenue models for monetizing networked devices integrated with a lighting system.

Embodiment systems and methods provide operation of a network of sensors, controls, and indicators that may be integrated with a system of interactive wireless network hubs of a lighting infrastructure to enable indoor/outdoor navigation and real-time location services. The main components of the framework may be the hardware, software and network resources that enable navigation, object tracking, data collection, analysis, action invocation and communication with applications and users. The components constitute an interactive light sensor network (ILSN) application framework that enables end-user applications dependent on data and messages from the lighting nodes of light sensor networks.

In various embodiments, mobile devices may also obtain sensor data from the interactive light sensor network. In some embodiments, the sensor data is provided to the application software platform 108 via an API provided by the service platform 104, and then provided to the end users in a human-readable format on their mobile device. The service platform 104 includes multiple APIs for the various applications. One or more applications may share the same API for a particular type of application. For example, many navigation applications may share a single API and many warehouse applications may share a single API. This has the advantage that the user may potentially access all sensors (globally) that is authorized both in real time and historically. In other embodiments, the mobile application may enable the beacon-compatible radio and scan for the beacon signals and interpret the coded messages with instruction from the application software platform 108. This enables real-time sensor reading of only the sensors within range of the mobile device, but it does not require a network connection to the application software platform.

Embodiment system may be based on node, gateway, and service platform. The node architecture may consist of a node platform which is deployed at various locations in the monitored area. In some embodiments, the lighting nodes and gateway nodes may be located within the lighting infrastructure (e.g., at individual street light fixtures). Some nodes may include sensors that collect and report data to other nodes, and in some cases to higher levels in the architecture. For example, at the level of an individual node, an ambient light sensor may provide information about lighting conditions at the location of the lighting fixture. Beacon devices, which may be separate or integrated with lighting nodes, may transmit wireless signals that may be received by mobile devices. The knowledge of the beacon locations coupled with the received beacon signals may provide input data to algorithms that calculate the mobile device locations. The location information may enable interactive applications based on the mobile device locations, such as navigation instructions, on-demand services such as task lighting, and location-based messaging such as vendor coupons. The lighting gateway platform may provide wide area networking (WAN) functionality and may complex data processing functionality, in addition to the functions provided by the node platform.

The collection of nodes from a light sensor network may be connected over a wired or wireless network to a service platform that collects the data (e.g., sensor data and other data) from the nodes within a light sensor network, stores the data in a database, and provides data to end user applications. For example, the service platform may receive the data, store it in time-stamped databases, and make the data available to one or more application software platforms via an application programming interface (API). Mobile users may use smartphones, or other standard networking devices, to receive the beacon signals from any of the wireless network hubs. The mobile devices may be connected to the application software platform via a mobile gateway using standard wireless protocols, such as LTE, Global Systems for Mobile Communications (GSM), General Packet Radio Service (GPRS), and/or Wi-Fi®. The application software platforms and service platforms may exchange data and control settings via application programming interfaces.

When an end user using a mobile device receives a beacon signal, the beacon signature may be interpreted by (a) having an interactive application on the mobile device (e.g., smartphone) refer to beacon data that was previously loaded onto the mobile device by the application software platform, or (b) having the interactive application on the mobile device (e.g., smartphone) send the beacon signature to the application software platform and subsequently receive a message from the application software platform that provides information on interpreting the beacon signal. In the latter case, the application software platform or service platform may track the number of beacon requests from users and provide analytics on the usage of each beacon per individual or group of individuals. In some embodiments, the application software platform and service platform functions may be performed on the same platform; in other embodiments, the application software platform and service platform functions may be performed separately. In example embodiments, the service platform executes software related to the lighting and sensor management and the sensor data collection, and the application software platform accesses application data from the service platform for an interactive application that it provides. One example of an interactive application is a parking management application which accesses parking data from the service platform.

In some embodiments, the network operator may connect to the service platform to configure and read data from the lighting and sensor controller nodes, as well as to configure the networking equipment (access points, gateways, and repeaters). The lighting infrastructure owner may connect to the service platform to read the data from sensors on their property, reserve resources such as parking spaces, set controllers for equipment such as lighting, security, HVAC, etc. The owner may also connect to the applications services platform to advertise available resources and associated charges for the resources, and to receive data on resource usage.

In some embodiments, the system may utilize one or more network devices installed in existing streetlights. Each streetlight may thus become a lighting node in the network. Each lighting node may include a power input terminal for receiving electrical power, a light source coupled to the power input terminal, a processor coupled to the power input terminal, a network interface coupled between the processor and the network of lighting systems, a sensor coupled to the processor for detecting a condition at the node, and a wireless hub that (a) reads remote sensor data, (b) sends beacon signals to smartphone users, and (c) tracks remote devices that emit a known wireless signal. In combination, this allows each node to convey information to other nodes and to central locations about the conditions at the nodes and the remote sensors and tracked devices. The wireless beacon signals from the lighting nodes enable the mobile device to navigate through the neighborhood of the nodes with location and other messages from a network connection that depends on the mobile device's position, as determined by the beacon signals.

In general, entities involved in such embodiment systems may include a lighting infrastructure owner, application software providers, service platform operators (or other interactive light sensor network operators), and end mobile users. Typical lighting infrastructure owners include a municipality, a building owner, tenants, a facility maintenance company, and/or other entities.

Lighting infrastructure owners may contribute the mechanical mounting and power facilities (poles, fixtures, etc.), interactive light sensor network operators may provide the hardware, software, network and configuration and monitoring resources to enable applications and application services on a day-to-day basis, and application providers (or application service providers) may contribute the functionality used by end user devices (e.g., mobile devices). Based on these contributions, a business scheme may be implemented by which revenue may be generated by an interactive light sensor network operator, applications operators (e.g., third-party app developers), and/or lighting infrastructure owners based on the sharing, communication, storing, and processing of data, applications, and services associated with the interactive light sensor network.

Figure 1:
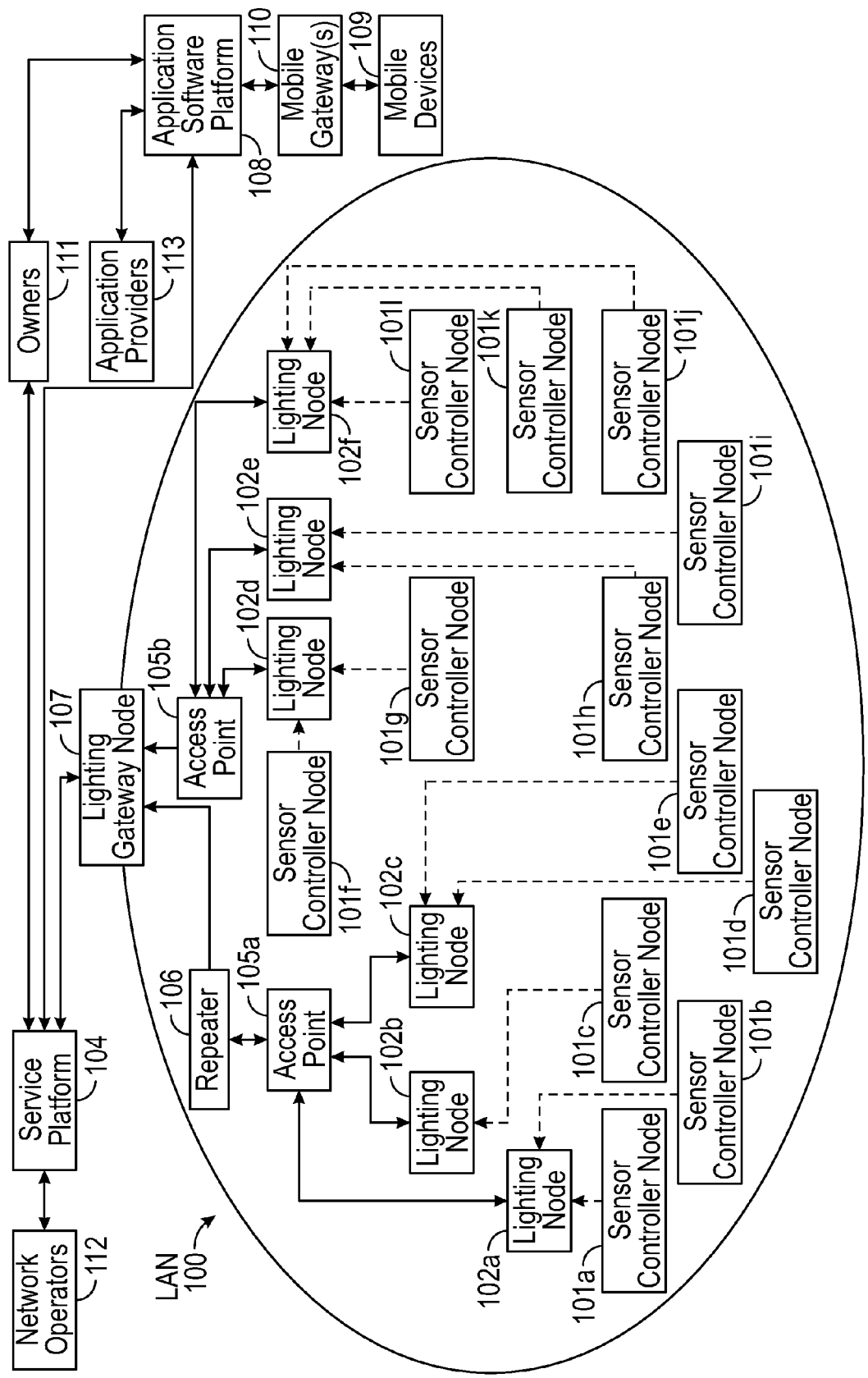
FIG. 1 is a system block diagram illustrating exemplary logical connections of the network elements used in one part of an interactive light sensor control network with a star architecture suitable for use in various embodiments.

FIG. 1 shows an exemplary logical connection map of the network elements used in one implementation of a local area network (LAN) 100 which represents an interactive beacon, sensor, and controller network according to an example embodiment. The LAN 100, along with the service platform 104, the application software platform 108, and the mobile gateway(s) 110 may represent an interactive light sensor network (ILSN). In some embodiments, the various nodes within the LAN 100 are not required to be associated with or supported by a lighting infrastructure.

Sensor controller nodes (SCN) 101a-101l communicate to lighting nodes (LN) 102a-102f using a standard wireless protocol such as Bluetooth® Low Energy (BLE) or wireless fidelity (Wi-Fi). In various embodiments, the sensor controller nodes 101a-101l and/or the lighting nodes 102a-102f may be associated with or included within an interactive light sensor network. In various embodiments, the sensor controller nodes 101a-101l may communicate the values of connected sensors to the lighting nodes 102a-102f by (1) having a sensor controller node (e.g., 101a-101f) insert the sensor data in an advertising packet that is transmitted at set intervals over the LAN 100 (e.g., in an open advertising mode); (2) having a lighting node (e.g., 102a-102f) connect in a round robin to local sensors to retrieve the sensor data (e.g., a time-shared connection mode); or (3) having a lighting node (e.g., 102a-102f) permanently connected to neighboring sensors to retrieve the sensor data by a request/acknowledge exchange (e.g., a permanent connection mode). The selection of communication mode depends on various factors such as limitations on shared connections by the selected wireless protocol, number of remote sensors, amount of sensor data and required update time, and power requirements. It may be desirable to run the sensor controller nodes 101a-101l on a battery, in which case the open advertising mode may be used since it has the lowest overhead and hence lowest power per bit transmitted.

In various embodiments, the lighting nodes 102a-102f may be programmed to perform one or more of the following functions: (1) read the remote sensor values and transmit the values to the service platform 104 via the gateway nodes (e.g., lighting gateway node 107 (LGW)), (2) transmit recognizable wireless beacon signals at regular intervals; (3) scan for beacon signals from tracked objects (TO) (not shown) and report those signals to the service platform 104 and (4) communicate received signals and sensor data to neighboring lighting nodes (e.g., 102a-102f). The lighting nodes 102a-102f may also be connected to other sensors or controllers that interact programmatically with the lighting nodes 102a-102f. The lighting nodes 102a-102f may communicate with the service platform 104 with a direct network interface via a repeater node 106. In another embodiment, known as a wireless mesh, lighting nodes 102a-102f may transmit their data to a lighting gateway node 107 via neighboring lighting nodes (e.g., 102a-102f). In some embodiments, lighting nodes may be referred to as beacon nodes and the lighting gateway node may be referred to as beacon gateway node.

In various embodiments, the lighting nodes 102 may connect to a service platform 104 via standard networking equipment such as access points 105a-105b, repeater nodes (e.g., 106), and a lighting gateway node 107. The collection of lighting nodes (e.g., 102a-102f), repeater nodes (e.g., 106), access points (e.g., 105a-105b), and lighting gateway nodes (e.g., 107) represents an example of an interactive wireless network that may be connected by the lighting gateway node 107 over a wide area network (WAN) to the service platform 104. The lighting gateway node 107 may, in certain embodiments, communicate with the service platform 104 using wide area network communications technology such as broadband network, cellular network, Wi-Fi®, general packet radio service (GPRS), or other means (e.g., cell towers, Wi-Fi® routers, access points, Ethernet switches, IP routers, etc.). The lighting gateway node 107 may be a stand-alone implementation or it may be integrated with a lighting node (e.g., 102a-102f). The lighting gateway node 107 may provide wide area networking (WAN) functionality and provide complex data processing functionality, in addition to the functions provided by the lighting node 102. In other words, the lighting gateway node 107 may represent a lighting node with added processing and communications functionality. In some embodiments, the service platform 104 is directly connected to the wireless network access point (e.g., 105a and 105b) without a lighting gateway node 107. For example, the lighting node 102d is communicatively coupled to the access point 105b, which communicates directly with the lighting gateway node 107 as shown in FIG. 1.

In various embodiments, the service platform 104 acts as an aggregate point for all of the data from the sensor controller nodes (e.g., the sensor controller nodes 101a-101l). In other embodiments, the service platform 104 also acts as the aggregate point for the data from the other nodes (e.g., the lighting nodes 102a-102f, and the gateway node 107) in addition to the sensor controller nodes 101a-101l. The service platform 104 stores the sensor data, beacon data, and tracked object information in one or more databases (not shown) that may be available to end users (e.g., network operators 112, application providers 113, owners 111, and users of mobile devices 109, etc.) via various APIs. The application software platform 108 accesses the service platform 104 databases through APIs and uses the data in applications that run on the mobile devices 109. In example embodiments, the application software platform 108 includes (or hosts) multiple server-side applications that have corresponding client applications running on mobile devices, such as smartphones. In some embodiments, the application software platform may store additional information about beacon locations or parking spaces in its own databases. The application software platform may also have knowledge of other beacons that are not known to the service platform and/or the lighting and sensor controller nodes. In various embodiments, the mobile devices 109 may access the application software platform 108 via standard cellular or Wi-Fi® networks via mobile gateways 110 (e.g., cell phone towers or Wi-Fi® routers).

Figure 2:
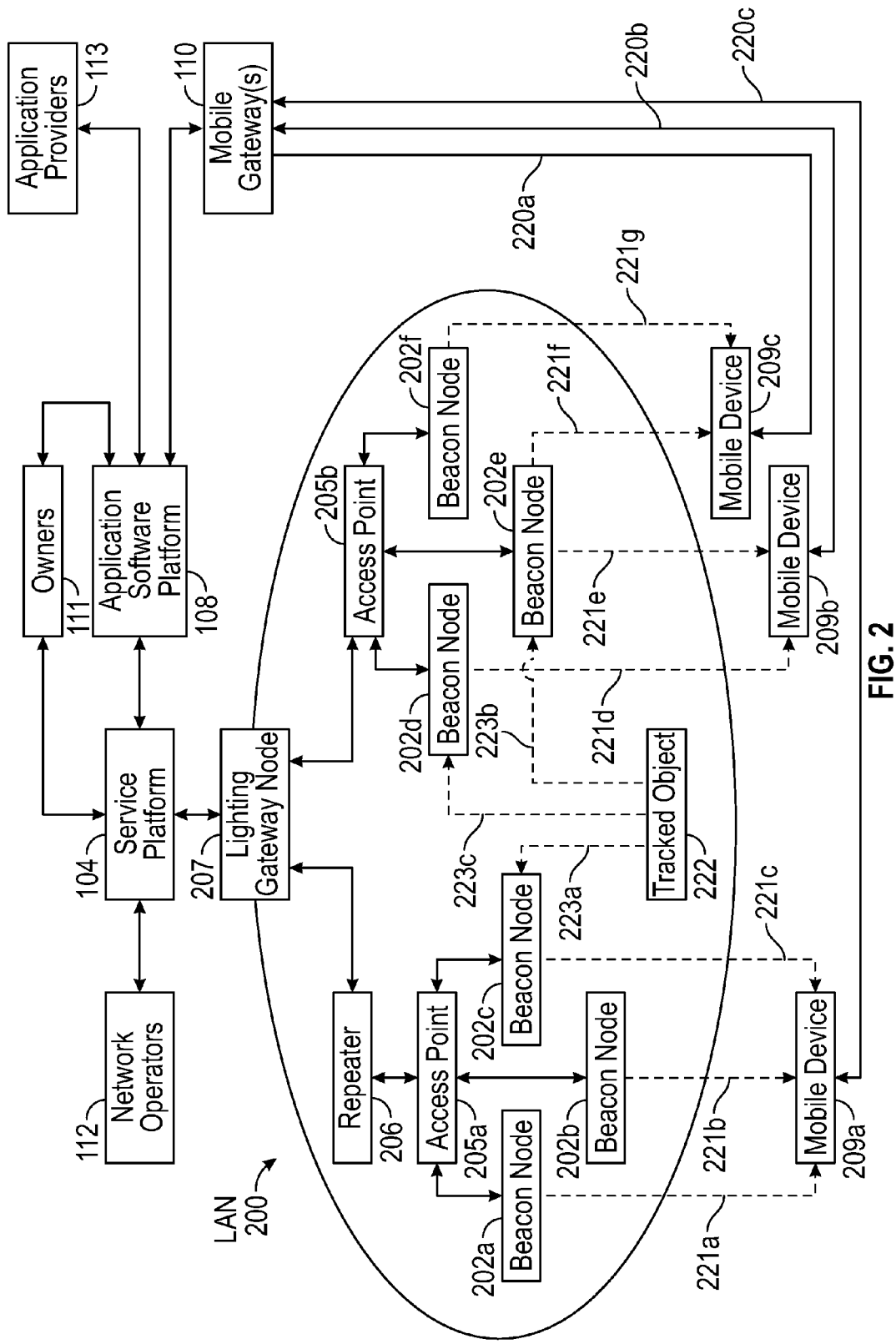
FIG. 2 is a system block diagram illustrating exemplary logical connections of beacon signals received by mobile devices and tracked objects within range of an interactive light sensor network suitable for use in various embodiments.

FIG. 2 shows the logical network connections used by interactive applications that use wireless beacon signals to locate users or objects according to an example embodiment. In the example shown in FIG. 2, the object being tracked is the tracked object 222. In some embodiments, the tracked object 222 represents a beacon transmitter that transmits BLE signals, or other suitable device that can transmit other near range communication signals. In the example shown in FIG. 2, the tracked object 222 transmits a beacon signal 223a to the beacon node 202c, a beacon signal 223c to a beacon node 202d, and a beacon signal 223b to the beacon node 202e. The beacon signals 223a-223c includes information to enable the beacon nodes 202c, 202d, and 202e, alone or in combination, to determine the location information of the tracked object 222. In example embodiments, the beacon nodes 202c-202e are within communications range of the beacon signals 223a-223c transmitted by the tracked object 222, and the beacon nodes 202a, 202b, and 202f are not within the communications range of the beacon signals 223a-223c transmitted by the tracked object 222. As described below, the distance between the tracked object 222 is estimated or calculated by the beacon nodes (e.g., 202c-202e) that are within the communication range of the tracked object 222.

There are multiple beacon nodes 202a-202f within a LAN 200, which represents a beacon, sensor, and controller LAN. In some embodiments, the beacon nodes 202a-202f represent lighting nodes that include beacon transceivers for sending and receiving beacon signals. In an example embodiment, the beacon nodes 202a-202f are generally stationary within an environment (also referred to as a site or building or other infrastructure). In various embodiments, the environment, site or infrastructure is at least partially inside a structure, such as parking garage. In various embodiments, the environment may be other indoor environments, which may be fully or partially enclosed. In some embodiments, the environment may be an outdoor environment.

Figure 5:
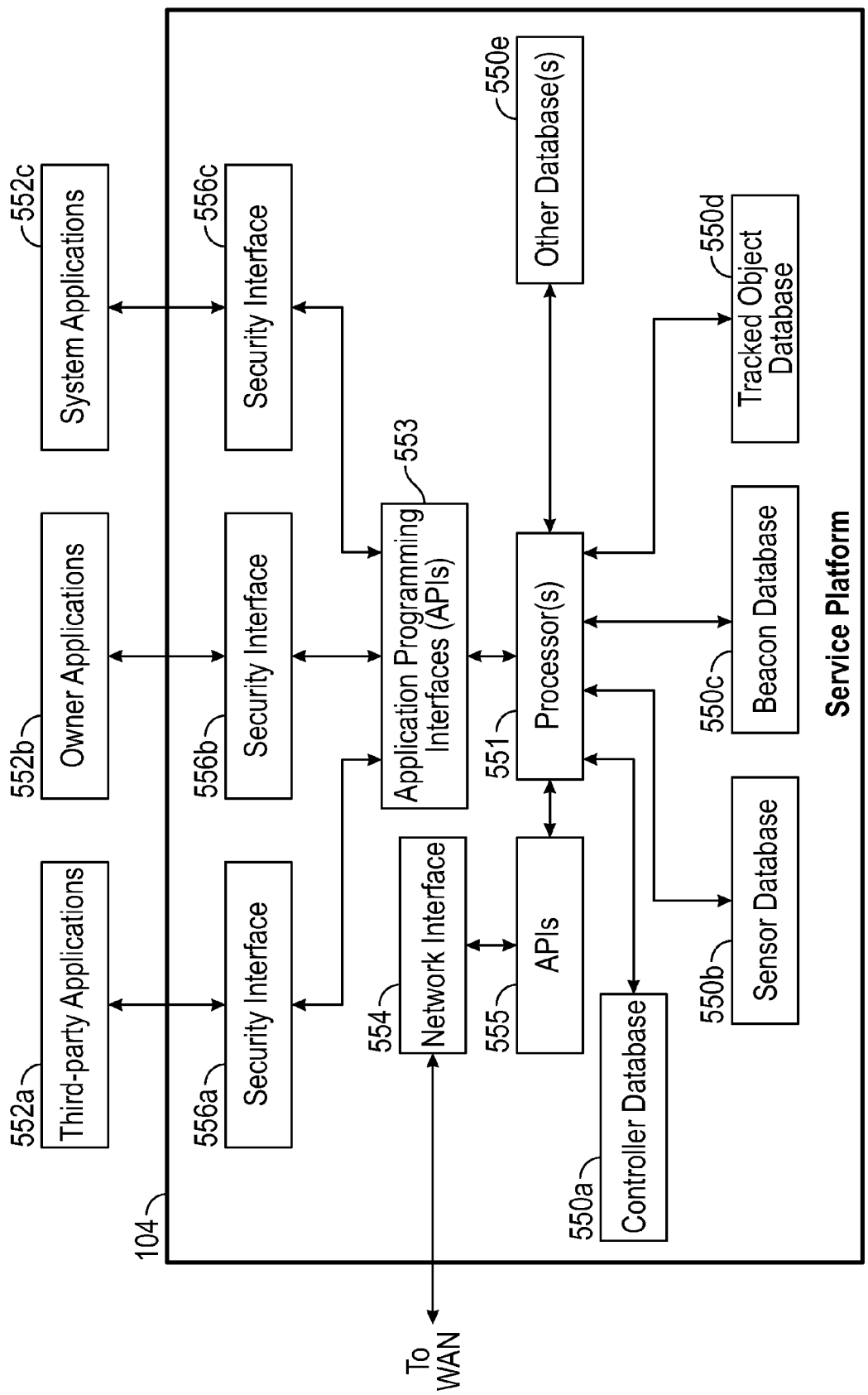
FIG. 5 is a component block diagram of a service platform according to an example embodiment.

During the installation or set up of the environment with lighting nodes (e.g., beacon nodes 202a-202f), a provisioning process is performed to identify the location (e.g., based on Cartesian coordinates and/or a reference coordinate) of the beacon nodes 202a-202f within the environment. The location information from the provisioning of the beacon nodes 202a-202f may be stored in one or more databases within the service platform 104, in an example embodiment. Examples of databases (e.g., 550a-550e) within the service platform 104 are shown in FIG. 5. In some embodiments, the updated location information of the tracked object 222 relative to the beacon nodes 202a-202f is transmitted to the mobile devices 209a-209c.

According to FIG. 2, the various beacon nodes 202a-202f that are within communications range of the mobile devices 209a-209c transmit beacon signals to those mobile devices 209a-209c. In various embodiments, the beacon nodes 202a-202f may communicate with the mobile devices 209a-209c using various wireless communication protocols, including near range communication protocols such as BLE communication protocols. The mobile device 209a is within communications range of beacon nodes 202a, 202b, and 202c, and receives beacon signals 221a, 221b, and 221c from those devices as shown in FIG. 2. The mobile device 209b is within communications range of beacon nodes 202d and 202e, and receives beacon signals 221d and 221e from those devices as shown in FIG. 2. The mobile device 209c is within communications range of beacon nodes 202e and 202f and receives beacon signals 221f and 221g.

The mobiles devices 209a-209c may be running one or more interactive mobile applications that use both the sensor data collected by the various nodes within the LAN 200 and the beacon data (e.g., created during provisioning) or other beacon data (e.g., from the beacon signals 223a-223c transmitted by the tracked object 222). In some embodiments, the mobile devices 209a-209c may be running different interactive mobile applications that have access to the authorized sensor data stored by the databases in the service platform 104 or accessible to the service platform 104. For example, the mobile device 209a may be executing a mobile application for navigating cars and finding parking spaces, whereas the mobile device 209c may be executing a mobile application for tracking inventory in a warehouse. These applications are generally referred to as being interactive mobile applications because the mobile applications receive updates (e.g., real-time or near real-time updates) to provide navigation instructions to a user or to provide inventory location updates of tracked objects (e.g., warehouse goods).

In example embodiments, beacon signals 223a-223c may contain data representing the transmit power of the beacon signals 223a-223c. In some embodiments, the same transmitted power is used by all beacon nodes, so that the receiver (e.g., beacon nodes 202c-202e) has an estimate of the transmitted power. For various embodiments, the beacon nodes 202a-202f represent lighting nodes that include a beacon or beacon device enabled or configured to transmit and/or receive beacon signals. The receivers of the beacon signals 223a-223c, shown in FIG. 2, are the beacon nodes 202c-202e. The receivers may measure the received signal strength (RSSI) of the beacon signals 223a-223c so that the loss of signal strength from the transmitter to receiver of the beacon signals 223a-223c may be calculated as:

$$\text{Signal\_loss(dB)} = \text{Transmitted\_power(dBm)} - \text{Received\_power(dBm)}$$

A known function of distance versus signal loss is then used to calculate the distance from the transmitter (e.g., the tracked object 222) to the receiver (e.g., beacon nodes 202a-202f). In the example shown in FIG. 2, the tracked object 222 transmits the beacon signals 223a-223c and the beacon nodes within range (e.g., beacon nodes 202c-202e) represent the receiver. In other embodiments, the beacon nodes (e.g., 202a-202f) may represent the transmitter of the beacon signals (e.g., 221a-221g) and the mobile devices within range (e.g., mobile devices 209a-209c) may represent the receiver of the beacon signals (e.g., 221a-221g). In various embodiments, the beacon nodes 202a-202f may communicate with the mobile devices using various wireless communication protocols, which may or may not include the beacon signals.

In some embodiments, the tracked object 222 may have a wireless transmitter that is programmed to transmit a unique signal that is received by the beacon nodes (e.g., 202c, 202d, and 202e). The received signal strength indicator (RSSI) of the tracked object's signal received at the beacon nodes (e.g., 202c, 202d, and 202e) may be used to estimate the distance from the tracked object 222 to each of the beacon nodes (e.g., 202c, 202d, and 202e). In some embodiments, the mobile devices 209a-209c receive the beacon signals (e.g., 221a-221g) from the beacon nodes 202a-202f to estimate the distance of a mobile device (209a-209c) to each beacon node (202a-202f). In various embodiments, least-squares algorithms may be applied to all the received signals to estimate the tracked object 222 or the positions of mobile devices 209a-209c (i.e., if the mobile device represents a tracked object).

For the tracked object 222, the service platform 104 may receive the estimated distance data from all of the beacon nodes 202a-202f within the vicinity (or communications range) of the tracked object 222 and apply a least-squares multilateral algorithm to the beacon signals (e.g., 223a-223c). In other embodiments, the distance between the tracked object 222 and beacon nodes 202a-202f within its communication range may be measured using time of flight, provided there is sufficient timing accuracy and clock skew by the tracked object 222 and the beacon nodes 202a-202f that receive the beacon signals.

For the mobile devices 209a-209c, the application software platform 108 may provide a table of the beacon data, including location information of the beacon nodes (e.g., 202a-202f) and beacon identifier (IDs) to an application program so that the application program may calculate the position of the tracked object 222 relative to the beacon nodes 202a-202f. In various embodiments, the application program may include a server-side application (hosted by the application software platform 108 and executable on the application software platform 108) and a corresponding client application (also referred to as mobile application) that is installed and executable on a mobile device (e.g., mobile devices 209a-209c). In some embodiments, the position of a tracked object may be calculated by the server-side application, and in other embodiments, the position of the tracked object may be calculated by the client-side application.

In an example embodiment, the table of the beacon data and other data (e.g., sensor data) is accessed from service platform 104 by the application software platform 108, which may host multiple application programs. An application program may have an associated or corresponding client application (e.g., mobile application installed and executable on a mobile device (e.g., mobile devices 209a-209c)) that uses the data accessed from the service platform 104 or the application software platform 108. In some examples, the application program is a parking application or navigation application that guides vehicles to unoccupied parking spaces based on sensor data collected by the various nodes or sensors and beacon data (including location information) within a LAN which is stored in the service platform and accessed by the application, and information provided by the beacon nodes (e.g., beacon nodes 202a-202f) directly to the mobile devices (e.g., mobile devices 209a-209c). The mobile application uses the data accessed from the service platform 104 (e.g., sensor data and beacon data) and other data provided by the beacon nodes (e.g., beacon nodes 202a-202f). In various embodiments, the beacon nodes collect sensor data from sensor controller nodes (not shown in FIG. 2).

Figure 3:
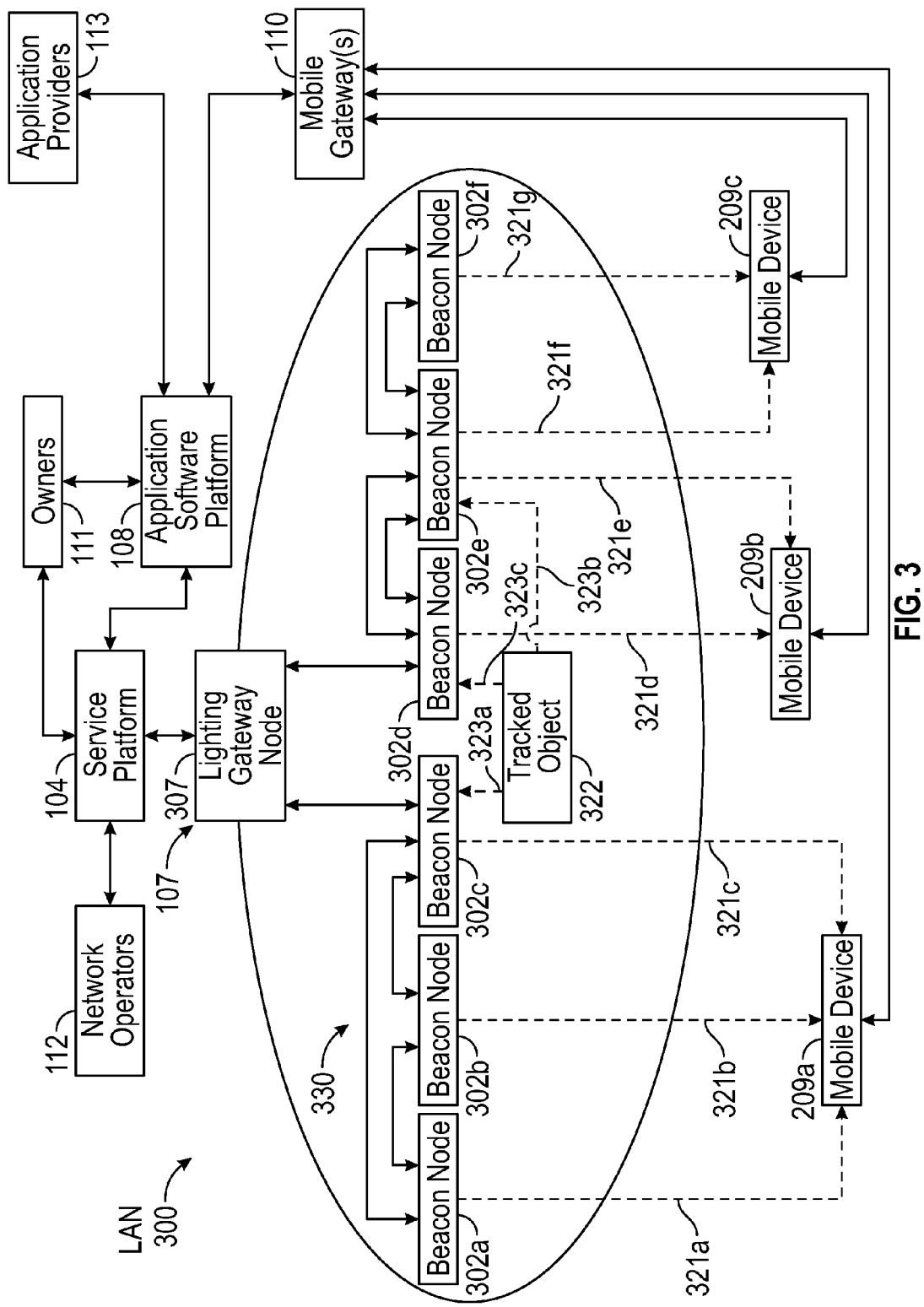
FIG. 3 is a system block diagram illustrating exemplary logical connections of network elements used in one part of an interactive light sensor network with a mesh architecture suitable for use in various embodiments.

FIG. 3 illustrates an embodiment of an interactive LAN 300 that deploys a mesh network 330 to transmit data between the beacon nodes 302a-302f. In this embodiment, only some of the beacon nodes (e.g., 302c and 302d) communicate directly with the lighting gateway node 307. Other beacon nodes (e.g., 302a, 302b, 302e, and 302f) communicate with the network gateway by having intermediate beacon nodes (e.g., 302b, 302c, 302d, and 302e) relaying the data to the next node.

For example, the beacon node 302a communicates directly with the beacon node 302b and indirectly with the beacon node 302c, or directly with the beacon node 302c, before the beacon node 302c communicates directly with the lighting gateway node 307. Similarly, the beacon node 302f communicates directly with the beacon node 302e and indirectly with the beacon node 302d before the beacon node 302d communicates directly with the lighting gateway node 307. Wireless mesh networks may be well known to those skilled in the art as an alternative to the "star-type" architecture shown in FIG. 1 and FIG. 2. The current inventive subject matter may be deployed in "star-type" or "mesh-type" architectures, with the architecture chosen dependent on the requirements of a given application.

For one example, the mobile device 209a is within the wireless communications range of the beacon nodes 302a, 302b and 302c, and receives beacon signals or other wireless communications over communication paths 321a, 321b, and 321c, respectively; the mobile device 209b is within the wireless communications range of the beacon nodes 302d and 302e, and receives beacon signals or other wireless communications over communications paths 321d and 321e, respectively; and the mobile device 209c is within the wireless communications range of the beacon nodes 302e and 302f, and receives beacon signals or other wireless communication signals over communications paths 321f and 321g, respectively. Furthermore, when the tracked object 322 is within the BLE communications range of the beacon nodes 302c, 302d, and 302e, the beacon nodes 302c, 302d, and 302e receive beacon the signals 323a, 323b, and 323c, respectively.

Figure 4:
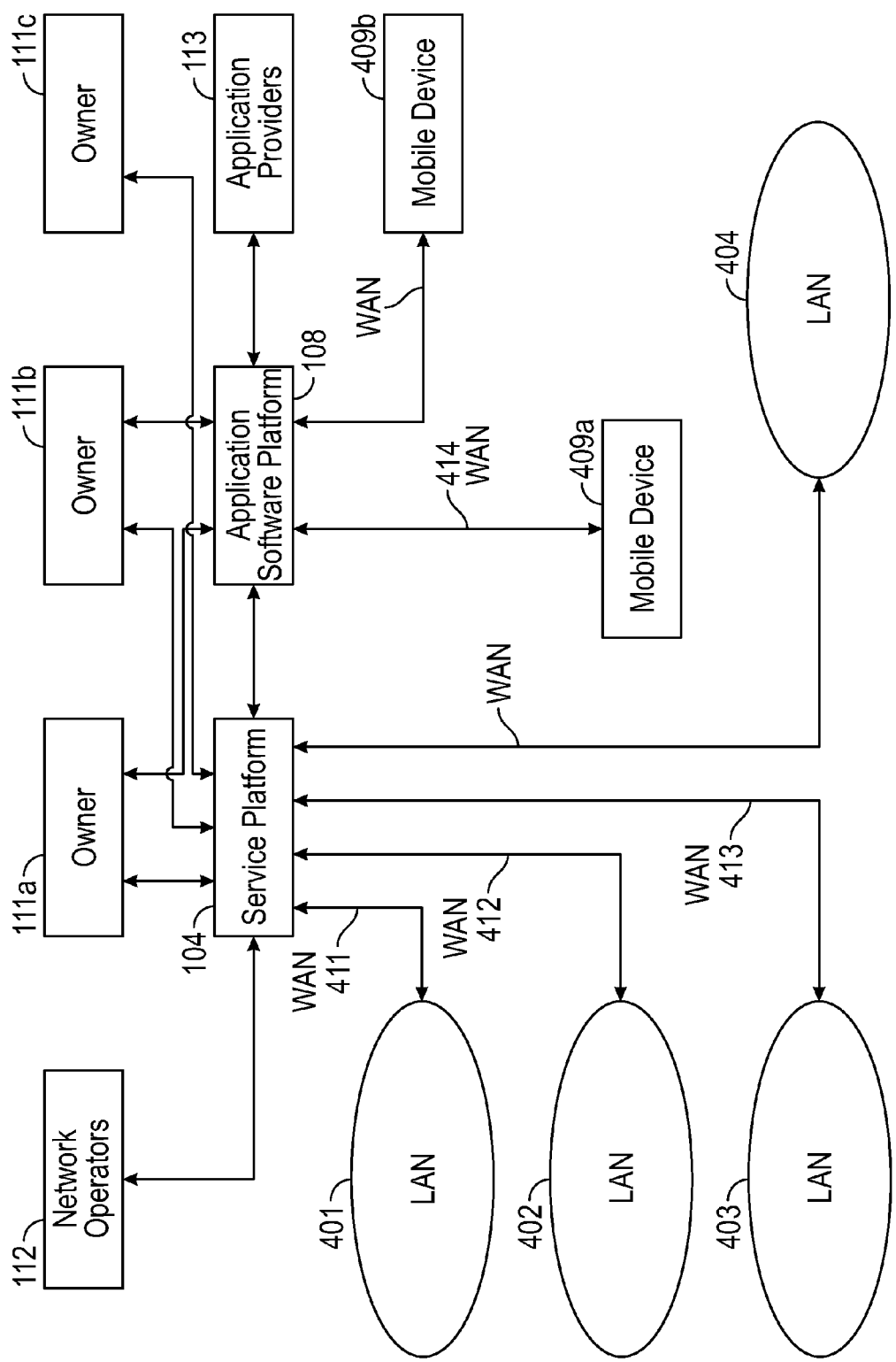
FIG. 4 shows a system block diagram illustrating exemplary logical connections of multiple beacon, sensor, and controller local area networks (BSCLAN) with a shared service platform according to various embodiments.

The overall architecture of the interactive light sensor network supports multiple instances of LANs (e.g., 401-404), such as shown in FIG. 4. Each local area network (e.g., 401, 402, 403, and 404) of wireless sensors may include at least a lighting node, a sensor, and a controller. In various embodiments, such local networks are referred to as beacon, sensor, and controller LAN or "BSCLAN", and further may have a separate WAN connection to the service platform 104. With this architecture an owner of multiple sites may have the same user interface and databases to manage services and applications for all sites.

For example and as illustrated in FIG. 4, an overall system architecture may consist of multiple instances of local LANs 401-404, deployed at sites owned by multiple owners 111a-111c, connected to the service platform 104 over multiple WAN connections 411-414. Each owner 111a-111c may have more than one site with a BSCLAN connected to the service platform 104. In the exemplary embodiment of FIG. 4, LAN 401 and LAN 402 may be owned by the infrastructure owner 111a, LAN 403 may be owned by the infrastructure owner 111b, and LAN 404 may be owned by the infrastructure owner 111c. In some embodiments, equipment at all sites is connected to the same service platform 104, which may run the same applications or provide access to data stored in databases of the service platform 104 to be used by the same application running on other devices.

A single application may make use of resources leased by or otherwise provided by one or more infrastructure owners (e.g., 111a-111c) at one or more sites. Mobile devices 409a and 409b may therefore use the same mobile application (associated with the applications available from the application software platform 108) to request resources at multiple sites. In various embodiments, the application software platform 108 hosts multiple software applications which have corresponding mobile applications (also referred to as client applications) that can be executed on the mobile devices 409a and 409b. The software applications from the application software platform 108 access data stored at the service platform 104 (or accessible to the service platform 104) via APIs. In some embodiments, the application providers 113 represent third party application developers who make their applications available on the application software platform 108 and may utilize the data collected and provided by the LANs 401-404. Although not shown in FIG. 4, in various embodiments, the mobile applications executing on the mobile devices 409a and 409b may also receive data directly (i.e., without going through the service platform 104) from the LANs 401-404 via wireless communications that are utilized by the mobile application executing on the mobile devices 409a and 409b.

FIG. 5 illustrates a service platform 104 according to an example embodiment. In example embodiments, the service platform 104 is implemented in the cloud to enable a variety of applications to simultaneously access data (e.g., authorized data) from the service platform 104, and distribute the data to third-party applications. The service platform 104 may include various computing devices, routines, modules, logic, databases, and/or networking elements to enable the service platform functions as described below with reference to service platform 104. The service platform 104 may collect, organize, analyze, aggregate, and otherwise process the received data as described below. The service platform 104 may include databases 550a-550e that store real-time and historic sensor data, controller settings, beacon data, and/or tracked object data. The databases 550a-550e include a controller database 550a, a sensor database 550b, a beacon database 550c, a tracked object database 550d, and other databases 550e. In an example embodiment, the other databases 550e may include a database for storing a lot map, as described with FIG. 23. Access to the databases 550a-550e is controlled by software running on one or more processors 551 that read and write data to the databases 550a-550e based on messages and commands from a network interface 554 or APIs 555 (also referred to as application interfaces). All external interfaces may have a security interface (e.g., 556a-556c) to protect against unauthorized access. In various embodiments, authorized access to data by an application may be based on a specific API or data collected by a particular LAN or particular nodes from one or more LANs. In further embodiments, authorized access may be based on the type of data. In various embodiments, the authorized access is related to the financial model agreed upon by the relevant parties or entities.

In various embodiments, the owner applications 552b, system applications 552c, and third-party applications 552a access the databases 550a-550e via an application programming interface(s) 553 that has a published syntax to access the databases 550a-550e and network devices.

The service platform 104 may be configured to execute software that may perform one or more of the following functions: logging into one or more lighting nodes and querying data from the sensors at those lighting nodes and storing that data in a sensor database; receiving controller requests from applications, storing the controller settings in a controller database, and sending the controller settings over the network to the sensor controller nodes, storing tables that include data representing beacon locations, beacon identifiers, and beacon messages in a beacon database, and exchanging the beacon data with applications; saving data on the tracked object identifiers and their locations; enabling third-party applications, owner (e.g., lighting infrastructure owners) applications, and system applications via APIs 553 that exchanges sensor, beacon, tracked object, and controller data.

In addition, a lighting gateway node (e.g., 107 (FIG. 1), 207 (FIG. 2), and 307 (FIG. 3)) may receive information from the service platform 104 and provide that information to the network interface (e.g., LAN network interface 670 shown in FIG. 6) at the lighting nodes. That information may be used to facilitate control of a light, or numerous other applications, some of which may be described herein. The sensors at the lighting nodes may be used with controllers to track an object with a provisioned unique identifier, or provide control signals to apparatus coupled to the node (e.g., lock or unlock a parking area, enable/disable a light, etc.). Multiple lighting gateways may be used to couple multiple regions of a system together for purposes of a single application.

FIG. 6 shows an exemplary block diagram of an embodiment of a lighting node 102. In some embodiments the lighting node 102 may be controlled by a node application controller 660 that may consist of software running on a microcontroller which is connected to volatile and non-volatile memory. In another embodiment, the node application controller 660 may consist of firmware running on a field-programmable gate array (FPGA). The node application controller 660 communicates over the LAN via a LAN network interface that is compatible with the chosen LAN network protocol. The node application controller 660 may read data from sensors and may store the data in its memory; it may also forward the data over the LAN to the service platform 104. The node application controller 660 may also send output signals to controllers to change the settings of connected, controlled devices such as an LED light 661, parking gate 662, or heating, ventilation, air conditioning (HVAC) system 663. The node application controller 660 may also be connected to a beacon transceiver 666 that transmits beacon signals with a wireless beacon antenna 667. The beacon transceiver 666 may also receive signals from nearby sensor controller nodes, and from tracked objects. The node application controller 660 may also be connected to an uplink transceiver 664 that communicates with the service platform 104 with a wireless uplink antenna 665. All devices on the lighting node 102 may be powered by a power input terminal 668 that provides power to one or more power supplies 669 within the lighting node 102. In another embodiment, the lighting node 102 representing a beacon node may consist of a system-on-chip SOC with an integrated beacon transceiver 666 without having connected input sensors or output controllers. In various embodiments, the integration of sensors and control outputs with the beacon transmitter or transceiver depends on the requirements of a particular application. In various embodiments the lighting node 102 may have a wireless or wired LAN network interface 670 to support a star architecture. In other embodiments that use a mesh architecture, the LAN network interface 670 is not required.

Figure 7A:
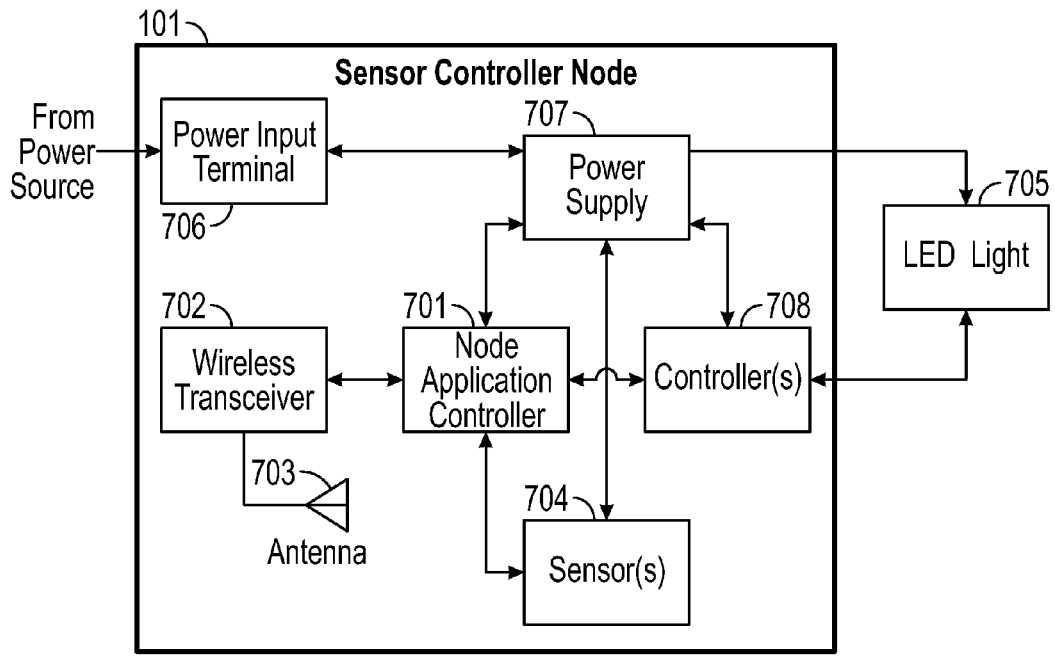
FIG. 7A is a component block diagram of a sensor controller node according to one embodiment.
Figure 7B:
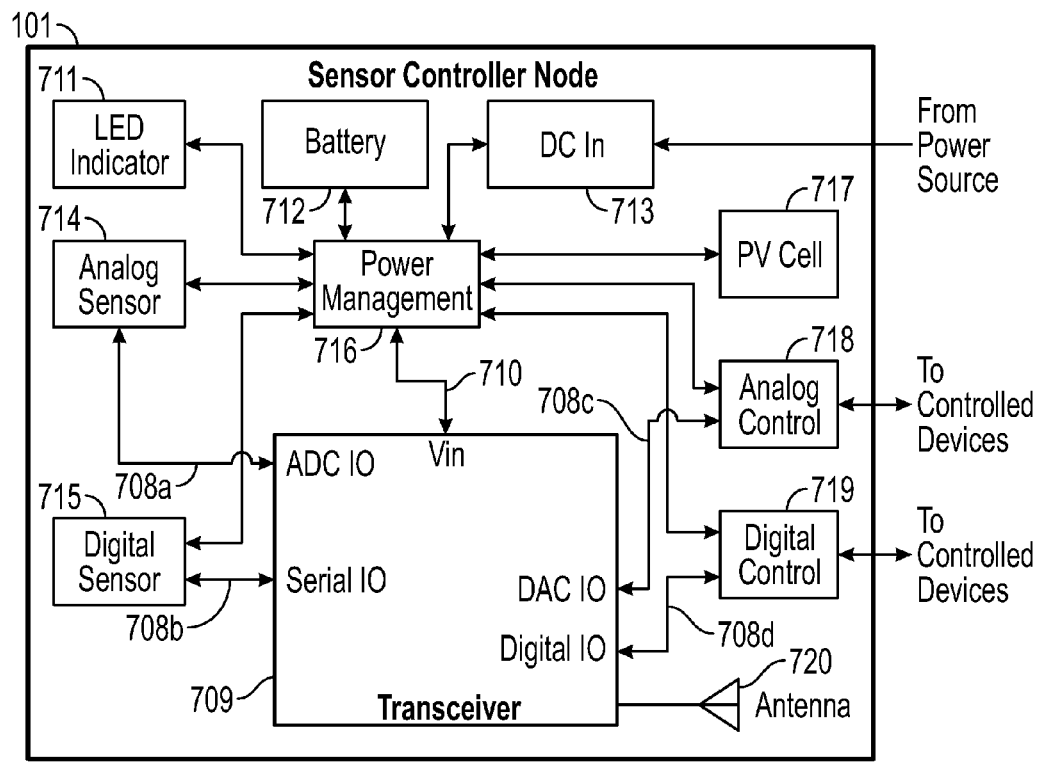
FIG. 7B is a component block diagram of a sensor controller node with a wireless system-on-chip (SOC) according to another embodiment.

FIGS. 7A and 7B illustrate example embodiments of sensor controller node 101. The sensor controller nodes 101a-101l, shown in FIG. 1, may be implemented using sensor controller architectures shown in FIGS. 7A and 7B. In various embodiments the sensor controller node 101 includes a node application controller 701 having software running on a microcontroller that is connected to volatile and non-volatile memory. In another embodiment, the node application controller 701 includes firmware running on a field-programmable gate array (FPGA). The node application controller 701 communicates to neighboring lighting nodes and sensor controller nodes via a wireless transceiver 702 and antenna 703. The node application controller 701 may read data from one or more sensors 704 and store the data in its memory, and it may also forward the data over the wireless network to the service platform (e.g., the service platform 104) via the lighting gateway (e.g., the lighting gateway nodes 107, 207 or 307). The node application controller 701 may also send output signals to one or more controllers 708 to change the settings of connected, controlled devices such as an LED light 705. All devices on the sensor controller node 101 shown in FIG. 7A may be powered by a power input terminal 706 that provides power to one or more power supplies 707 within the controller node 101.

FIG. 7B shows a block diagram of another embodiment of the sensor controller node 101 with sensors and controllers based on an integrated system on a chip (SOC) 720. In an example embodiment, the wireless SOC 720, such as the Texas Instruments CC2541, combines in a single integrated circuit a wireless transceiver, analog digital sensor interfaces (e.g., ADC IO 708*a*, serial IO 708*b*, DAC IO 708*c*, and Digital IO 708*d*), and a CPU with volatile and non-volatile memory. The SOC 720 also includes a voltage input (Vin) 710. The SOC 720 may periodically read the data from the sensor signals and store the data locally or transmit the data to the beacon controller using the beacon protocol signal such as BLE or Wi-Fi®. The SOC 720 may also change the output control signals based on messages from the service platform, preset schedules, or data from the sensors.

In some embodiments, the lighting nodes and/or sensor controller nodes may require low power so that they may powered by (a) an AC/DC power supply (e.g., received by DC in 713) that is shared between one or more sensors (e.g., analog sensor 714 and digital sensor 715), (b) an onboard battery 712, (c) a photovoltaic (PV) cell 717 or other energy harvesting means. The power management module 716 is used to distribute the power to the various devices within the sensor controller node 101 shown in FIG. 7B. In an example embodiment, the power management module 716 provides power to an LED indicator 711. In some embodiments, PV cells coupled to the sensor modules (e.g., analog sensor 714 and digital sensor 715) may be pointed at the available artificial or natural lights. Depending on the rate of mobile devices moving through the space defined by the beacon range, and the read frequency of the sensors, the lighting node (e.g., lighting node 102 shown in FIG. 6) may only be active for a small fraction of the time. In that case, the SOC 720 on the sensor controller node 101 is designed to operate at low power such that it may be battery powered for extended periods. The SOC 720 may be programmed to minimize energy consumption by means of a sleep cycle, which represents a computer state that disables the sensors, radios, and generally all high-power CPU functions during a sleep mode and activates the sensors, radios, and generally all high-power CPU functions during a non-sleep mode (or active mode).

The SOC 720 may be programmed to minimize the energy consumption by means of a sleep cycle, which represents a computer state that disables the sensors, radio transceivers, and all high-power CPU functions of the SOC 720. Since the time it takes to park a car in a space is on the order of a few minutes, the sensor (e.g., sensors 714 and 715) only has to read the occupancy (or determine the occupancy of a parking stall or space) and transmit the occupancy status about once per minute in an example embodiment.

Figure 8:
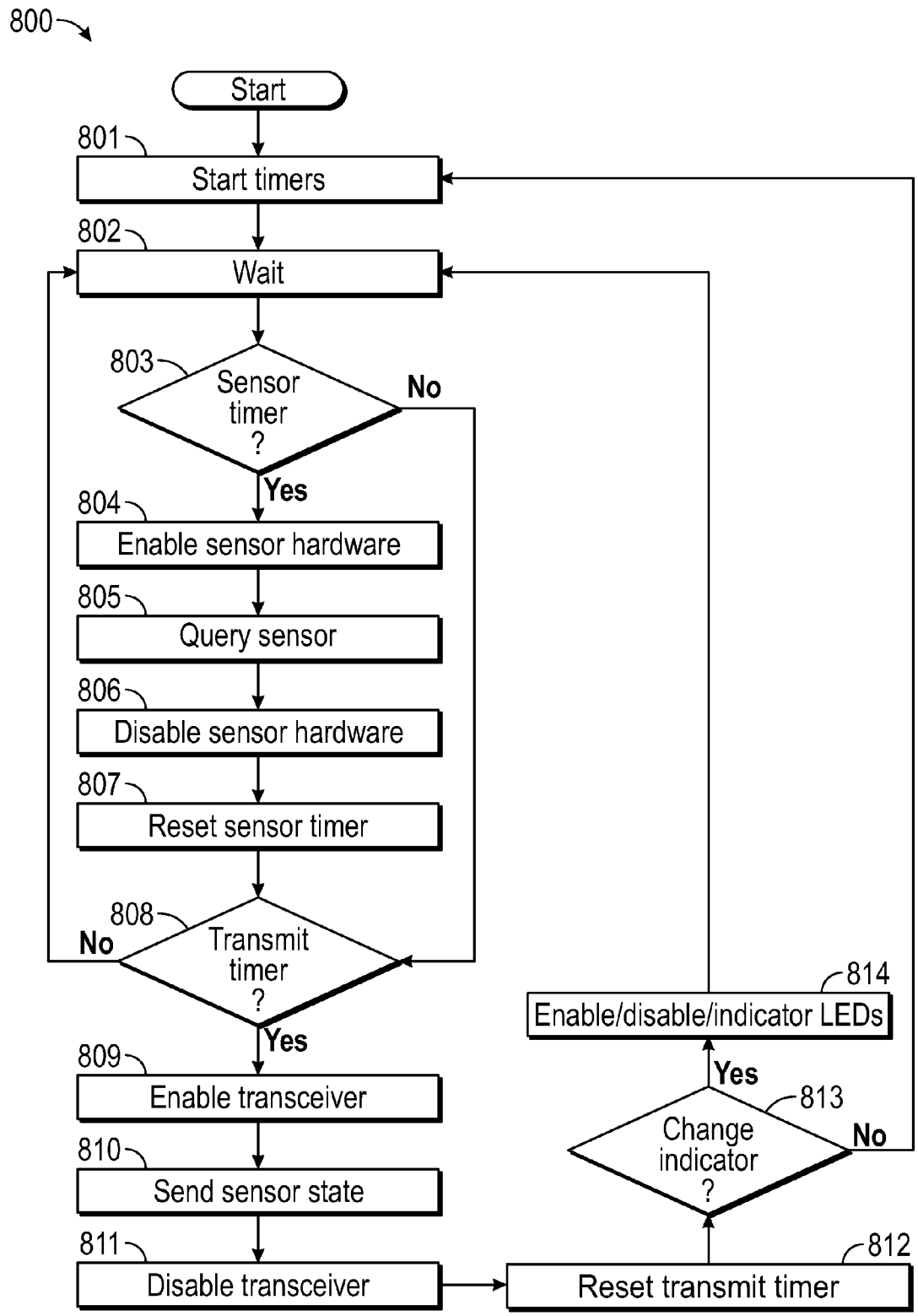
FIG. 8 is a process flow diagram illustrating a method to be performed by a sensor controller node with an integrated sensor and indicator controller according to an example embodiment.

In some embodiments, the sensor controller node 101 may represent a radio module used as a navigation beacon to transmit beacon signals at regular intervals. A flowchart for a method for operating a sensor controller node 101 as shown in FIG. 7B with an integrated sensor and indicator is shown in FIG. 8. The sensor controller node 101 cycles between sleeping, enabling the sensor to measure its state, transmitting the sensor state, and flashing an indicator LED.

With reference to FIG. 8, the method 800 may performed by a processor of a computing device, such as a controller node (e.g., the sensor controller nodes 101 shown in FIGS. 7A and 7B). The operations shown by blocks 801-814 represent an example method 800 for transmitting beacon signals and controlling an indicator (e.g., the LED indicator 711 shown in FIG. 7B). According to the method 800, the energy consumption of the processor of the computing device, such as a sensor controller node, may be minimized by implementing a sleep cycle that uses a timer.

In block 801, a processor of the computing device may start a timer for at least one of a sensor and beacon device. In an example embodiment, the beacon device may be included within a sensor controller node 101 as shown in FIGS. 7A and 7B. In block 802, the processor of the computing device may wait until a determination is made in block 803 as to whether a sensor timer has expired. In response to determining a sensor timer has expired (i.e., determination block 803="Yes"), the processor of the computing device may enable the sensor hardware in block 804 to operate in an active state and may query the sensor to collect sensor data from the sensor in block 805.

After determining that a sensor timer has not expired (i.e., determination block 803="No"), the processor of the computing device may proceed to a determination block 808. If the sensor timer has not expired in block 803 or after the sensor timer is reset in block 807, then in block 808, the processor of the computing device may determine whether a transmit timer has expired. The transmit timer is also referred to as a beacon timer in various embodiments. In response to determining the transmit timer has not expired (i.e., determination block 808="No"), the computing device may continue with the wait operations in block 802.

In response to determining the transmit timer has expired (i.e., determination block 808="Yes"), the processor of the computing device may enable the transceiver in block 809 to operate in an active state. The sensor state is sent by the transceiver (to other lighting nodes or sensor controller nodes) in block 810, the transceiver is disabled to operate in an inactive state in block 811, and the transmit timer is reset in block 812.

In determination block 813, the processor of the computing device may determine whether to change an indicator. In response to determining to change the indicator (i.e., determination block 813="Yes"), the processor of the computing device may enable/disable the indicator LEDs at block 814 and continue with the wait operations in block 802. In response to determining not to change the indicator (i.e., determination block 813="No"), the computing device may continue with the start timer operations in block 801.

As shown in FIG. 8, the sleep cycles may be controlled by separate timers for sensing (e.g., collecting sensor data or detecting events) and transmitting status of the data. In some embodiments, the power consumption may be further reduced by selectively controlling some sleep functions based on the status of motion sensors connected to the service platform. In some embodiments, motion sensors based on passive infrared detection may monitor the presence of moving cars and pedestrians at specific areas. When there is no activity, the indicator LEDs and sensors may be disabled via messages from the server to the lighting node. Sleep cycles and intervals may also be scheduled from the service platform based on the time of day. Network-controlled sleep cycles provide further means of reducing the power consumption of remote devices, thereby increasing their battery lifetime and reducing the size and cost of their photovoltaic (PV) cells. In some embodiments, the transceiver transmits messages at a lower frequency when the sensor reading is constant within measurement error. In another embodiment, the sensor controller mode establishes a connection with a lighting node at a lower frequency to request calibration and software updates.

In embodiments that are implemented using BLE (also marketed as Bluetooth® Smart), transmitters (also referred to as beacons or beacon devices) transmit beacon signals based on radio waves. Beacons may come in many form factors and may be incorporated into or positioned near various nodes in an interactive light sensor network. Accordingly, the beacons are tiny transmitters that dumbly transmit their unique reference IDs. When a BLE-enabled device, such as smartphone, comes into range of one or more beacons, the beacon signal is received (and actioned or acted on where appropriate). Usually, the BLE-enabled device running mobile applications only reacts to beacons associated with specific applications running on the BLE-enabled device. The beacon signals provide location-based information, such as, for example, the distance of a beacon to a beacon-enabled device, which can be determined based on the signal strength of the received beacon signal. In various embodiments, by having beacons in known locations, a receiver of the beacon signal may use triangulation (x, y, z coordinates) to determine its position. In various embodiments, the location of the beacons is stored in a table in the service platform or accessible to the service platform. In various embodiments, the beacon table may be used by the interactive applications to provide updates of an object being tracked relative to beacon nodes within range.

In various embodiments, mobile devices (i.e., within the communication range of beacon signals) may receive beacon signals from lighting nodes within BSCLANs. The received beacon signals may be used by applications to reserve, lease, and purchase resources. In various embodiments, the applications may be referred to as location applications because the beacon signals provide location-based information. In particular, mobile applications executing on mobile devices may navigate using the location-based information provided by the beacon signals. A typical smartphone has four wireless communications technologies: cellular, GPS, Wi-Fi®, and Bluetooth® (including BLE). GPS is typically used for outdoor positioning with accuracy of about 30 feet. This accuracy may be improved when an application on the smartphone (also referred to as a mobile application) interprets the signal strength of a Wi-Fi® or Bluetooth® (Classic or Smart) beacon signal. Wi-Fi® or BLE beacon devices may be deployed within the lighting nodes, and may utilize a standard Wi-Fi® or Bluetooth® beacon signal that may be received by the standard Wi-Fi® or Bluetooth® receiver integrated in the smartphone. In another embodiment, a different protocol may be used with an adapter that connects to the smartphone. Those skilled in the art will recognize that the inventive subject matter is not dependent on a particular radio protocol as long as there is a beacon signal interface available for the mobile device.

In the following descriptions, the term "private" may be used to refer to beacon signals or devices associated with interactive light sensor networks, such as beacon signals transmitted by a lighting node configured to operate as a lighting node. FIGS. 1-4 illustrate example embodiments of interactive light sensor networks that may incorporate private bacon devices. The beacon devices may be incorporated or associated with the various nodes within a LAN (e.g., LAN 100, LAN 200, LAN 300, and LANs 401-404). The various nodes may be the lighting nodes, the sensor controller nodes, the beacon nodes. Private beacon devices may be encrypted such that users log in to access an application that provides a decoding service for the encrypted beacons.

Further, the term "public" may be used to refer to signals or devices that may not be associated with the interactive light sensor network. As described above, a LAN (also referred to as a "BSCLAN") may contain the lighting gateway, lighting nodes, sensor controller nodes, and other network devices that connect the nodes in a LAN to the service platform via a lighting gateway. Various applications hosted by the application software platform, or by the service platform, access data from the service platform to be used by the various applications. The various applications may have corresponding mobile applications executing on mobile devices. The data accessed from the service platform includes data collected by the nodes within the LANs (and further processed by the nodes or by the service platform) of the interactive light sensor network (e.g., lighting nodes, sensor controller nodes, beacon nodes, and other nodes).

On the site of a particular BSCLAN, the beacon signals from lighting nodes of an interactive light sensor network (i.e., "private beacon signals") may define a "geofence." The geofence defines a three-dimensional boundary where the private lighting node signal strength is adequate for standard smartphone navigation. The three-dimensional boundary may be represented by the x, y, and z coordinates.

Encrypted private beacon signals may be sent by Bluetooth® Smart transmitters, which may use Bluetooth® Low energy (BLE) communication protocols in some embodiments. With the proper network permissions, a mobile application running on the user's smartphone may therefore use any combination of multilateration methods—GPS, Wi-Fi®, signals from other beacon devices not associated with lighting nodes of an interactive light sensor network (i.e., "public beacon signals"), and BLE or other private beacon signals, to determine the location of the smartphone within the parking structure or other site, which may represent an indoor location, outdoor location, or a location that is partially indoor and partially outdoor. This hybrid navigation method may be used for indoor applications (or partially indoor applications), such as navigating the user from the parking space to an ultimate destination (e.g., selected by the user associated with the mobile device) within a building or parking structure. All network navigation techniques may be based on multilateration, such that the distance of the positioning device (e.g., beacon enabled mobile phone, a beacon "fob" associated with a tracked object, or other suitable transmitting device) from known lighting nodes is determined by the received signal strength (for Wi-Fi® and BLE for example) or the signal timing (for GPS) as described in "Distance Measurement Model Based on RSSI in WSN", J. Xu et al., Wireless Sensor Network, 2010, 2, 606-611, and "Position Location Techniques and Applications," D. Munoz et al., Academic Press, 2009.

The locating application estimates the distance from each transmitting beacon, and a map of the lighting nodes within a site, to estimate its position by multilateration, where statistical methods such as the least-squares method may be used to find the intersection of the spheres surrounding each beacon. The accuracy is improved by processing more beacon signals from more lighting nodes, and by favoring the signals from closer, better-known lighting nodes.

Figure 9:
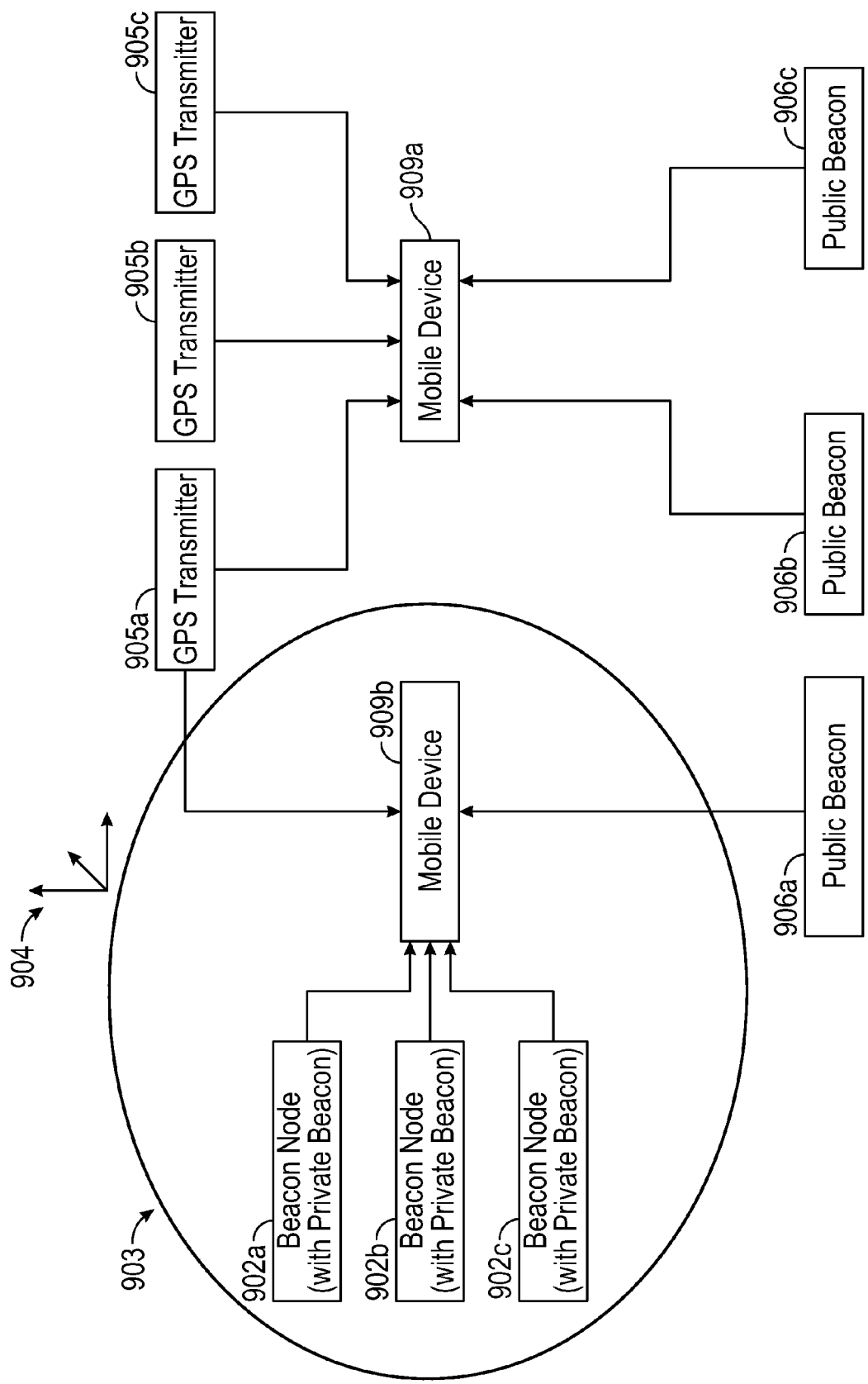
FIG. 9 is a system block diagram showing global and local navigation beacon signals used by a mobile device suitable for use in various embodiments.

Accordingly, FIG. 9 illustrates beacon signals used by mobile devices for navigating cars (and other vehicles) and people to a desired location. The desired destination location may be specified by the user who interacts with the mobile application running on his or her mobile device. FIG. 9 illustrates a geofence 903 which represents a LAN or a partial LAN for a site (e.g., parking garage). A first mobile device 909a is located outside the geofence 903 and a second mobile device 909b is located within the geofence 903 as shown in FIG. 9.

In general, the first mobile device 909a (located outside the geofence 903 (or LAN)) may use standard GPS/Wi-Fi locating, and the second mobile device 909b (located inside the geofence 903) may use the private beacon signals for locating (e.g., handover at a geofence border). For example, an application (or app) on the second mobile device 909b may have access to private lighting node locations, receive beacon data, perform weighted multilateration for locating, render indoor mapping, and/or provide voice directions.

As shown in FIG. 9, a client application running on a mobile device (e.g., a user's smartphone) uses algorithms based on signals from standard GPS transmitters 905a-905c and signals from public beacons 906a-906c, such as known Wi-Fi access points, to (1) provide a neighborhood map of available parking spaces and (2) provide routing and positioning to guide the user to the BSCLAN entrance. At the BSCLAN site, local private beacon-emitting lighting nodes (e.g., 902a-902c) may be used to enhance or replace the GPS transmitters and public beacon devices.

A geofence 903, representing a LAN or a partial LAN, may be defined by the extent of the private beacon signals from private beacon-emitting lighting nodes 902a-902c. In various embodiments, the number of private beacon-emitting lighting nodes within a geofence or LAN for a site may vary. In the exemplary embodiment shown in FIG. 9, a local Cartesian coordinate system is provided to users with its origin at a GPS reference point 904. Each point and network element within the geofence 903 has an associated global GPS reference point and a local positioning coordinate where the GPS reference point 904 has localized Cartesian coordinates of (0, 0, 0). During provisioning of the lighting nodes deployed in the LAN corresponding to the geofence 903, each node is assigned a local position relative to the GPS reference point 904. Although the localized coordinate system 900 may simplify the navigation in the geofence 903, the system 900 does not preclude using GPS coordinates for all lighting nodes. In either case, this does not imply that all lighting nodes may have GPS capability; they may also have their position measured during provisioning and stored in non-volatile memory. In some embodiments, the position information of the lighting nodes with private beacon devices (e.g., 902a-902c) is stored in database(s) within the service platform or stored in database(s) accessible to the service platform. In some embodiments, the position information of the lighting nodes with private beacon devices is used to create virtual maps used for navigation.

In some embodiments, the calculation of the mobile device's location within the geofence (e.g., geofence 903) is performed by a mobile application running on the smartphone by referencing the received beacon signals (transmitted from the lighting nodes having private beacons (e.g., 902a-902c)) to a table storing the beacon location information that is downloaded from the application software platform to the mobile device. In various embodiments, the relevant application running on the application software platform accesses the beacon location information from databases associated with the service platform.

In another embodiment, the calculation of the mobile device's location within the geofence is performed on the application software platform from beacon signals that may be relayed from the smartphone to the application software platform. Advantages of calculating the location of the mobile device using the smartphone may be (1) it is faster, since the response time does not include a delay for network transmissions between the smartphone and the application software platform, (2) it may be more reliable in underground or indoor locations where the smartphone may lose connection with application software platform. In either embodiment, beacon signals may be encoded so that it is more difficult for unauthorized users to make use of the beacon signals.

Some example implementations may use knowledge available to the smartphone application of the mobile device's global location as provided by GPS or other public beacon devices. Other exemplary implementations may use knowledge at the application software platform or service platform of the mobile device's global location as provided by GPS or other public beacon devices. Other exemplary implementations may use knowledge at the application service provider or software platform of the mobile device's precise location within a specific geofence. Other exemplary implementations may use a map (also referred to as a virtual map) of the geofence area to provide off-line navigation instructions to users of mobile devices based on specific user requests. Other exemplary implementations may use a map of the geofence area in combination with knowledge of the mobile device's real-time location to provide step-by-step real-time navigation instructions to the user of a mobile device to a specific set of one or more locations.

Figure 10:
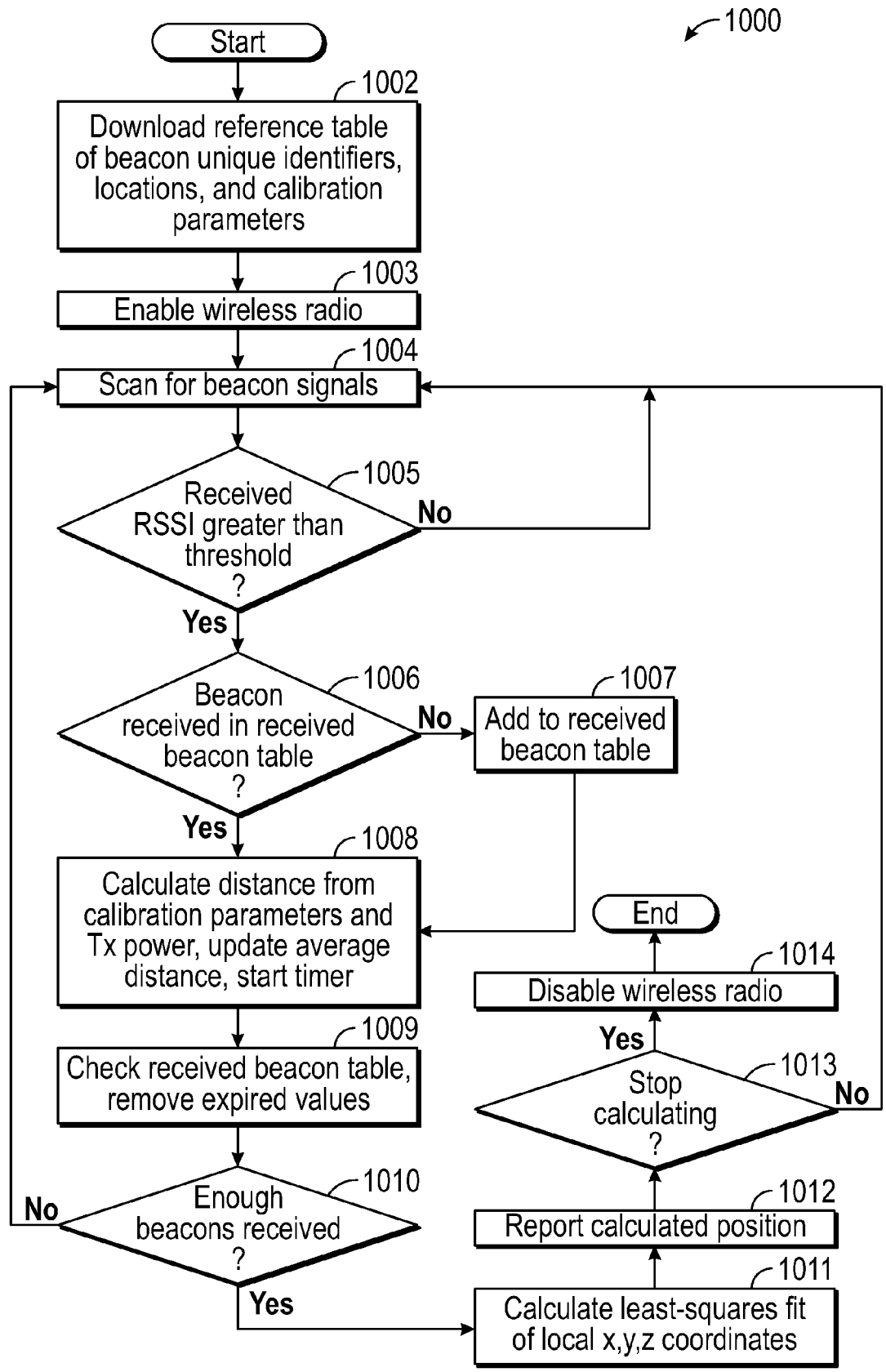
FIG. 10 is a process flow diagram illustrating a method of performing a location calculating algorithm used by a mobile device enabled by beacon signals according to an example embodiment.

FIG. 10 is a flow chart of a method 1000 for calculating the location information of a beacon transmitter (e.g., a mobile device or smartphone) according to an example embodiment. The method 1000 may be performed by an application executing on a mobile device (e.g., a smartphone). In some embodiments, when the mobile device approaches or reaches the geofence boundary (e.g., geofence 903 shown in FIG. 9), it is sent a table (also referred to as a reference table) of the beacon data by the application software platform. This reference table for the beacons within the geofence includes unique beacon identifiers for each beacon and the reference coordinates of each beacon. In various embodiments, the mobile device also maintains a table of received beacon signals and the RSSI associated with each beacon signal with an expiration timer for each received beacon signal. The mobile device calculates its local position by scanning for beacon signals, using the calibration data to calculate the distance to each lighting node, and performing a least-squares multilateration when enough beacon signals may have been received. In some embodiments, timers may be used to remove old beacon signals and filters on the minimum RSSI per beacon signal may be applied.

FIG. 10 illustrates a method of calculating the position or location information of a beacon enabled mobile device according to example embodiments. In other embodiments, the order of some operations shown in the methods 1000 and 1100 may be changed without changing the overall function of the algorithm for calculating position information. Also different algorithms than least-squares multilateration may be applied to the received beacon signals.

With reference to FIG. 10, the method 1000 may performed by a processor of the mobile computing device, such as smartphone or mobile computing device. In block 1001, the method starts when a device (e.g., mobile device 909a) enters the geofence as determined by its GPS coordinates. In block 1002, the processor of the computing device may download a reference table of beacon unique identifiers, locations, and calibration parameters via the mobile gateway (e.g., mobile gateway(s) 110 shown in FIGS. 1-3).

In block 1003, the processor of the computing device may enable the wireless radio to receive the beacon signals. In various embodiments, the beacon signals are transmitted by the various nodes having beacon transmitters in a LAN of a light sensor network. The beacon signals are received by the computing device if the computing device is within the communications range of the beacon transmitters.

In block 1004, the processor of the computing device may scan for beacon signals. Generally, beacon transmitters emit radio signals (also referred to as beacon signals) in all directions at once. The beacon signals have an RSSI (received signal strength indicator) that represents a generic metric that measures the power present in a received beacon signal. In an example embodiment, the range of the beacon signal may extend from a few inches (e.g., 26 inches) to 40-50 meters. In this example embodiment, the wireless receiver (e.g., a beacon-enabled mobile device) will be able to detect or receive (i.e., by scanning) the beacon signals that originated with beacon transmitters (e.g., beacon devices associated with nodes positioned within a LAN of a light sensor network) located 26 inches to 40-50 meters away from the wireless receiver.

In example embodiments, blocks 1004, 1005, 1006, 1007, 1008, 1009 are repeated for the individual beacon signals until block 1010 determines that enough beacon signals have been received.

In block 1005, the processor of the computing device may determine whether the received beacon signal RSSI is greater than a threshold value. In example embodiments, the mobile application is configured with the threshold value. In response to determining the RSSI is not greater than a threshold value (i.e., determination block 1005="No"), the computing device may return to block 1004 to scan for more beacon signals.

In response to determining the beacon RSSI is greater than threshold (i.e., block 1005="Yes"), in block 1006, the processor of the computing device may determine whether the last received beacon is in its received beacon table. In response to determining the lighting node data is not included in the received beacon table (i.e., block 1006="No"), in block 1007, the processor of the computing device may add the last received beacon signal to its beacon table.

In block 1008, the processor of the computing device may calculate distance from calibration parameters and transmission (Tx) power, update average distance, and start a timer. In block 1009, the processor of the computing device may check the received beacon table and remove expired values. In example embodiments, the calibration parameters can include transmit power of the beacon, measured antenna gain of the receiving device, and measured RF loss inside the device (cables, connectors, etc).

In determination block 1010, the processor of the computing device may determine whether enough beacon signals have been received. In response to determining that enough beacon signals have not been received (i.e., determination block 1010="No"), the computing device may continue with the scanning operations in block 1004. In response to determining that enough beacon signals have been received (i.e., determination block 1010="Yes"), in block 1011, the processor of the computing device may calculate least-squares fit of local x, y, z coordinates. In block 1012, the processor of the computing device may report the calculated position.

In determination block 1013, the processor of the computing device determines whether to stop calculating. In response to determining to stop calculating (i.e., determination block 1013="No"), the computing device may continue with the scanning operations in block 1004. In response to determining to stop calculating (i.e., determination block 1013="Yes"), in block 1014, the processor of the computing device may disable wireless radio.

Figure 11:
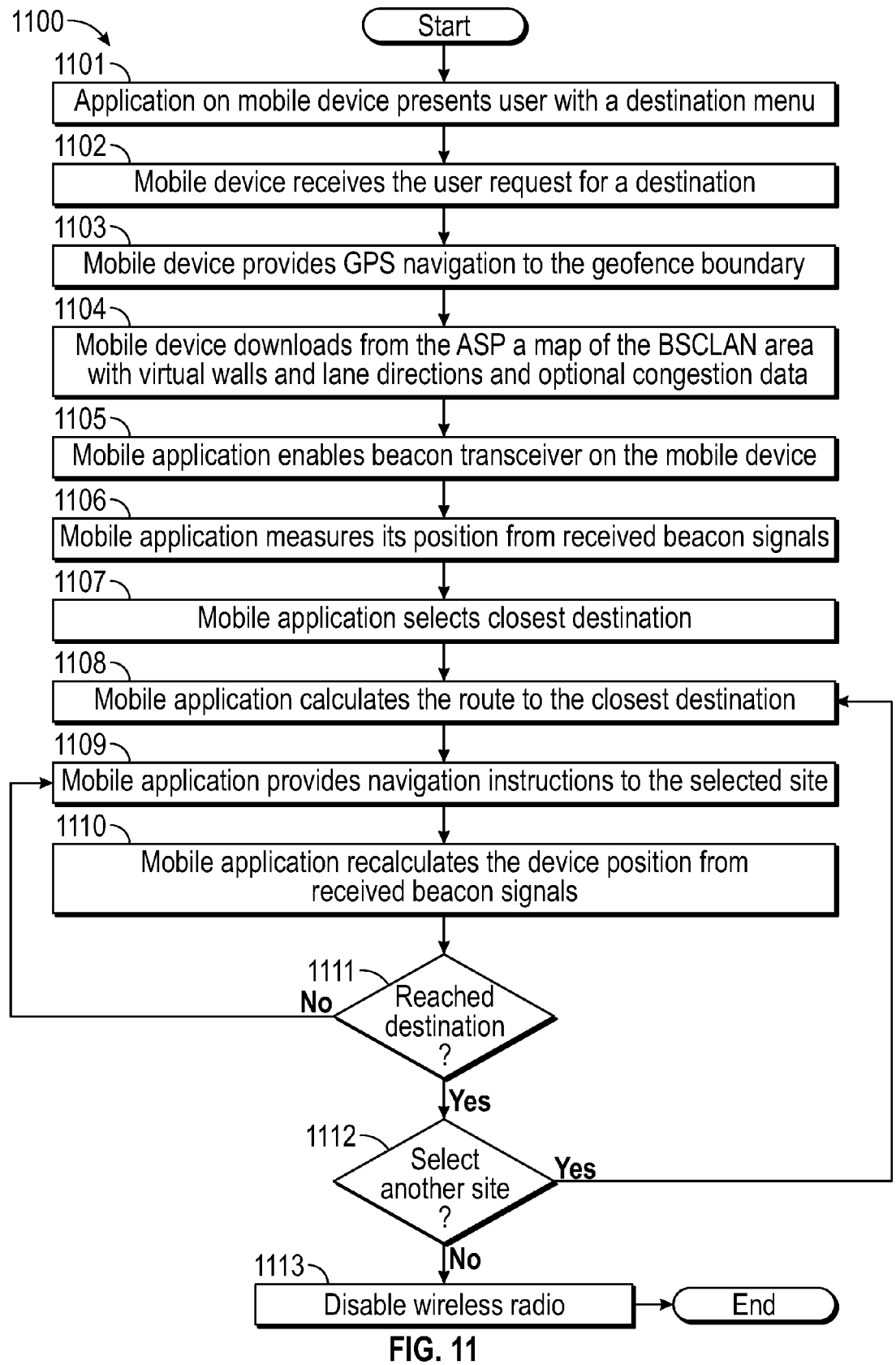
FIG. 11 is a process flow diagram illustrating a method of performing a navigation algorithm used by a mobile device enabled by beacon signals according to an example embodiment.

FIG. 11 shows a flowchart of a method 1100 for providing navigation assistance based on the beacon-emitting lighting node location algorithm shown in FIG. 10. In example embodiments, the method 1100 is performed by a mobile device application executing on a processor of a mobile device. In various embodiments, the user of the mobile device may first select via the mobile device a destination that may be specified in different ways. For example, the user may select the closest parking space to the entrance of a particular store in a mall. Or, they may specify the closest parking space to an elevator or the closest parking space to their ultimate destination within a specified price bracket. Given the user data, the application uses data from the application software platform to determine one or more acceptable destinations.

GPS-enabled navigation methods may be used by the mobile application to navigate to the geofence boundary (i.e., provide navigation instructions to a user for viewing on the mobile device) where the application enables the beacon radio and receives data specifying the local beacon parameters and a virtual map of the BSCLAN area. The local beacon parameters include the location coordinates, calibration parameters, beacon ID, and other information of one or more beacon devices within a LAN from an interactive light sensor network. In various embodiments, the application software platform 108 accesses the local beacon parameters and the virtual map from the service platform 104 and provides the information to the mobile applications running on the mobile devices.

The navigation application, using the local beacon parameters and the virtual map, then selects a destination for navigation based on distance or time of travel. In some embodiments, the navigation application may make use of congestion data at this point to avoid a busy section. In example embodiments, the navigation application uses the algorithm shown in FIG. 10 to continuously update the mobile device location and adjust the navigation instructions. When the user reaches the first destination, they may continue to multiple destinations or end the journey, whereupon the navigation application disables a local radio associated with exchanging beacon signals to conserve battery energy on the mobile device.

Before an application may provide navigation instructions within a local area, location-dependent data such as a virtual map of the area may be loaded into an accessible database maintained by the service platform or the application software platform. The virtual map contains local and GPS coordinates of possible destinations such as vehicle entry/exit points, pedestrian entry/exit points, parking spaces, store locations, etc. The virtual map also contains data of virtual walls that define acceptable lanes of travel within the area, including one-way limitations for vehicles. Virtual lanes may be defined in a space with real and virtual barriers or virtual floors with portals to restrict vehicles to follow prescribed paths when navigating through an area, and weighted lanes—methods of providing directions to limit congestion by alternating traffic assignments.

With reference to FIG. 11, the method 1100 may be performed by a processor of one or more computing devices, such as a mobile device (e.g., a smartphone mobile), an application software platform or a combination of the mobile computing device and application software platform according to various embodiments. For example, one or more components of a navigation software application may be distributed between the application running on the application software platform or service platform, and a corresponding mobile application (or app) running on a mobile device. In other words, any combination of the operations of the FIG. 11 may be performed by one or more devices. In block 1101, the processor of a first computing device (e.g., mobile device) may present to the user, on a user interface, a menu of destinations based on one or more selection parameters. The navigation application may provide a user interface to receive user information, such as one or more user-specified destinations.

In block 1102, the processor of the mobile device receives a user request for a destination. In block 1103, the processor of the mobile computing device may provide GPS navigation to guide the user of the mobile device to a geofence boundary, which includes lighting nodes with private beacon devices. In some embodiments, a combination of GPS navigation and public beacon navigation may be used to guide the user of the mobile device to a geofence boundary. In block 1104, the processor of the mobile computing device may download from the application software platform a map of the BSCLAN area with virtual walls and lane directions and optional congestion data. In some embodiments, the map may be referred to as a virtual map. In other embodiments the function performed in block 1104 may occur at any time after block 1102, i.e., before or during block 1103.

In block 1105, the processor of the mobile device may, via a mobile application, enable a beacon radio on the mobile device to receive beacon signals. In block 1106, the processor of the mobile device may measure its position based on the received beacon signals.

In block 1107, the processor of the mobile device may select or determine a closest destination site or location based on time or distance from the current position of the mobile device.

In block 1108, the processor of the mobile device may calculate the route to the closest destination site. In block 1109, the processor of the mobile device may provide navigation instructions to the selected site. In various embodiments, the instructions are presented to a user on a mobile device or smartphone in block 1110, and the processor of the mobile device may recalculate the mobile device position from the received beacon signals as the mobile device moves or travels. For example, the mobile device may be located in a car that a user is driving.

In determination block 1111, the processor of the mobile device may determine whether the mobile device has reached its destination. In response to determining the mobile device has not reached the destination (i.e., determination block 1110="No"), the computing device may return to block 1109 for updating the navigation instructions. In response to determining the mobile device has reached the destination (i.e., determination block 1110="Yes"), in determination block 1112, the processor of the mobile device may present the user with an option to select another site. In response to the user selecting another site (i.e., determination block 1112="Yes"), the mobile computing device may continue with the calculating route operations in block 1108. In response to determining not to select another site (i.e., determination block 1112="No"), in block 1113, the processor of the first computing device (e.g., mobile device) may disable the wireless radio used for beacon signals.

Figure 12A:
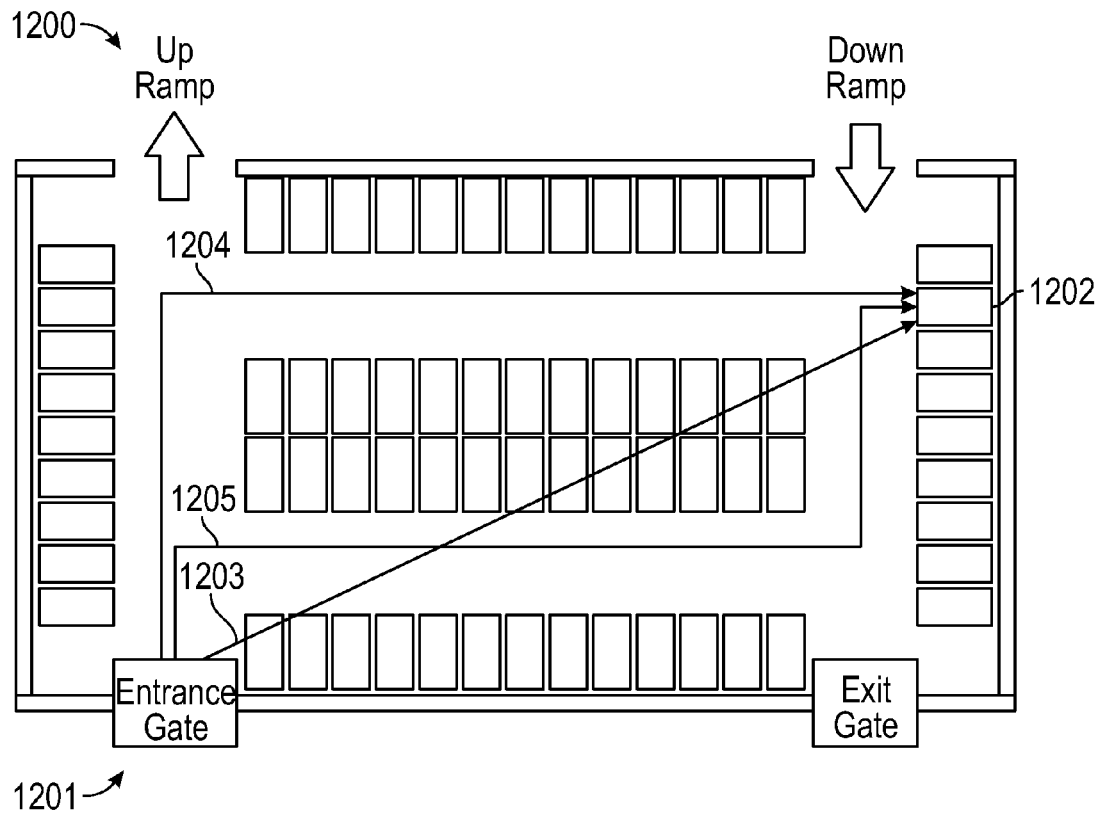
FIGS. 12A-B illustrate plan views of navigation paths through an exemplary parking area suitable for use in various embodiments.

FIG. 12A shows a plan view of an exemplary parking lot 1200 that may be monitored using one or more applications associated with BSCLAN. During the calibration and installation of the network devices (e.g., lighting nodes, etc.), a network operator may draw a software map of the area of interest, or import a map from another software program. In some embodiments, the network operator may represent a service platform provider or a software application platform provider. The network operator may also define navigation barriers or walls within the software map, which may be virtual barriers that define the permitted navigation paths from the lot entrance gate 1201 to a vacant parking space 1202.

Three possible navigation routes from the entrance gate 1201 of the parking lot 1200 to the vacant parking space 1202 are shown in FIG. 12A. The first route from the entrance gate 1201 to the vacant parking space 1202 is via a straight-line route 1203, a first preferred route 1204, and a second preferred route 1205. The straight-line route 1203 is not permitted since it does not constrain the vehicle to the permitted aisles in the parking area. Thus there are two permitted routes. The first permitted route is the preferred route 1204 and the second permitted route is the preferred route 1205. In some embodiments, the route 1204 may be preferred over the route 1205 for a number of reasons, for example, congestion within the parking structure.

Figure 12B:
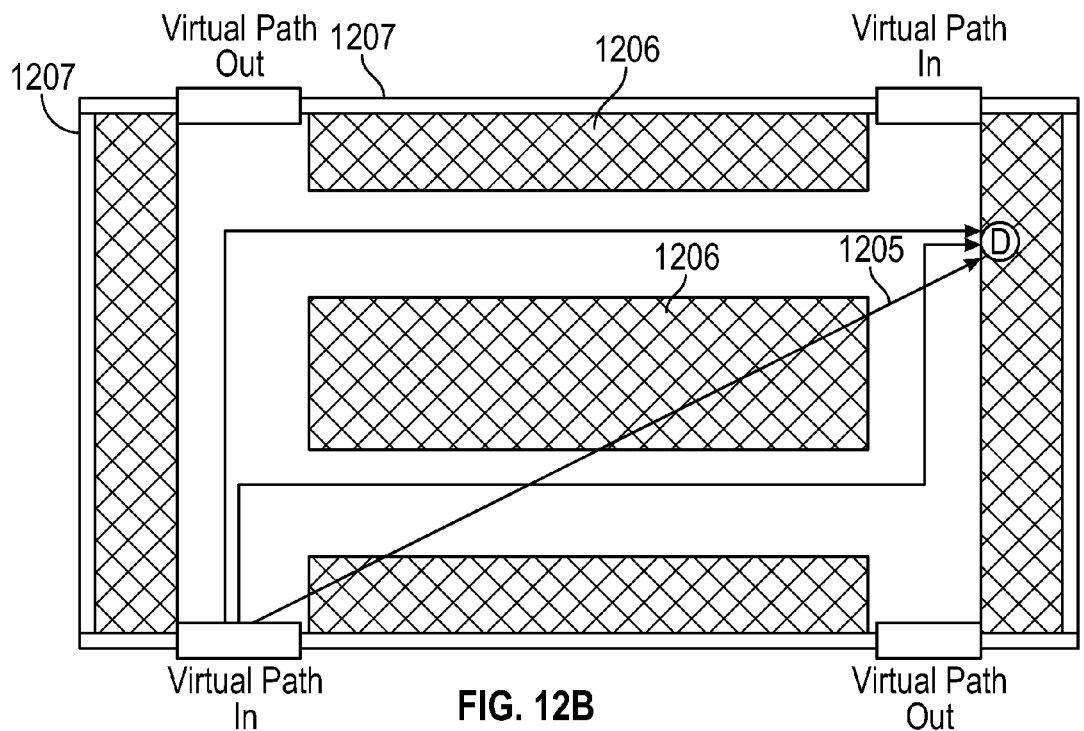

FIG. 12B shows virtual barriers 1206 associated with the parking lot 1200. In example embodiments, the virtual barriers 1206 represent software constructs that designate barriers that the software application must navigate around to reach the destination. The straight-line route 1205 crosses the virtual barriers 1206 so it should not be permitted by the application. Virtual barriers 1206 are different than physical barriers 1207 such as walls in that they can be redefined for different users. For example, when the mobile device is used for vehicle navigation it may have a different set of virtual barriers 1206 than when the mobile device is used for pedestrian navigation.

Figure 13:
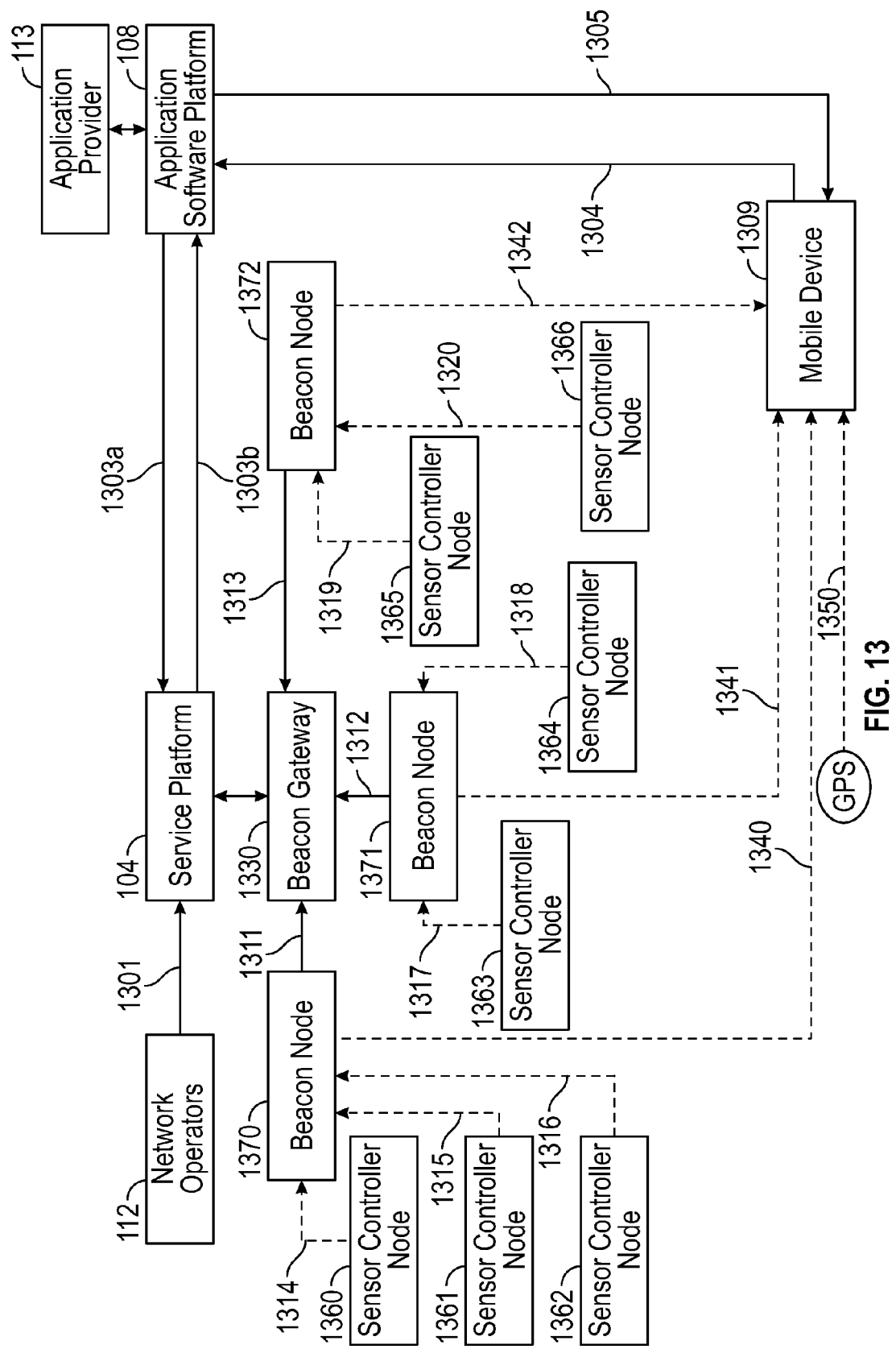
FIG. 13 is a system block diagram used to describe a sequence of events in an exemplary interactive application suitable for use in various embodiments.

FIG. 13 illustrates an embodiment system used to monitor sensor readings and to provide navigation to a destination based on the sensor readings within a site (e.g., parking structure).

One example of this application is a parking lot where the devices of the system monitor parking spaces and provide navigation data to mobile devices carried by vehicle drivers to enable the vehicle drivers to navigate to an available parking space. According to FIG. 13, the service platform 104 receives inputs from network operators 112 that include the lighting node locations and IDs, which are transmitted over communication path 1301. This data may be stored in the service platform 104 and made available to the application software platform 108. In various embodiments, the service platform 104 makes filtered data available to the application software platform 108. In example embodiments, the service platform 104 provisions the lighting nodes (i.e., the lighting nodes may represent the beacon nodes and the sensor controller nodes) to transmit beacon signals with unique identifiers or IDs associated with beacons.

Once the sensor controller nodes (e.g., sensor controller nodes 1360-1366) turn on (e.g., are activated), the sensor controller nodes start sending sensor data to service platform 104 via the beacon gateway 1330. The sensor data is transmitted over communication paths 1314-1320 as shown in FIG. 13. Once the service platform 104, receives the sensor data collected by the sensor controller nodes 1360-1366, the service platform 104 starts updating its database (or associated databases) with the sensor data. In some embodiments, the application software platform 108 polls the service platform 104 periodically for filtered sensor data over communication path 1303a. The sensor data is then transmitted to the application software platform 108 over communication path 1303b. The filtered data may include the debouncing of state transitions (e.g., occupied and/or not-occupied) such that excessive events are not sent to the application software platform 108.

In example embodiments, a resource request from a mobile device 1309 is transmitted over communication path 1304. More specifically, the mobile device 1309 opens a mobile application and sends its current location (from GPS) and the resource request (e.g., a parking space request) to the application software platform 108.

In response to the resource request, the application software platform 108 finds a closest requested resource (e.g., parking space) and sends the GPS location of the closest requested resource to the mobile device 1309 over communication path 1305.

In some embodiments the mobile device 1309 uses GPS and public beacon signals (i.e., transmitted from public beacon devices) to navigate to the geofence. In an example embodiment, the geofence includes the beacon nodes 1370-1372.

Once the mobile device 1309 is at the geofence, the mobile device 1309 receives one or more beacon signals from beacon nodes (e.g., 1370-1372). In the embodiment shown in FIG. 13, the mobile device 1309 receives beacon signals over communication paths 1340-1342. The beacon signals received by the mobile device include location-based information of the beacon nodes 1370-1372. Based on the beacon signals received by the mobile device 1309, the mobile device 1309 (or other computing device) may calculate the distance between the mobile device 1309 and the beacon nodes 1370-1372. In some embodiments, location-based information is transmitted to the application software platform 108.

In example embodiments, the application software platform 108 downloads a local map (e.g., of a site such as parking garage), beacon data (e.g., lighting node locations and IDs), and beacon messages to the mobile device 1309.

In various embodiments, a mobile application on the mobile device 1309 receives the beacon signals (e.g., from one or more of the beacon nodes 1370-1372) and navigates to the requested end point (e.g., a user-selected destination within the site).

In some embodiments, the application (e.g., on the mobile device 1309 or on the application software platform 108) translates beacon IDs to messages (e.g., coupons) and where the mobile device 1309 may act on the messages.

In example embodiment, the sensors connected to sensor controller nodes (e.g., 1360-1366) send resource changes to the service platform 104 over communication paths 1311-1313 to the beacon gateway 1330, which then provides the information to the service platform 104. The service platform 104 then sends update to application software platform 108.

In the exemplary system shown in FIG. 13, there may be no specific messages embedded in the beacon signals (i.e., transmitted by the beacon nodes 1370-1372), and thus the application executing on mobile device 1309 may translate beacon IDs to an embedded table of messages versus beacon IDs. An alternative technique may be to have the application software platform 108 send beacon-specific messages to the service platform 104 and have the service platform 104 send those messages to the lighting nodes (e.g., the beacon nodes 1370-1372 or the sensor controller nodes 1360-1366). The illustrated case may be better because multiple applications (apps) may share data from the same lighting nodes.

An embodiment of an interactive light sensor network (also referred to as an interactive wireless sensor network) may also track objects that carry a small wireless transceiver (e.g., a "fob"). This is useful for facility managers to track equipment or inventory. It may also be used to track persons carrying the fob, for example, parents may track a child in a public area with lighting nodes.

Figure 14:
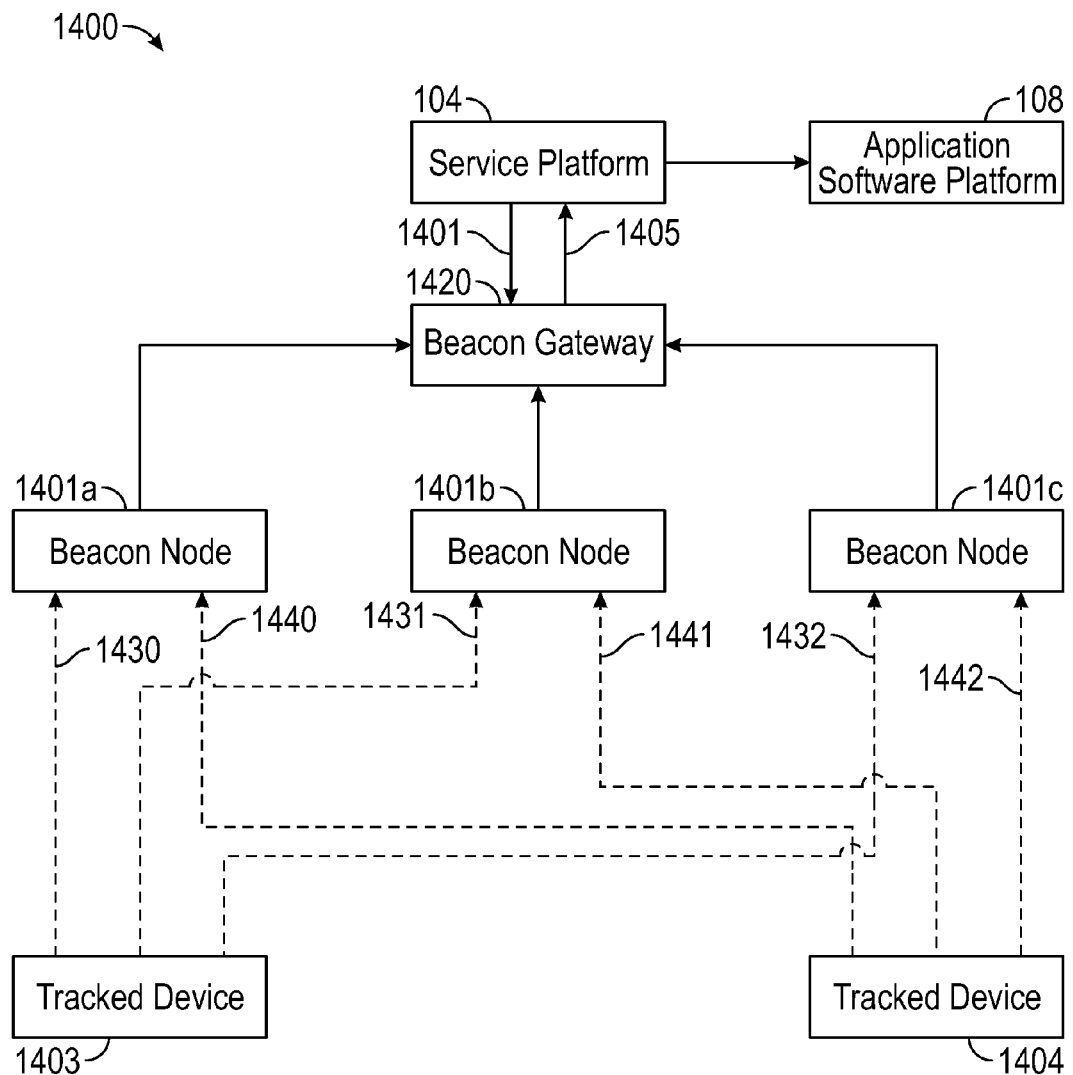
FIG. 14 is a process flow diagram illustrating a method for performing a tracking algorithm used by an interactive sensor network to track a mobile object.

FIG. 14 illustrates an embodiment for a computing device to track objects (e.g., tracked devices 1403 and 1404), such as in scenarios (or use-cases) where devices may be tracked within the BSCLAN. In these scenarios, the service platform 104 transmits to each lighting node (e.g., beacon nodes 1401a-1401c) a table of the unique identifiers of the tracked devices 1403 and 1404. Each tracked device 1403 and 1404 has a wireless transceiver that transmits a beacon signal with a unique identifier that is provisioned in the factory, or provisioned later (on-site) by the service platform. For example, the beacon signals transmitted by the tracking device 1403 are shown by paths 1430-1432, and the beacon signals transmitted by the tracking device 1404 are shown by paths 1440-1442.

In this embodiment, the lighting nodes (e.g., beacon nodes 1401a-1401c) are using their beacon receiver to receive beacon signals from the tracked devices 1403 and 1404. The lighting nodes (e.g., beacon nodes 1401a-1401c) periodically scan for beacon signals from any of the tracked devices 1403 and 1404 and calculate the relative distance to the tracked device with averaging, aging timers, and minimum thresholds. The calculated distances by the lighting nodes (e.g., beacon nodes 1401a-1401c) may be transmitted to the service platform 104 via the lighting gateway (e.g., beacon gateway 1420). The service platform 104 receives notifications from the lighting nodes (e.g., beacon nodes 1401a-1401c) of the tracked signals and performs a least-squares multilateration calculation to estimate and report the position of each tracked object (i.e., tracking device 1403 and tracking device 1404). The service platform 104 may also store the local Cartesian coordinates (e.g., x, y, z coordinates) of each tracked object (e.g., tracked devices 1403 and 1404) versus time (t) so that historical data may be provided via an API provided by the service platform 104. In such tracking scenarios, the lighting nodes (e.g., beacon nodes 1401a-1401c) may always be scanning for tracking devices. Because they may be constantly enabled, they need much more power than intermittent sensor nodes, so they may not run as long on a battery. In some embodiments, the lighting nodes may be located within lighting fixtures or positioned nearby lighting fixtures, which provides very good site coverage and AC power for each lighting node.

With reference to FIG. 14, tracking may be performed by a processor of one or more computing devices, such as the lighting node of an interactive light sensor network (e.g., BSCLAN lighting node), and the computing device of the service platform. In other words, any combination of the tracking operations described with the embodiment shown in FIG. 14 may be performed by one or more devices.

In example embodiments, the processor of the service platform 104 may download a table of unique identifiers of tracked devices to each beacon node (e.g., 1401a-1401c) in the BSCLAN via communication path 1401. The processor of each beacon node (e.g., 1401a-1401c) may periodically scan for beacon signals from tracked devices.

In the embodiment shown in FIG. 14, there are two tracked devices 1403 and 1404. Other embodiments with a different number of tracked devices may follow the same tracking algorithm.

As each lighting node (e.g., beacon nodes 1401a-1401c) receives a beacon signal (e.g., 1430-1432 and 1440-1442), it determines if the tracked device identifier is in the table of tracked devices. If the received signal identifier is in the table, the lighting node calculates the RSSI of the received beacon signal and forwards the RSSI value and tracked device identifier in a message to the service platform 104. In some embodiments, the lighting nodes (e.g., beacon nodes 1401a-1401c) only forward the information if the RSSI is above a specified threshold.

This may be done by each lighting node (e.g., beacon nodes 1401a-1401c) in the BSCLAN. In response to determining the computing device has received a signal with RSSI greater than a threshold, the processor of the computing device may determine whether it received an identifier in the tracking table. In some embodiments, the lighting node (e.g., beacon nodes 1401a-1401c) may calculate the distance from the lighting node (e.g., beacon nodes 1401a-1401c) to the tracked device (e.g., 1403 and 1404) based on the calculated distance to the service platform 104. Each time a lighting node (e.g., beacon nodes 1401a-1401c) receives a beacon signal, it transmits the information to a central computing device such as the service platform 104.

When the central computing device receives signals from enough reporting nodes for a given tracked device, the processor of the central computing device may calculate least-squares fit of local x, y, and z coordinates for the tracked objects (e.g., tracked devices 1403 and 1404). The position of the tracked devices (e.g., 1403 and 1404) may then be reported in real time by the central computing device. In some embodiments, a timer function is used to remove "old" tracking data. In other embodiments a weighting function is used to favor newer tracking data.

In one embodiment application, the hardware and software described herein may provide a system and method for controlling and monitoring parking spaces, and a system and method for providing parking space sensors and indicators, lighting nodes for a navigation system to guide users to available or reserved parking spaces, and for sharing revenue between controlling parties.

Figure 15:
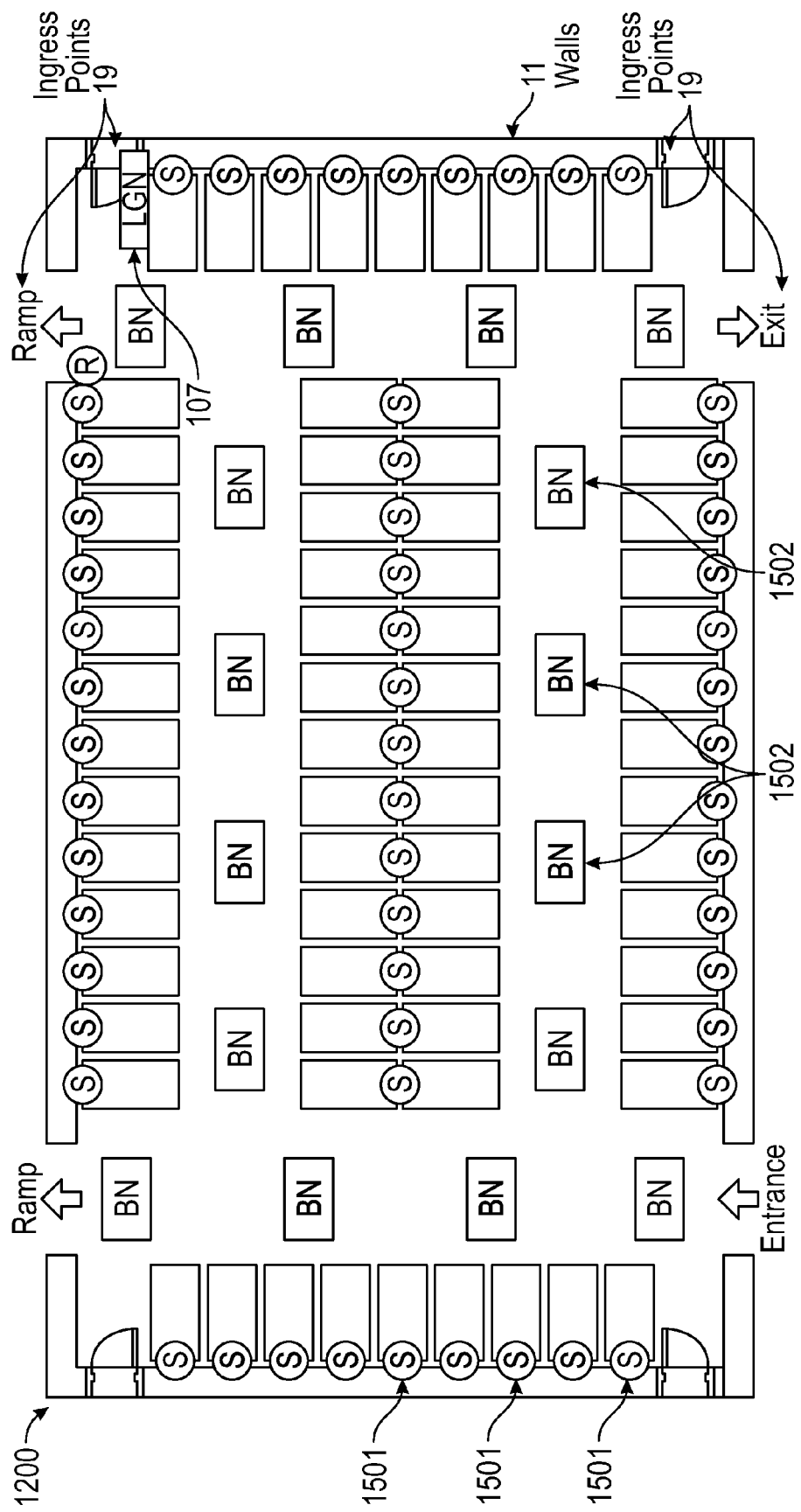
FIG. 15 is a plan view of an exemplary parking lot with device locations for an interactive sensor control network according to various embodiments.

Accordingly, FIG. 15 shows an exemplary layout of a parking system on the ground floor of a multilevel lot 1200. A series of vehicle detection sensors (shown as an S 1501 in FIG. 15) may be positioned, within or adjacent to each parking space in the parking lot 1200. In example embodiments, the sensors 1501 may represent sensors from the sensor controller nodes 101 shown in FIGS. 7A and 7B. The sensors 1501 may operate using any well-known technology which detects the presence or absence of a vehicle parked in their vicinity. Lighting nodes may be located in the parking lot luminaires along with visual indicators to display whether the spaces adjacent to the lighting nodes may be open, occupied, or reserved. The lighting nodes 1502 (shown as BN 1502 in FIG. 15) may have beacon devices (e.g., beacon transceivers) and are also referred to as lighting nodes 1502. This enables a driver in the lot 1200 to locate open spaces and reserved spaces. The software provides an owner interface to the garage owner that shows in real-time which spaces may be available along with historical data on space usage.

The sensors 1501 may be deployed adjacent to the parking spaces so that they can monitor the occupancy of the parking spaces (also referred to as spots). Depending on the type of sensor deployed, and the building layout, the sensor devices (or modules) may be mounted on a wall, ceiling, or floor. In some embodiments, the sensors 1501 are integrated with other electronic modules and facility equipment such as lights, smoke or gas detectors, or heating, venting, and air conditioning (HVAC) equipment. The sensors 1501 transmit the status of the monitored parking space over wireless network to nearby lighting nodes that transmit the sensor data to the service platform (not shown) via a lighting gateway node 107 (shown as LGN 107 in FIG. 15). The service platform transmits state changes to space indicator modules (not shown) that may be attached to the lights in some embodiments. In some embodiments, the indicators may be colored LED lights that provide a visual cue to drivers. In another embodiment the indicators may be software-controlled LED signs that summarize space availability for a specific area such as a floor, or a lane.

The indicator function that provides visual cues may use colored LED lights, with different colors to indicate different states of a parking space, such as (a) available to all users, (b) available to a specified subset of all users, (c) premium with higher rates than other spaces, (d) reserved for handicapped drivers, etc. In some embodiments, red LEDs indicate a space is occupied, and green LEDs indicate a space is vacant. In other embodiments, the indicators may be turned off when a parking space is occupied to save power. In another embodiment, LEDs at indicators along a path may be flashed in sequence to provide a visual path to a driver from the driver's current location (as determined by the network lighting nodes) to the nearest available space. In another embodiment, video monitors or LED/LCD screens may be used to provide information at select points within a parking lot on the overall occupancy, and to provide directions to drivers.

Figure 16A:
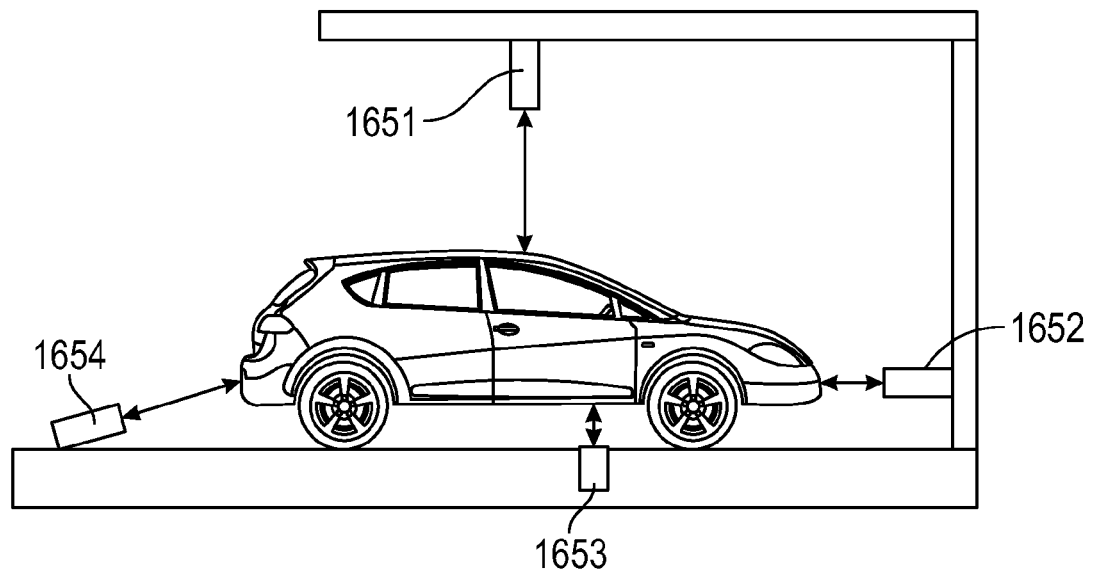
FIG. 16A is a cross-section view of exemplary sensor locations relative to a parking space when the space is occupied suitable for use in various embodiments.
Figure 16B:
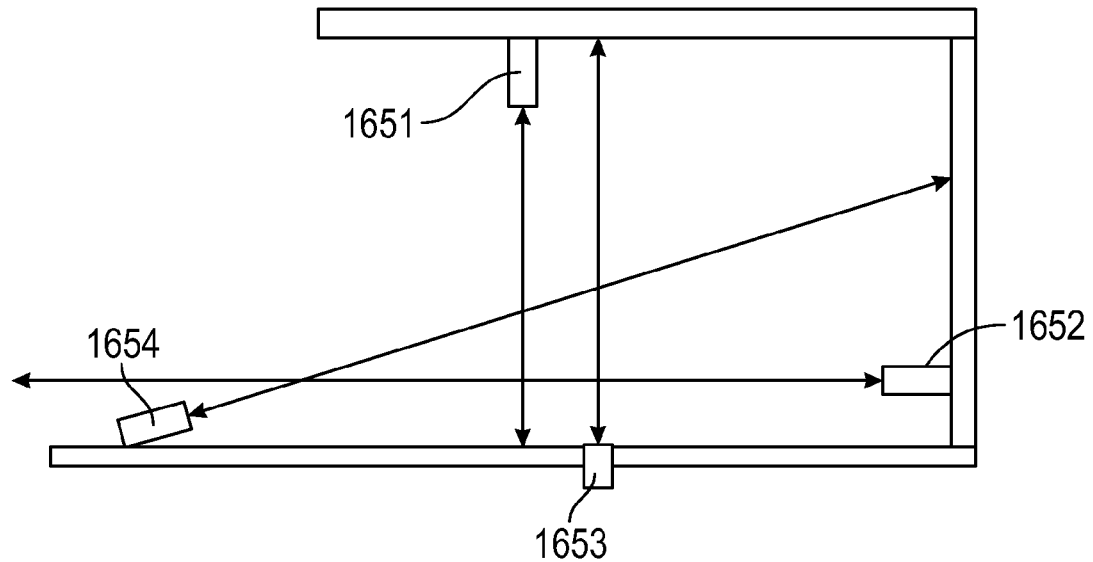
FIG. 16B is a cross-section view of exemplary sensor locations relative to a parking space when the space is vacant suitable for use in various embodiments.

In addition to providing navigation to a parking space, various embodiments may include monitoring the occupancy of parking spaces. FIG. 16A shows an embodiment where a proximity sensor is placed on the ceiling over the parking space (position 1651), the wall facing the space (position 1652), on the floor in the middle of the space (position 1653), or on the floor aimed at an angle towards the space (position 1654). In example embodiments, a sensor mounted in the ceiling (position 1651) since it is out of reach from vehicles, but floor sensors (positions 1653, 1654) may be required for parking areas where there is no ceiling. The sensor measures the difference in distance to a parked vehicle (example shown in FIG. 16A) and to the opposite wall when the space is vacant (example shown in FIG. 16B). The sensor must be selected so that there is a significant difference in the measured signal between the occupied case (FIG. 16A) and the vacant case (FIG. 16B).

Exemplary proximity sensors may be based on any of the following technologies: sonar proximity sensor that detects the time of flight of reflected ultrasound pulses, radar (e.g., as may be described in U.S. Pat. No. 8,441,397) or Lidar (e.g., as may be described in U.S. Patent Publication 2013/0265563) or sensors that detect the time of flight of pulsed, high-frequency radio waves or optical waves (e.g., as may be described in U.S. Pat. No. 5,793,491), triangulation optical detectors that use a linear detector array to measure the angular offset of a reflected beam, and phase shift optical detectors that measure the distance-dependent phase shift of reflected light from an object (e.g., using a technique that may be described in U.S. Pat. No. 7,304,727). In another embodiment, electromagnetic field sensors, such as an induction coil described in U.S. Pat. No. 6,999,882, located underneath the vehicle (such as at position 1654) may detect the alteration of a magnetic or electric field caused by a vehicle.

Figure 17A:
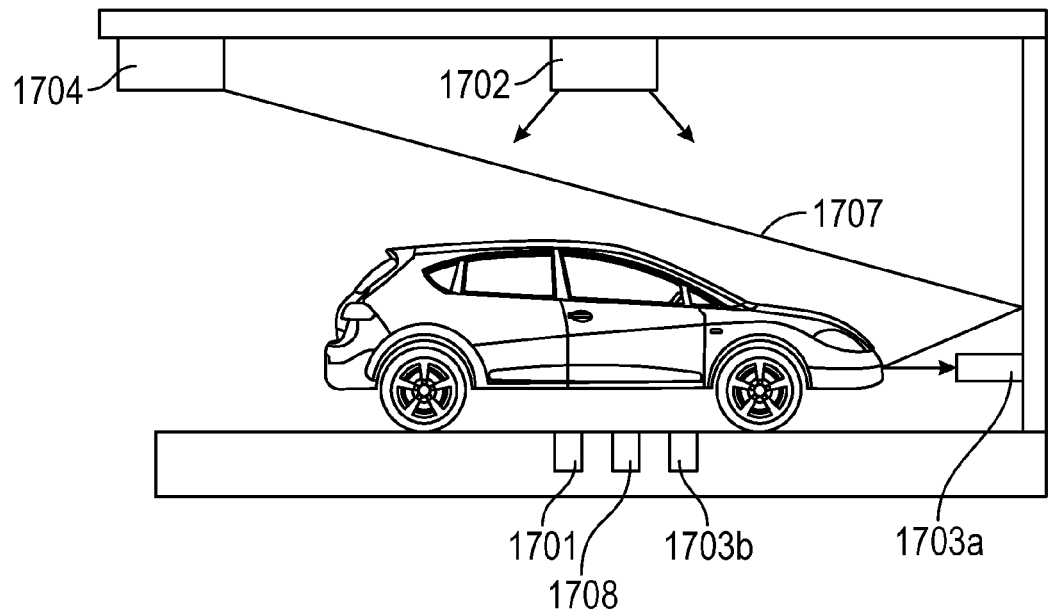
FIG. 17A is a cross-section view of exemplary radio waves between two transceivers relative to a parking space when the space is occupied suitable for use in various embodiments.
Figure 17B:
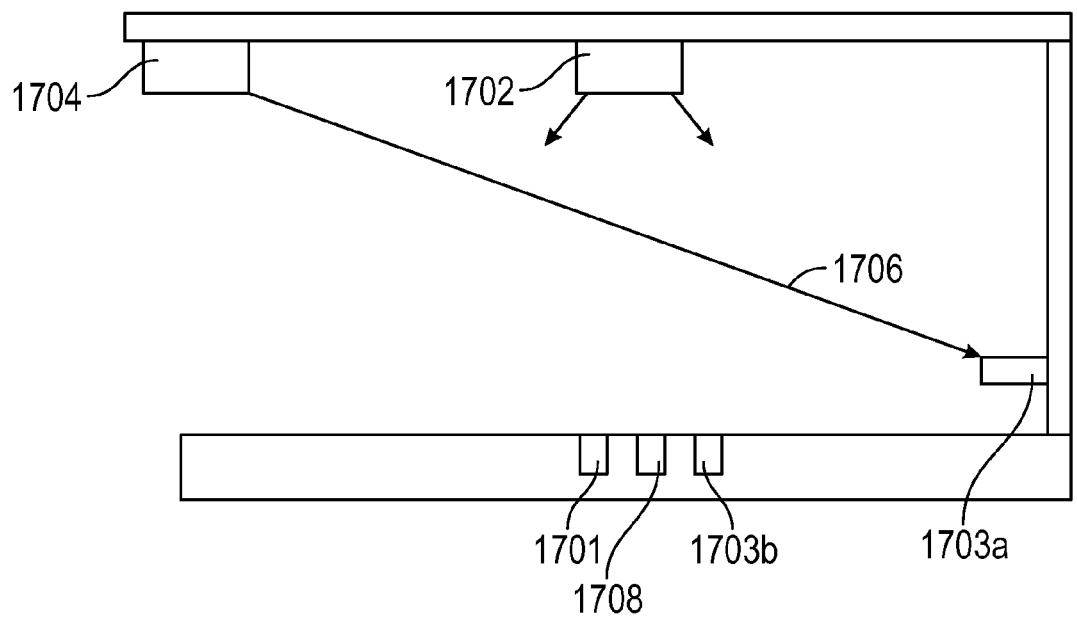
FIG. 17B is a cross-section view of exemplary radio waves between two transceivers relative to a parking space when the space is vacant suitable for use in various embodiments.

FIG. 17A-17B show embodiments where sensors monitor the transmission of electromagnetic waves; whereby the presence of a vehicle significantly changes the received electromagnetic wave. For example, a color or lux sensor 1701 may be positioned below the vehicle so that the vehicle creates a shadow of the artificial light 1702 or natural light on the sensor 1701. 1703b also represents a sensor. In another embodiment, a first radio 1703a may measure the received signal strength from a second radio 1704, where the two radios 1703a and 1704 may be positioned so that the presence of the vehicle significantly affects a change in received signal strength. The radio transceiver may also measure the change in propagation distance between a direct radio signal 1706 (when the space is vacant), and a reflected radio signal 1707 (when the space is occupied). In another embodiment, a magnetometer 1708 placed under or over each vehicle may measure perturbations in the earth's magnetic field when the vehicle is present.

Figure 18A:
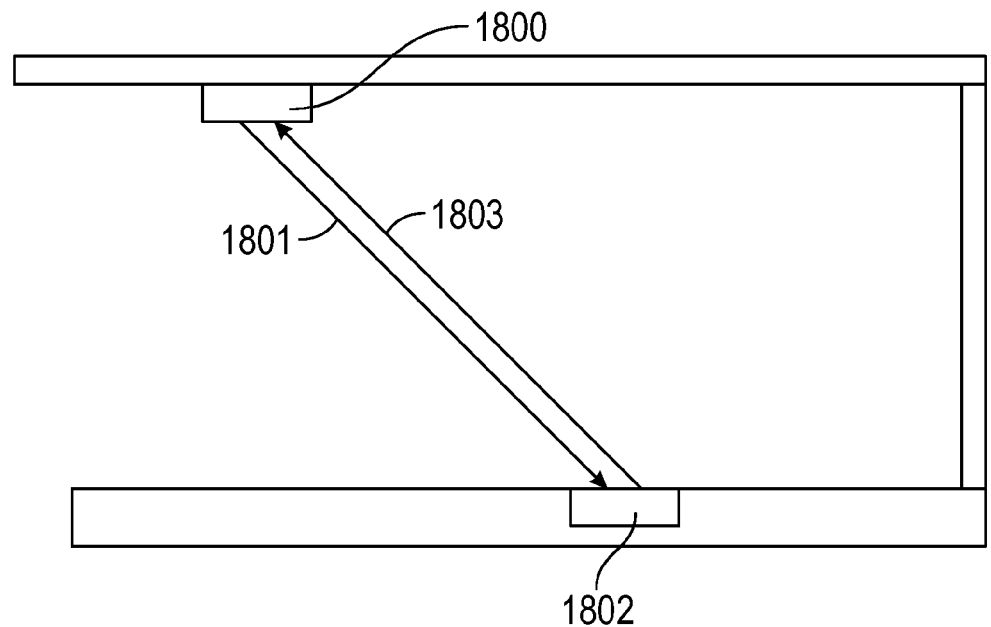
FIG. 18A is a cross-section view of an exemplary radio frequency ID (RFID) reader relative to a parking space when the space is vacant suitable for use in various embodiments.
Figure 18B:
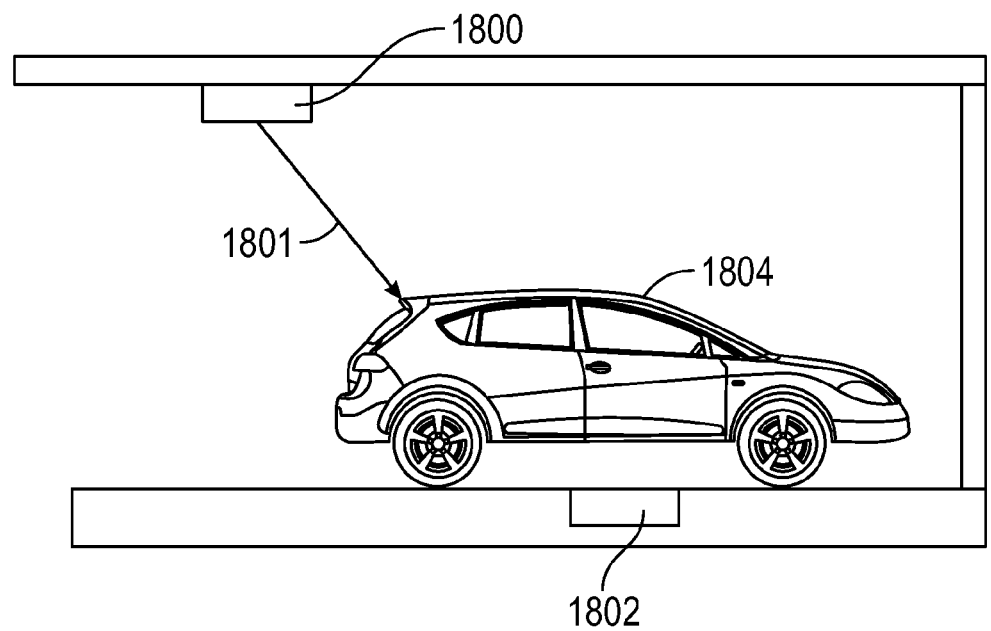
FIG. 18B is a cross-section view of an exemplary RFID reader relative to a parking space when the space is occupied suitable for use in various embodiments.

FIGS. 18A and 18B show an embodiment of a vehicle sensor based on attenuation of radio frequency identification (RFID) devices, (e.g., using a technique that may be described in U.S. Pat. No. 4,384,288). In FIG. 18A an RFID reader 1800 queries an RFID tag 1802 with a transmitted signal 1801 and interprets the response 1803 from the RFID tag 1802. RFID tags may be passive, semi-passive, or active. In example embodiments, an RFID tag 1802 may be placed near the middle of parking spaces so that a vehicle 1804 will attenuate the direct line of sight between the reader 1800 and the tag 1802 as shown in FIG. 18B. The actual attenuation of the signal depends on various factors such as the vehicle geometry and presence of RF reflective surfaces.

The RFID reader 1800 may receive the tag's response 1803 when a vehicle is present, depending on the attenuation and RFID reader's transmitter power and receiver sensitivity. The presence of a vehicle 1804 is determined for a given RFID tag 1802 by gradually cycling the RFID transmitter power as the tag is read. During a calibration cycle when the parking lot is empty, the reader 1800 measures the minimum power level at which a tag 1802 may be read. This value is stored in the memory of the CPU that controls the RFID reader 1800. When cars may be present, the RFID reader 1800 measures a significantly higher minimum power level required to read a tag that is blocked by a vehicle. FIG. 18A and FIG. 18B show an example of an RFID reader 1800 querying a single RFID tag 1802, but this method may be used to query multiple tags at multiple spaces within range of the RFID reader.

Figure 19:
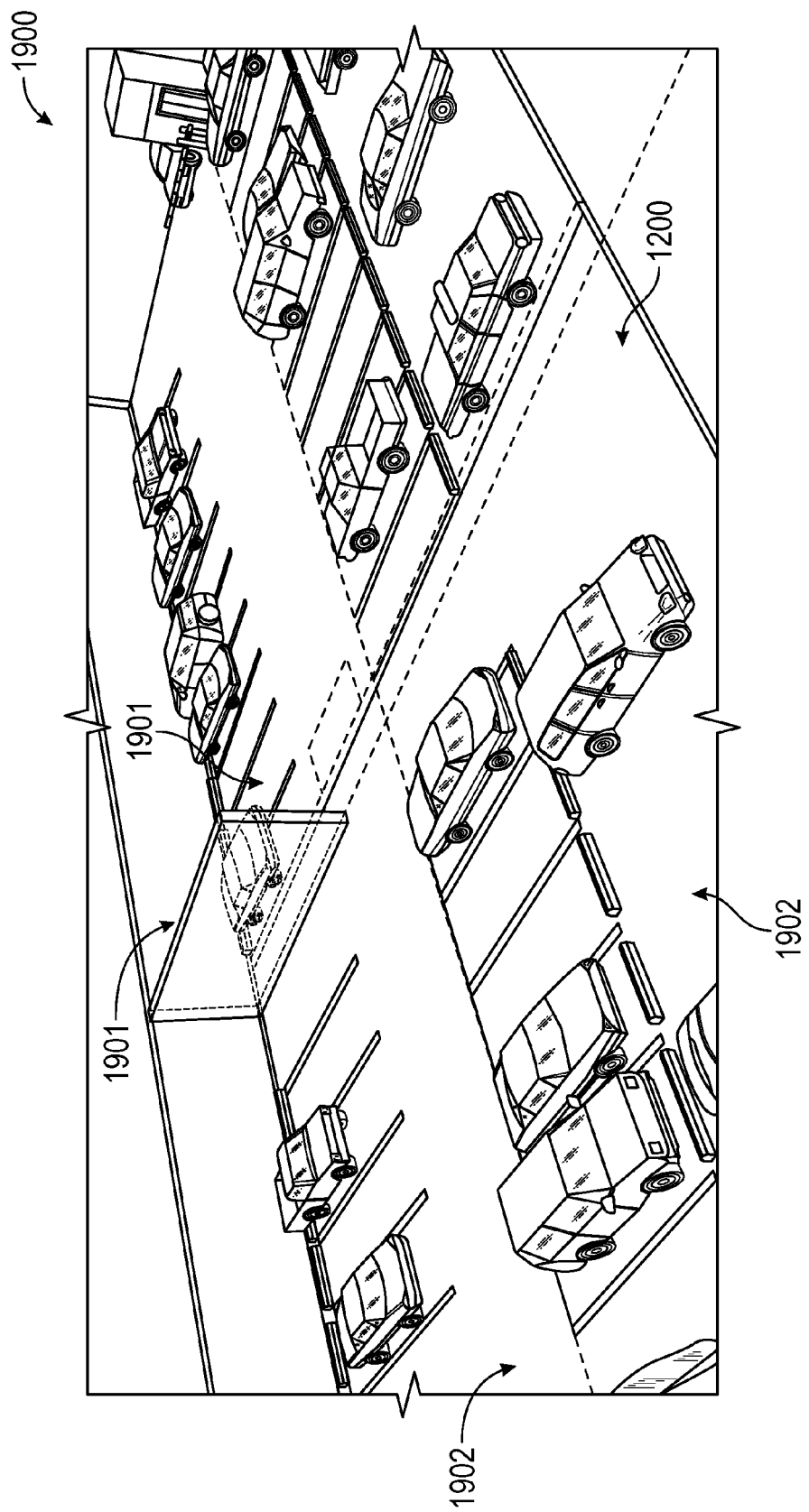
FIG. 19 is an example perspective of a field of view of a camera that is mounted to overlook a parking area suitable for use in various embodiments.

In other embodiments, a plurality of parking spaces may be monitored by a digital camera connected to hardware and software that perform shape analytics (e.g., using a technique that may be described in U.S. Pat. No. 7,986,339), a laser scanner that measures depth by triangulation of laser lines on a camera (e.g., using a technique that may be described in Publication WO 2011053969), a radar sensor connected to a plurality of pointing antennas, and/or by scanning a single, pointed sensor across the spaces (e.g., using a technique that may be described in U.S. Pat. No. 5,793,491). In these cases a central location with an unobstructed view of multiple parking spaces is used. Typically, the higher such a multiple-vehicle sensor may be mounted, the more spaces it may monitor. FIG. 19 shows an example field of view of a camera 1900 that is mounted to overlook a parking lot 1200. Partially or fully obstructed spaces 1901 and spaces that may be beyond the camera field of view 1902 may be monitored by one or more additional cameras.

Figure 20A:
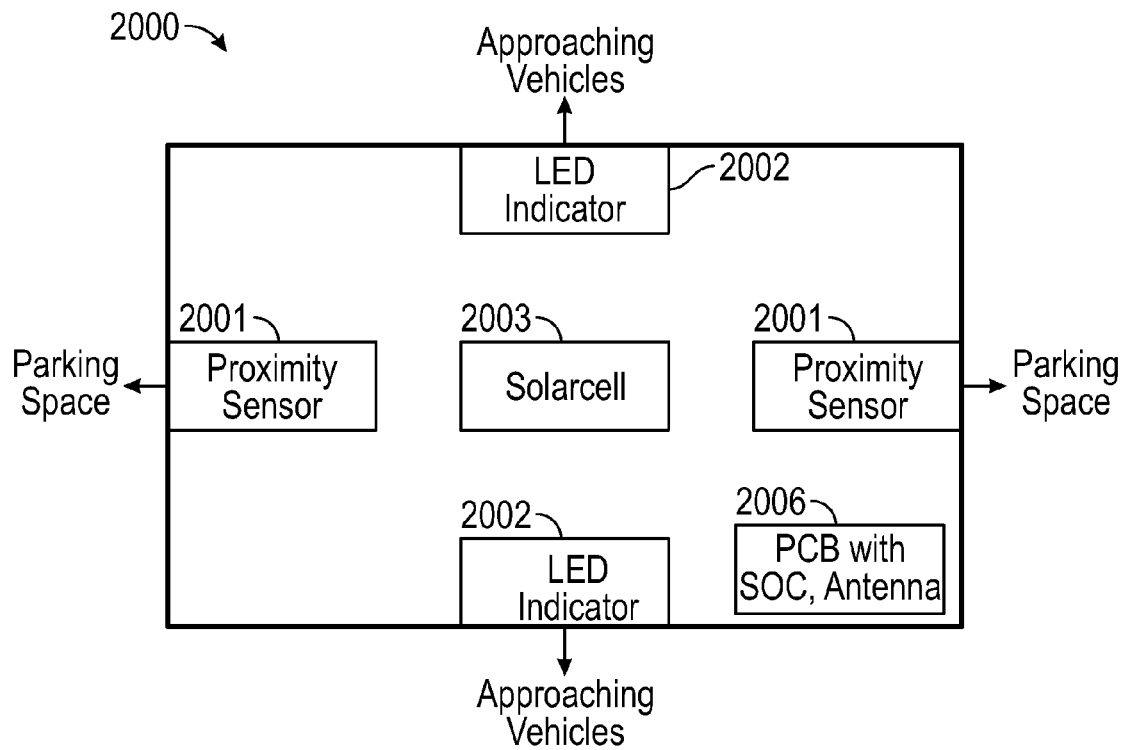
FIG. 20A is a plan view of an exemplary sensor controller node with integrated proximity sensor and indicator controller suitable for use in various embodiments.

FIG. 20A shows a plan view of an embodiment integrated remote sensor and indicator module 2000 based on a magnetic, optical, or sonar proximity sensor 2001. LED indicators 2002 may be pointed in the direction of approaching vehicles and proximity sensors 2001 may be pointed towards the parking spaces. A printed circuit board (PCB) with a system on a chip (SOC) that integrates the wireless transceiver, antenna, and CPU may read the sensors 2001 and transmit the sensor values (also referred to as sensor data) to a nearby lighting node. In example embodiments, this indicator module 2000 is placed on the ground in the middle of an aisle with parking spaces on either side in locations where there is adequate light to power the module 2000 by means of its solar cell 2003.

Figure 20B:
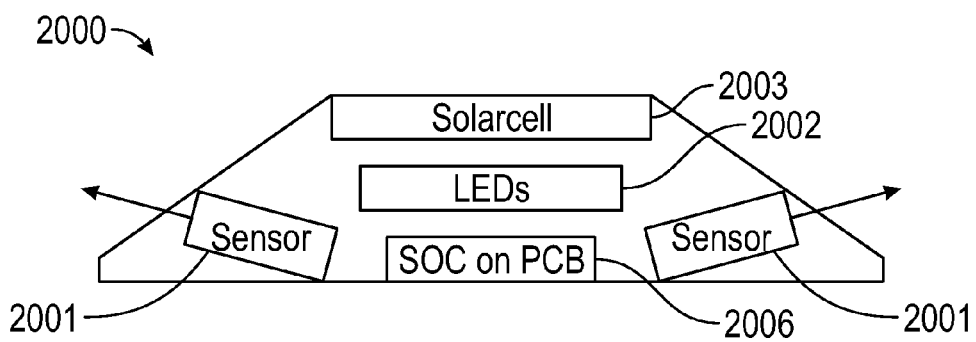
FIG. 20B is a cross-section view of an exemplary sensor controller node with integrated proximity sensor and indicator controller suitable for use in various embodiments.

FIG. 20B shows a cross-section view of the embodiment device of FIG. 20A, where the proximity sensors 2001 may be pointed at an angle towards the parking spaces, as shown for the position 1652 in FIG. 16A.

Figure 20C:
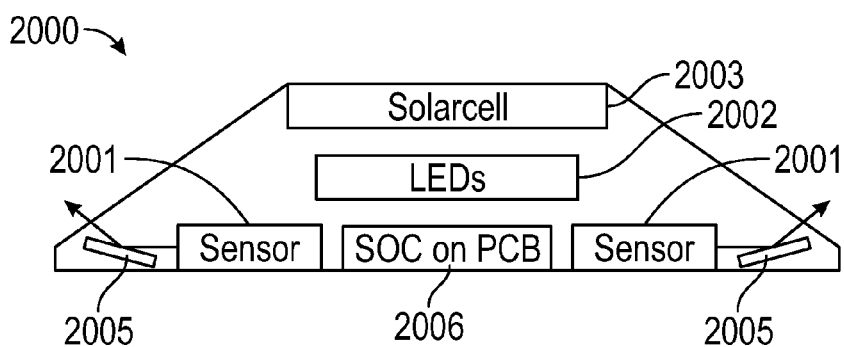
FIG. 20C is a cross-section view of an exemplary sensor controller node with integrated proximity sensor and indicator controller suitable for use in various embodiments.

FIG. 20C shows a cross-section view of another embodiment device, where mirrors 2005 may be used to point the sensors 2001 at an angle towards the parking spaces. Mirrors 2005 may be better for pointing the sensors 2001 so that they can be used at different mounting heights and distances.

Figure 20D:
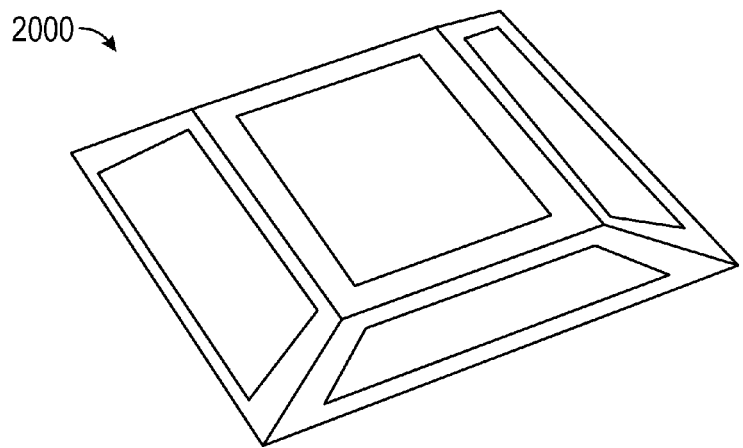
FIG. 20D is a perspective view of an exemplary sensor controller node with integrated proximity sensor and indicator control suitable for use in various embodiments.

FIG. 20D shows a perspective view of an embodiment sensor device (or sensor and indicator module). The sensors, indicator LEDs, solar cell, and SOC may be packaged in a metal or plastic package that may be strong enough to be placed in a driving aisle, held in place by epoxy, or by embedding the module in a depression in the road. In some embodiments, the device may be mounted on the floor (top floor) or ceiling (underground), and may be capable of detecting multiple parking spaces (e.g., two, four, etc.). In some embodiments, a plastic base may be included in the device that supports the weight of cars, and that may be transparent to RF. Furthers, software executing via the device may control occupancy sensors and may cause the LEDs to light or flash only when a car is present.

Shown in FIGS. 20A-20C, the SOC module 2006 may be programmed to minimize the energy consumption by means of a sleep cycle. This is a computer state that disables the sensors, radios, and all high-power CPU functions. Since the time it takes to park a car in a space is on the order of a few minutes, the sensor device only has to read the occupancy and transmit the status about once per minute. If the radio module is being used as a navigation beacon, it also has to transmit a beacon at regular intervals. An example method 800 that may be implemented by the integrated sensor and indicator module 2000 is described above with reference to FIG. 8. The sensor cycles between sleeping, enabling the sensors to measure occupancy, transmitting the occupancy state, and flashing the indicator LEDs.

For example, as shown in the method 800 described in FIG. 8, the sleep cycles may be controlled by separate timers for sensing and transmitting status. In some embodiments, the power consumption may be further reduced by selectively controlling some sleep functions based on the status of motion sensors connected to the network.

Such parking spaces (e.g., of an exemplary parking area lighting infrastructures) may be associated with various identifiers, such as a first ID for the parking lot and a second ID for the exact parking space in the parking lot. Such information may be stored in a server or accessible by the server (e.g., server associated with the application software platform) that may provision various information from infrastructure or site owners (e.g., parking space owners), such as GPS coordinates adequate to identify a surface (e.g., polygon) that encloses all lighting nodes of the infrastructure (e.g., all lighting nodes with the assumption that there may be no isolated lighting nodes), a number of available parking spaces as well as associated time limits and parking fees, a map and number assignment of parking slots, and/or a table of parking space properties per parking space (e.g., available time, handicapped, cost per time, etc.). The server may further maintain various information for each parking space of the parking area, such as a table of parking space numbers, properties, reserved status, and vacant\occupied\illegal status, a code for reserved parking spaces, a code for reserved parking spaces (e.g., data maintained by server so parking space owner does not need to know the code, just reserved status). The server may also be configured to conduct spot (e.g., parking space) acknowledgements As an illustration of provisioning, a computing device (e.g., a server associated with application software platform) may perform an initial setup procedure when provisioning (e.g., mapping) a parking area. Such an initial setup may include provisioning GPS coordinates of entrance ramps, local coordinates of parking spaces, parking space numbers, parking space orientations, lighting node locations and IDs, locations of walls, ramps, aisles, traffic directions, as well as receiving a map of parking area with traffic designators, a table of lighting node locations and IDs.

In various embodiments, client software (e.g., an app executing on a mobile device of a user, etc.) may have the following features and/or functions related to parking spaces in a parking area lighting infrastructure: obtain and display a map of all parking spaces available within an area, parking space selection and reservation; after choosing a parking space, receive from server (e.g., application software platform) any of GPS coordinates of the parking space, GPS polygon encircling the lighting nodes, a table of the lighting nodes related to the parking space (e.g., IDs and fine location information, etc.), a map of all parking spaces at the parking area (e.g., cross streets, entrances, etc.), an internal map (e.g., data that is more accurate than GPS, has granularity with ramps, story number, parking spaces, etc.) that may be capable of being superimposed on a parking space map, and a table of lighting nodes within the parking space area (e.g., lighting node IDs and relative coordinates, etc.); obtain GPS directions that turn on BLE triangulation when a vehicle enters the parking area (e.g., when within a GPS polygon, or within a certain number of feet of an entrance, etc.); perform BLE triangulation related to receiving signals from a local lighting node, wherein the software may find locations on an internal map, show locations on the internal map, and provide directions to a parking space; and provide parking space acknowledgement for reserved parking spaces and paid parking (e.g., in response to a user clicking a button in an app, an LED indicator associated with a lighting node in the parking area may blink, etc.).

In some embodiments, parking space acknowledgement may be achieved locally, such as via BTLE signals from various nodes within a lighting infrastructure (e.g., parking lot, etc.), or via messages from a cellular network.

Such functionalities may be used to enable mobile devices to reserve parking spaces in a lighting infrastructure. For example, a user with a smartphone with BLE capabilities may be capable of performing operations to identify various information about a parking lot useful in investigating and/or reserving a parking space, such as whether there are gates (or no gates but limited entrances), unlimited street entrances, an outdoor ground level, multi-levels, underground parking, whether there are beacon-emitting lighting nodes, etc.).

Figure 21:
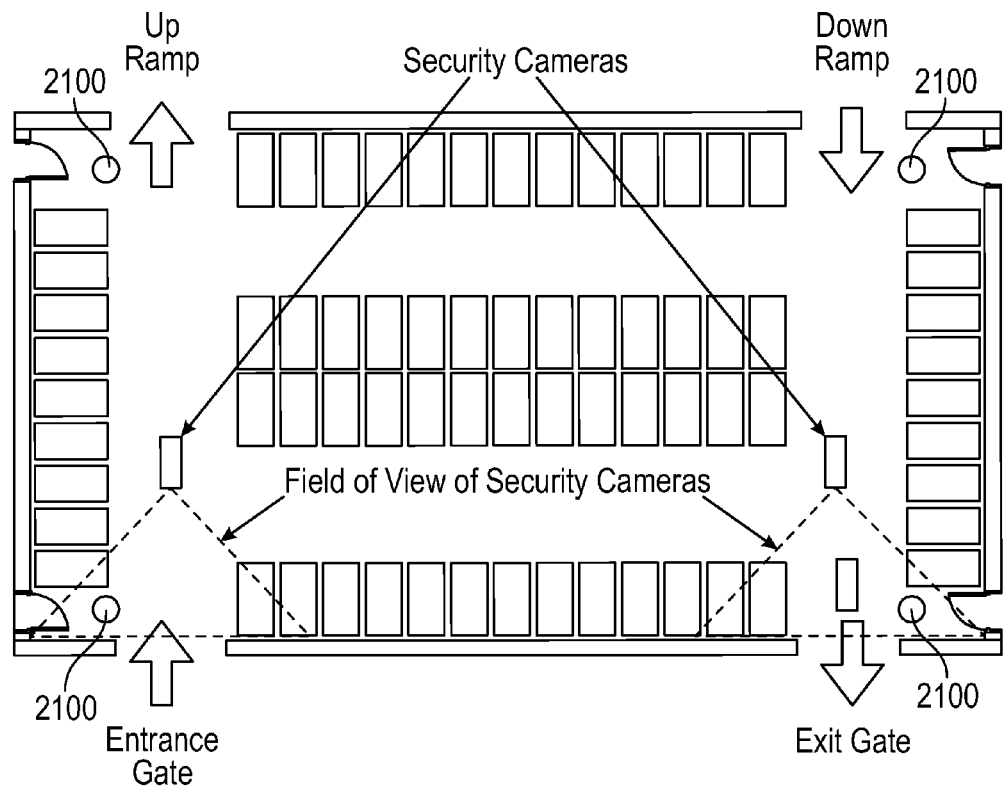
FIG. 21 is a plan view of the exemplary parking lot from FIG. 12A with device locations for camera and occupancy sensor control nodes suitable for use in various embodiments.

FIG. 21 shows the plan view of one floor of a parking lot 1200 with an exemplary placement of motion sensors 2100 at all vehicle and pedestrian ingress points according to an example embodiment. The motion sensors 2100 may be connected via a wired or wireless network to the same service platform that monitors and controls the parking space monitors and indicators. Motion sensors 2100 based on passive infrared detection may monitor the presence of moving cars and pedestrians at specific areas. When there is no activity, the indicator LEDs and sensors may be disabled via messages from the server to the control modules. Sleep cycles and intervals may also be scheduled from the server based on the time of day. Network-controlled sleep cycles provide further means of reducing the power consumption of remote devices, thereby increasing their battery lifetime and reducing the size and cost of their photovoltaic (PV) cells. Wireless modules may be preferred in all cases to greatly reduce the installation costs. Passive RFID tags 1802 with an active reader 1800 provide an example where the sensor elements may be remotely powered from a location that has access to an AC power source, such as in a ceiling light.

Various examples of methods, systems, and apparatus are described above to (1) map parking spaces and provide exterior and interior wireless navigation to a specific parking space, (2) monitor the occupancy of parking spaces, and (3) provide visual indicators within a parking lot. The following descriptions provide embodiment techniques for how overall systems may be calibrated and managed by software. Note that, depending on the costs and requirements of a specific application or implementation, a subset of the described features may be used. Further, although parking areas or lots may be indicated as exemplary installation infrastructures for interactive light sensor network devices (e.g., sensor controller nodes, lighting nodes, etc.), it should be appreciated that such networks may be within various infrastructures.

In the process of site planning for an exemplary parking area infrastructure, the parking area is mapped out and the appropriate equipment is identified and assigned locations around the parking area. GPS locations and maps may be obtained of the parking area—these may be imported from existing site diagrams or drawn on site. The maps define the locations and numbers of all parking spaces, vehicle barriers, pedestrian barriers, vehicle and pedestrian ingress and egress points, vehicle and pedestrian portals between floors, and locations of all light fixtures and other power sources, and locations of all possible mounting points relative to the parking spaces. Sensor modules and locations may be chosen based on cost, available mounting positions, available power sources, and lines of sight and fields of view from possible mounting points to the parking spaces. If PV cells may be deployed, then light levels may be calculated or measured and mapped over the possible PV locations to select the appropriate PV cell size based on specified module power consumption. Indicator modules and locations may be determined based on the desired degree of visual indication. Beacon signal coverage for sensor or indicator modules integrated with a lighting node is determined, and extra lighting node locations may be identified. Access and repeater points may be calculated based on simulations of the RF signal strengths and available mounting locations with adequate power.

During installation, the sensors, indicators, and network modules may be installed at the specified locations. Space sensors may be calibrated as needed and verified with test vehicles at each parking space. All network addresses, beacon identifiers, and global or relative coordinates of the devices may be entered into the sensor database.

Figure 22:
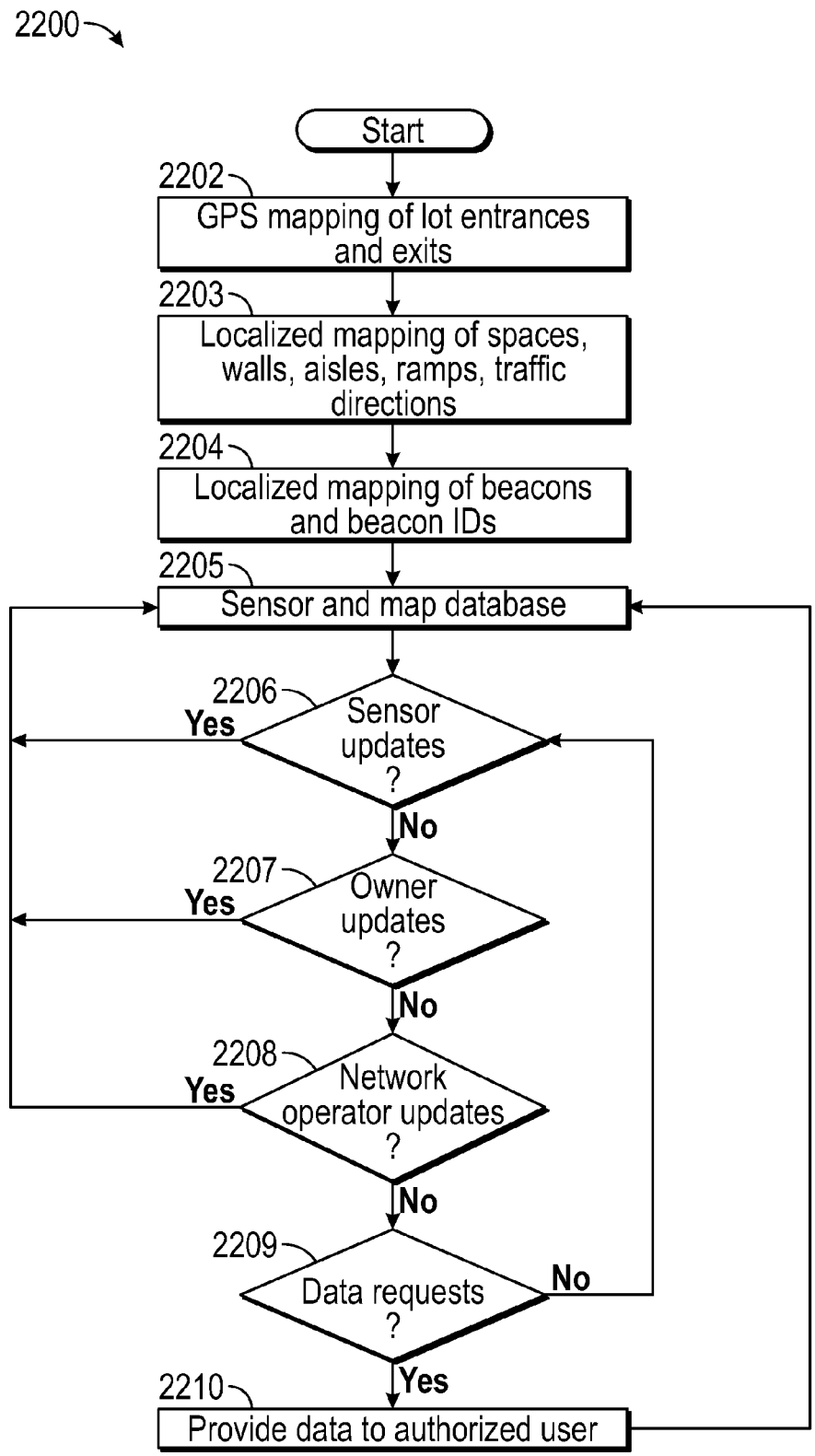
FIG. 22 is a process flow diagram illustrating a method for a computing device to maintain a sensor database according to an example embodiment.

FIG. 22 shows a simplified flowchart for a method 2200 for a computing device to utilize a sensor database according to example embodiments. The method 2200 includes operation blocks 2202-2210. In various embodiments parking spaces may include at least five types of parameters that may be tracked in the database: (1) equipment parameters such as of sensors, indicators, repeaters, access points, and lighting nodes, such as the type of equipment, location and network addresses, and pairing assignments of remote modules to access points and repeaters that may be provisioned during installation by the sensor network operator, and change when the equipment changes; (2) space allocation parameters such as the scheduled availability, cost, authorizations, and vehicle restrictions (compact or motorcycle only) that change based on owner requests; (3) real-time parameters such as the measured occupancy that is reported by the sensors and indicator states; (4) map parameters that contain the coordinates of all lighting nodes, parking spaces, vehicle barriers, pedestrian barriers, vehicle and pedestrian ingress and egress points, vehicle and pedestrian portals between floors, and locations of all sensors that may be entered into the database when the area is mapped out; and (5) permission assignments of the network operator employees, property owners, and application providers to access particular sensor or mapping data. The space allocation parameters may have a future value associated with them so that future reservations may be managed. The network operator may develop algorithms in software to change indicators as needed.

With reference to FIG. 22, the method 2200 may performed by a processor of a computing device. The method includes lot provisioning. In block 2202, the processor of the computing device may perform GPS mapping of lot entrances and exits. In block 2203, the processor of the computing device may perform localized mapping of spaces, walls, aisles, ramps, and traffic directions. In block 2204, the processor of the computing device may perform localized mapping of lighting nodes and beacon IDs. Based on the operations of blocks 2201-2204, in block 2205, the processor of the computing device may update the sensor and map database, such as with equipment and map parameters.

In determination block 2205, the processor of the computing device may determine whether there are sensor or map updates, and update the databases accordingly. In response to determining there are sensor updates received (i.e., determination block 2206="Yes"), the computing device may continue with the updating operations in block 2205, such as with the received sensor data. In response to determining there are no sensor updates received (i.e., determination block 2206="No"), in determination block 2207, the processor of the computing device may determine whether there are owner updates that are received. In response to determining there are owner updates received (i.e., determination block 2207="Yes"), the computing device may continue with the updating operations in block 2205, such as with received space allocation data. In response to determining there are no owner updates received (i.e., determination block 2207="No"), in determination block 2208, the processor of the computing device may determine whether there are network operator updates that are received. In response to determining there are network operatory updates received (i.e., determination block 2208="Yes"), the computing device may continue with the updating operations in block 2205, such as with the received equipment and mapping data.

In response to determining there are no network operator updates received (i.e., determination block 2208="No"), in determination block 2209, the processor of the computing device may determine whether there are valid data requests received. In response to determining there are no data requests received (i.e., determination block 2209="No"), the computing device may continue with the operations in block 2206. However, in response to determining there are data requests received (i.e., determination block 2209="Yes"), in block 2210, the processor of the computing device may provide data to an authorized user based on the data requests, and then continue with the operations at block 2205.

Figure 23:
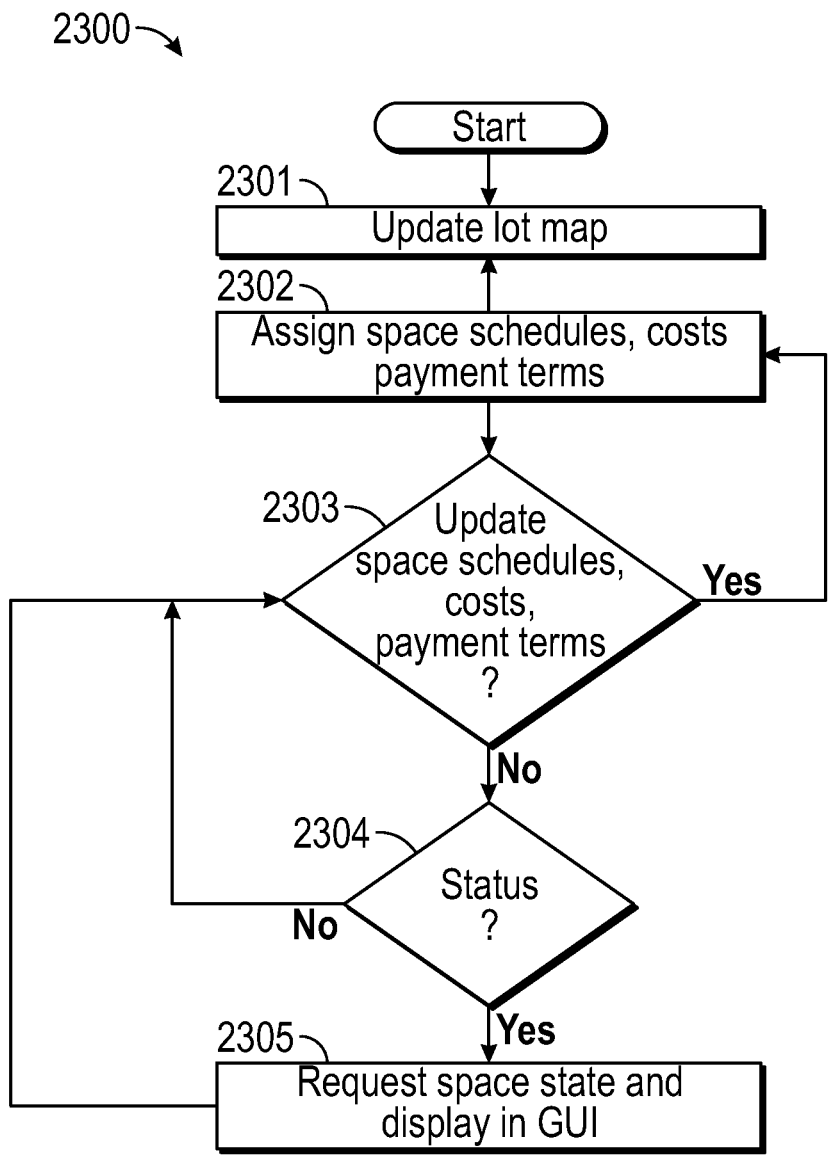
FIG. 23 is a process flow diagram illustrating a method for a computing device to provide an owner interface according to an example embodiment.

FIG. 23 shows a flowchart for an embodiment method 2300 for a computing device to provide an owner interface according to an example embodiment. The method 2300 includes the operation blocks 2301-2305 in some embodiments. In some embodiments, the owner interface is capable of providing parking space scheduling, cost, payment terms, and/or reservations. The real estate or site owner is provided with an interface to the server database to assign states, schedules, and rental charges to each parking space. The sensor database may also contain information from other parking areas so that segregation through standard software permissions is used so that each real estate owner only has access to the database values for their property. The owner interface queries the sensor database for the mapping parameters, real-time parameters, and sensor parameters, and space allocation parameters to provide a map of the parking area along with the requested parameters. The owner may then change the allocation parameters on a per-spot basis with a one-time provisioning, or by scheduling changes. The owner may also request to receive automatic updates of specified events, such as when unauthorized parking occurs, when a vehicle remains in a parking space beyond its allocated time, when a vehicle is parked for an abnormally long time, and when a vehicle is parked in a reserved space. During operation, software connected to the sensor database queries the data from each space sensor over the network at prescribed intervals, along with the data from other sensors connected to the network, and updates the state status and indicators. Historical data of space state and status is also stored in the database. Real estate owners may access the database to view historical and statistical data, and to also change the space attributes.

With reference to FIG. 23, the method 2300 may be performed by a processor of a computing device. In block 2301, the processor of the computing device may display a lot map. Such map information may be obtained from a space database. In block 2302, the processor of the computing device may assign space schedules, costs, and payment terms. In some embodiments, in response to assigned space schedules, etc., the computing device may pass space parameters to a space database in block 2302, such as to update the database. In determination block 2303, the processor of the computing device may determine whether there are updates available. In response to determining there are updates (i.e., determination block 2303="Yes"), the computing device may continue with the operations in 2302 for assigning space schedules, etc. In response to determining there are no updates (i.e., determination block 2303="No"), in determination block 2304, the processor of the computing device may determine whether there is a status request available. In response to determining there is a status request (i.e., determination block 2304="Yes"), the computing device may display to the owner the current status of the specified parking spots in block 2305. In some embodiments, the display may also include lot attribute data from the space database. In some embodiments, the computing device may provide space states and history data related to the space database. In response to determining there is no status request available (i.e., determination block 2304="No"), the processor of the computing device returns to block 2303. After block 2305, the processor of the computing device may return to block 2303.

In various embodiments, one or more application servers may be used to manage the parking space assignment and billing. The application server may be integrated with the sensor database manager, or it may be a separate entity that exchanges data with the sensor database (e.g., sensor database 550*b* shown in FIG. 5). The application server is provided with read-only access to mapping data, space allocation data, and space occupancy data in some example embodiments. An application server consolidates all of the available parking data for an area and advertises it to end users over a public network (cellular or internet, for example). In an example embodiment, the application server may be included within the application software platform.

Figure 24:
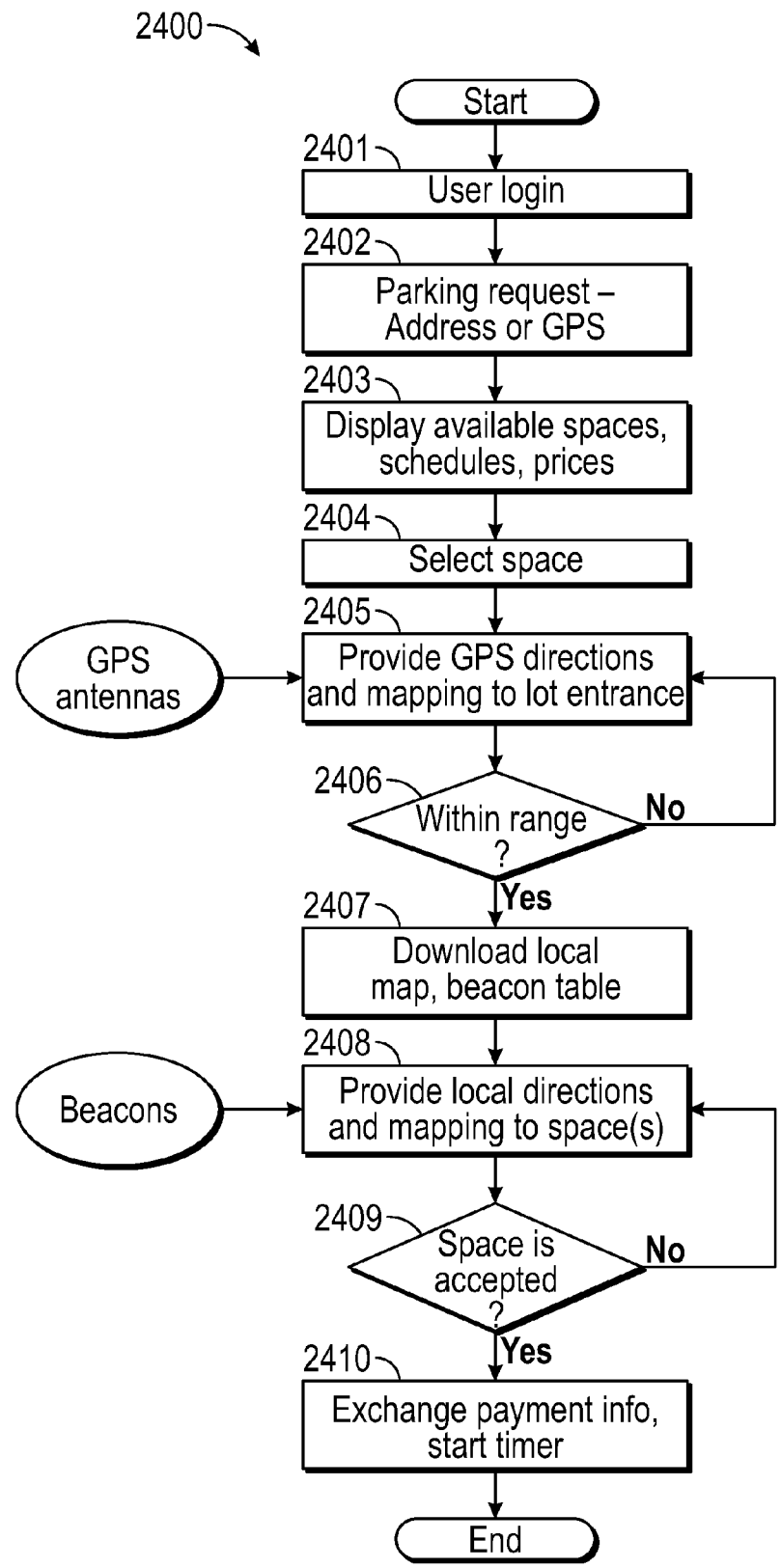
FIG. 24 is a process flow diagram illustrating a method for a mobile computing device to provide an application for reserving, and navigating to, a parking spot according to an example embodiment.

In some embodiments, such a software application platform may publish a client application that runs for example on a user's smartphone. In various embodiments, the client application may be referred to as a smartphone application or mobile application. FIG. 24 illustrates a flowchart for a method 2400 for navigating within a site according to an example embodiment. The method 2400 may be implemented by a computing device to provide a smartphone application. With such a method 2400, the computing device (e.g., a user mobile device) may be capable of exchanging payment information.

In general, after logging into an application server, the user requests information related to parking in a specified area. The application then sends parking data to the client application and the user selects a particular parking lot and optionally reserves one or more space for a specified time. If the user reserves a space, then the application server sends that request to the sensor database so that the status of the requested spaces is changed for the requested time. When requested by the user, the application provides directions to the parking area based on GPS and other information provided by the wireless lighting nodes. The local map and database of local beacon data (e.g., beacon database shown in FIG. 5) may be downloaded to the smartphone memory along with the coordinates of the geofence boundary. For an example embodiment, the local map may be stored in the other databases 550*e* shown in FIG. 5. When the smartphone crosses the geofence boundary, the client application uses information provided by the local lighting nodes to provide directions to the reserved space (in the case of a reservation) or to the best available space. The best available parking space in a parking area may be selected by the user based on their preferences. For example, the user may specify their ultimate destination—a particular pedestrian egress or store in a mall, or select a more secure parking space based on available security cameras or lighting levels. If customer preferences may be entered into the application, then the application may use that information to determine the GPS coordinates of the optimum entry point of the parking area, and use that as an intermediate destination for the navigation directions. After parking the vehicle, the user acknowledges acceptance of the parking space in the application based on the space number and the application begins the timer for billing. The application also stores the precise coordinates in memory so that it may provide navigation for the driver to return to the vehicle. After the vehicle is parked in a parking space, the sensor database will be updated with data showing the parking space as being occupied.

The user may also request event notifications such as when there is motion detected by their vehicle, when their parking space is vacated, when their allocated parking time is about to expire, and when their vehicle is being towed away. In some embodiments, users may request access to images from networked security cameras that may have visibility of the parking area.

The application server maintains its own database of available parking spaces, which consolidates all parking areas in a specified area. The application advertises the available spaces to subscribed users. Parking space availability is advertised at other locations such as highway off-ramps to a downtown area.

With reference to FIG. 24, the method 2400 may be performed by a processor of a computing device (e.g., a mobile device). In block 2401, the processor of the computing device may receive a user login, and in block 2402 may receive parking request information for a parking space (e.g., an address or GPS, etc.). In block 2403, the processor of the computing device may display available spaces, schedules, and/or prices for parking spaces. The computing device may be configured to exchange messages with an application database when performing the various operations, such as logging in and making requests. For example, schedules and prices for parking spaces may be received from the application database. In example embodiments, the applications database may represent one or more databases included within or accessible to the service platform or the application software platform.

In block 2404, the processor of the computing device may receive a selection from the user that selects a parking space. This selection may specify communications with the application database. In block 2405, the processor of the computing device may provide GPS direction and mapping information with respect to the lot entrance related to the selected parking space (and the parking area/lot). GPS information for such operations may be received from a GPS antenna(s).

In determination block 2406, the processor of the computing device may determine whether the computing device is within range of the geofence. In other words, the computing device is close enough to the geofence to hear or receive beacon signals. In response to determining it is not within range (i.e., determination block 2406="No"), the computing device may continue with the operations in block 2405 for providing GPS navigation. In response to determining it is within range (i.e., determination block 2406="Yes"), in block 2407, the processor of the computing device may download local map(s) and lighting node tables, such as based on data received from the application database. In block 2408, the processor of the computing device may provide local directions and mappings to get to the parking space. Such information may include data received from lighting nodes within the parking area.

In determination block 2409, the processor of the computing device may determine whether the parking space (or spaces) is accepted, such as based on user inputs. In response to determining it is not accepted (i.e., determination block 2409="No"), the computing device may continue with the operations in block 2408 for providing local directions/mappings. In response to determining it is accepted (i.e., determination block 2409="Yes"), in block 2410, the processor of the computing device may exchange payment information with the application database and start a timer, such as a timer related to the amount of payment. In some embodiments, the computing device may perform operations to monitor for predefined events as well as provide pedestrian navigation from the vehicle to a subsequent destination, or pedestrian navigation back to the vehicle in the parking space.

In response to requests from the mobile device, the processor of the application software platform may maintain the application database in a manner that reserves the parking space for the computing device, such as in response to a request. Further, in response to the reserved parking space, a processor of a lighting node may cause an indicator to indicate the reserved status (e.g., cause blinking, flashing, etc.). For example, with the method 2400, the computing device may access data from one or more databases in the application software platform to receive space status, location, cost information from the sensor database computing device, and the sensor database computing device may receive space reservations data.

With regards to FIG. 1, the parking application may proceed as follows. A plurality of sensor controller nodes 101 may send parking or other sensor data to a service platform 104 via a plurality of lighting nodes 102a-102f. The service platform 104 may make details of the parking location, availability, schedules, and charges to an application software platform 108. A mobile device 109 may log into the application software platform 108, receive the parking information from the application software platform 108, and display that information in a client GUI (e.g., a mobile device app). The application software platform 108 may transfer the GPS coordinates of the parking spot to the mobile device 109 so that it can use its GPS receivers to navigate to the parking spot location. At the parking site, the mobile device 109 may receive beacon signals from lighting nodes 102 and may send them to an application server. In various embodiments, the application server may reside within the service platform 104 or the application software platform 108. The application server may then send map and location data to the mobile device 109, which in turn may request a destination (e.g., a parking space, store location, washroom, etc.) from the application server. The mobile device 109 (via its executing application) may use beacon signals to navigate to the destination. The application server may send coupons data, etc. to the mobile device 109 based on its location.

Exemplary applications using embodiment interactive wireless networks may include a parking system that monitors and controls a parking area while providing end users with many different types of interactive applications that use updated location information of a tracked object. For example, the interactive application may include features to assist a user within a particular environment or site to (1) locate available of parking spaces, (2) navigate to available parking spaces, and (3) reserve parking spaces.

More specifically, a parking application and system may include one or more of the following devices or functions:

(a) The sensors from the sensor controller nodes 101 that monitor the occupancy of one or more parking spaces, and the associated parking space, each have a unique ID and recorded three-dimensional positional coordinates.

(b) The network transceivers in lighting nodes 102 that communicate the occupancy of each parking space to a database maintained in one or more servers. The databases and/or servers may be located within the service platform 104 or accessible to the service platform 104.

(d) The network lighting nodes 102 with beacon functionality enable navigation with better accuracy than standard global position system (GPS) technology, in places where GPS navigation is not possible (e.g., indoor or partially indoor locations), each having a unique ID and recorded three-dimensional positional coordinates that enable applications running on a mobile device 109 with a wireless receiver to read the beacon signal strengths and use multilateration methods to determine the position of a tracked device or objects relative to the lighting nodes 102.

(d) A lighting node that integrates sensors, indicators, and wireless network beacon devices with associated network architecture that connect the lighting node data and controls to a service platform 104 that records and maintains the data and provisions the lighting node's behavior.

(e) Allowing the owner of a parking lot to monitor traffic and parking space statistics, assign spaces to cars as they enter the parking lot, provision premium spaces, and provide digital coupons as a means of controlling parking spaces.

(f) Allowing the owner of a parking lot to schedule availability and cost of parking spaces, to change parking space status between reserved and available, handicapped or generally available, and to provide means of charging premium rates for more desirable parking spaces at peak demand times.

(g) Reducing congestion within a parking area by assigning navigation paths based on avoiding vehicle conflicts.

(h) Distributing coupons and premium parking to encourage occupancy in less-busy areas to reduce congestion.

(i) Distributing incentives to users to park in a particular area.

(j) Security applications for the owner, such as alerts to the owner and tow truck company for unauthorized parking, alerts when parking time exceeds a threshold, and/or alerts to the user when the car is moved without the smartphone being present.

(k) A smartphone, or other network device, that runs an application that communicates to a user the availability, cost, and schedule of parking spaces in a user-requested area, and enables the user to reserve spaces, pay the parking fees, and navigate to the requested parking space. The application being designed such that it may function in areas where GPS and standard cellular service is not available, such as in underground parking garages.

(l) An algorithm whereby an application on a smartphone locates the phone on a map based on known GPS techniques and localized triangulation from the network lighting nodes, where the lighting node locations and IDs may be known by the algorithm; whereby the user's position is shown on a map with visual and/or verbal directions to the parking space. The algorithm also providing in advance directions for exiting the parking structure, using the exit that is optimum for the user's next destination.

(m) Allowing users to monitor traffic levels in a parking garage, providing maps and statistics to lot owners, and providing estimated times to reach a parking space and estimated times to exit from the parking lot, wherein such times may be communicated to an application running on the user's smartphone or other networking device.

(n) Controlling parking garage ingress and egress through gates that may be connected to the network and controlled by the network operator.

(o) A positioning algorithm used in various applications that enables a user to navigate back to the parking space to find their car, or to navigate in other areas where known beacon-emitting lighting nodes may be present.

(p) Creating and updating virtual maps and provisioning by mapping a parking lot with positions of its beacon-emitting lighting nodes and parking spaces, along with GPS coordinates of its entrances and exits, and publishing and maintaining the maps with different views for users, network operators, application providers, and parking lot owners.

(q) Using wireless beacon signals to navigate within a site having lanes defined in a space with real and virtual barriers or virtual floors with portals to restrict vehicles to follow prescribed paths when navigating through an area, and weighted lanes to help control traffic congestion.

(r) A network that integrates the parking sensors and transceivers with other sensors, and correlating the position of the sensors so that users may obtain other information based on the location of their parking space, such as (1) live photos of their car and the surrounding area, (2) alerts when events occur in the vicinity of their car as detected by other sensors, and/or (3) traffic levels around the parking lot so that they may select less busy parking areas.

(s) A revenue model that enables real estate owners to lease out their parking spaces for short periods, whereby a third party application provider manages the parking space availability advertising and manages the billing of the users, the owner thereby only communicating availability and charges to the application provider, and the application provider sending a proportion of the parking fees to the owner.

(t) A revenue model that enables the network operator to earn charges from the real estate owner or application provider for providing the service of maintaining the network and devices that monitor and control the parking space, whereby the network operator maintains a database of the parking spaces that is made available to the third party application developer.

(u) Indicator lights and/or monitors that display the availability of each parking space, or group of parking spaces, including reservation status, and provide visual navigation cues to guide users to specified parking spaces.

(v) Methods to run the sensors, indicators, and transceiver in a low-power mode on an interval basis, or on an interrupt basis driven by signals from other sensors connected to the network, such that they may be run on batteries or energy-harvesting transducers such as photovoltaic cell.

(w) An accelerometer added to the remote modules to monitor tampering of remote devices.

(x) Structures for mounting sensors, transceivers, and indicators at different positions in indoor or outdoor parking lots, such as ceilings, walls, or floors; floor-mounted devices having adequate strength to support vehicles.

(y) Security system that locks the gates of the parking area when a vehicle is moved without the smartphone being present. User may activate "vehicle lock" feature that may be unlocked before moving the car.

(z) Remote notification with electronic signs tied to the parking system via network server access.

(zz) Leasing out of beacon data, software development kit (SDK) that reports beacon reads and sells it to third-party developers.

Embodiment systems and methods described within this disclosure may be used with one or more of the parking space sensor technologies listed above. The design and specifications of various sensor devices used in lighting nodes may be generally known in the art, but embodiment techniques use such sensors as part of a system of lighting nodes within an interactive light sensor network to enable monitoring and controlling parking spaces. For example, a sensor module may monitor occupancy of a single parking space, or more than one parking space. In various embodiments, to improve accuracy of the sensors, more than one sensor of more than one technology may be used to monitor each parking space. In various embodiments, the local lighting nodes in the interactive light sensor networks enable real-time positioning where GPS is not available, such as in underground parking garages or indoor structures or partially covered structures.

In some embodiments, parking software (e.g., applications executing on a mobile device) may include various feature sets useful for drivers, including transmitting visual indicators and signs for available spaces; providing a smartphone application to navigate to available parking space; providing walking directions from the vehicle to the subsequent destination, and to return to the car; providing options for premium parking closest to final destination; receiving coupons and incentives from local merchants; determining in advance which parking spaces may be available and enabling the reservation of one or more parking spaces; providing security alert(s) if the car is moved; providing views from security camera(s); providing congestion-dependent navigation; providing data from additional sensors (e.g., weather information, etc.); and providing automatic payment(s) based on actual parking time.

In some embodiments, parking software (e.g., applications executing on a property owner computing device) may include various feature sets useful for property owners, such as providing time-dependent mapping of space occupancy, generating analytics on usage; providing online space reservation, increased space utilization and reduced congestion; enabling leasing of lighting nodes to merchants; generating revenue from premium parking, reserved parking, group reservations; providing links to secondary parking when the lot is full; providing real-time reassignment of parking spaces (e.g., from private/reserved to charged, premium for events, etc.); providing real-time reassignment of shared parking spaces (e.g., reassignments useful for apartment buildings with limited visitor parking, etc.); and providing security alerts for parking spaces occupied longer than a specified time, after hours.

In some embodiments, various customer-provided data may be used for various parking applications, such as for use in monitoring and displaying site-specific and total handicapped parking spaces (e.g., OSHA or other guidelines may require a minimum number of available parking spaces); providing instant parking space conversion (for example, nearest parking spaces may be converted to handicapped parking spaces when vacated); providing premium parking (e.g., owners may charge more for closest parking spaces, may auction parking spaces, spread parking out as more users walk to the free parking spaces, etc.); providing reserved parking (e.g., parking may be tied to user's credit card at entry which may be ideal for group reservations of a specific area, etc.); providing customer-specific indicators (e.g., LED indicators may indicate the closest available parking spaces to customer-specified location, etc.); providing long-term parking space statistics (e.g., occupancy, revenue per parking space, etc.); providing total parking spaces available per area (e.g., display at remote signs, or send to user apps); identifying parking spaces occupied for longer than a specified time (e.g., 24 hours), tow/ticket/security; providing parking spaces occupied after hours (e.g., tow/ticket/security); improving customer safety (e.g., providing alarm to user smartphone when car moved without Bluetooth®, car finder, missing persons notification (abandoned car), etc.).

Embodiment systems may provide an application framework, wherein the service platform makes available via an Application Programming Interface (API): (1) real-time and historical data of the sensor values, (2) beacon information linking the beacon signature to its location, and (3) input requests to track devices with a known signature and output data on the real-time and historical position of the tracked devices. In some embodiments, the wireless protocol used for the sensors may be a standardized protocol that enables third party developers to easily add additional wireless sensors to the system. The application framework may support a plurality of applications that report sensor data, enable device responses based on the sensor data or user location, enable user navigation, and track objects within the networked area. Such systems and methods may include various models for providing access to sensor information from such a network as part of various revenue models for monetizing an integrated wireless network of sensors, controllers, beacon devices, and tracked devices.

Stakeholder entities related to an interactive light sensor network may include all entities who may receive revenue, monies, benefits, credits, and/or other compensation for their participation in the network. In particular, the owners of the lighting infrastructure may be key stakeholders of the lighting infrastructure based applications. These owners may be the entities that own the light-pole/fixture and the property on which the lighting infrastructure is located. Lighting may be a cost center because of capital investment, energy related monthly bills and additional maintenance costs. Lighting infrastructure owners may be compensated (or reimbursed) for permitting lighting node platforms to be installed and utilized within their properties. Lighting infrastructure owners may typically receive revenues from interactive light sensor network operators in exchange or based on data collected from the lighting node platforms within lighting infrastructures (e.g., authorized access). Revenue to lighting infrastructure owners may also come from application partners based on various agreements. This revenue may permit lighting infrastructure owners to offset at least some of the capital, operational, and maintenance expenses associated with lighting node platforms and related elements of the interactive light sensor network that may be deployed within the lighting infrastructures.

Another key stakeholder may be the interactive light sensor network operators (i.e., which may be a service provider). These may be the entities that provide hardware and software platforms to provide the data and services on a day-to-day basis for various applications. Revenues to operators may be from application providers/owners using data from the interactive light sensor network, with such revenues based on the type, frequency, amount of the data provided to application providers, the location and demand for data (or data demand), and well as the time frame needed for the data. The operators may also receive revenue based on transmitting/storing/processing custom data requested by custom application vendors. In some embodiments, the operators may also receive revenues based on applications developed by the operators (e.g., applications for business using the interactive light sensor data, such as in a retail environment/context).

In various embodiments, the operators may receive various revenues from application and application service developers based on the type or use of shared data. For example, operators may receive revenue for providing access to custom, aggregated, correlated, and/or specific data, such as data indicating space usage (in parking lots), light status, environmental information (e.g., temperature), light presence, gas presence (e.g., carbon monoxide, etc.), accelerometer status, intrusion detector status, wireless signaling information (e.g., Bluetooth® MAC addresses, RFID data), application-specific sensor data (e.g., intrusion sensor, vibration sensor, motion sensor, audio, people detection, vehicle detection, vehicle details sensor, etc.). Various data types received and processed by the interactive light sensor network may be described below.

Other important stakeholder entities may include the application providers (or operators) and owners. The owners may represent the landlord of a site or infrastructure such as a parking garage owner or a warehouse owner. These entities may develop, distribute, and sell applications or application services that utilize data collected, processed and distributed by the interactive light sensor network. Revenue sources for application providers may be tied to their applications, application services, and relevant data associated with the interactive light sensor network.

For some embodiments, the revenue source may be a fee associated with a particular application or application API to use data collected from a group of nodes within a LAN as agreed upon by the relevant entities. The fee may be one-time license fee and/or a recurring license fee.

In some embodiments, one revenue source may be that users of an application or the application services pay a license fee or "software as a service" (SaaS) usage fee, which may be typically either time-interval based, or paid as a one-time license fee. This fee may be based on different levels of usage, for example, standard, professional, and administrator. The usage fee may be dependent on the type of data (e.g., raw or summarized, real-time vs. non-real-time, etc.), access to historical data, based on data priced dynamically by demand, and on the location associated with data. Another revenue source for application providers may be related to advertisers. In particular, advertisers (or businesses that want to advertise products or services to applications and application-service users) may pay advertisement fees for each application or service. In various embodiments, advertisers may be involved in applications distributed to users based on user acceptance of such exposure to advertising (e.g., opt-in/out). The advertisements may be linked to beacon signals received by end users so that they may be location-based; for example, an end user may receive a discount coupon from a vendor when they may be within a certain distance of one of the vendor's locations.

Revenue is generated from the system in a number of ways. For example: (1) end users may purchase applications that enable them to read sensor data on their mobile devices; (2) end users may pay for services or resources controlled by the system; (3) a landlord may charge their tenants for access to the sensor data, to reserve resources controlled by the system, or to access the beacon database; (4) advertisers may pay to have their advertisements embedded in applications that use the system resources; (5) municipalities may pay the network operator to manage the network and make the data available to public users.

For example, a user may provide a fee to applications that operate using information from the interactive light sensor network. The applications may provide a portion of that revenue in exchange for access to information from the interactive light sensor network. Different levels of fees may be associated with types and quantities of information. An operator of the interactive light sensor network may in turn use a portion of the income from applications to pay a property owner for use of information from devices operating on the property owner's property.

The following may be illustrations of how revenue may be generated via embodiment systems. (1) End users may purchase applications that enable them to read sensor data on their mobile devices. (2) End users may pay for services or resources controlled by the system via applications on their mobile devices. (3) A landlord (or lighting infrastructure owner) may charge tenants to access to the sensor data related to an infrastructure associated with a lighting system, to reserve resources controlled by the system, and/or to access the beacon database. (4) Advertisers may pay to may have their advertisements embedded in applications that use the system resources. (5) Municipalities may pay the network operator to manage the network and make the data available to public users, etc.

In some embodiments, systems may provide real-time tracking by localizing signals from a wireless transmitter device attached to the tracked object or a smartphone with a wireless transmitter carried by a tracked person. For example, a facilities manager may want to track assets or equipment within a facility. This may be forklift trucks in a factory, waste bins in a parking lot, shopping carts at a grocery store, or snowplows on city streets. Users may want to track other persons, for example, parents may want to track their children in a large area such as a public park. For example, the sensors may monitor dumpsters and report when a dumpster is full, and the application may read the status of all dumpsters that may be contracted by a particular waste-management company, and provide optimized navigation instructions to service vehicles that empty the dumpsters. In these embodiments, the tracked object 122 carries a beacon transmitter that emits beacon signals that are detected by a beacon receiver in nearby lighting nodes as shown in FIG. 2. Based on the RSSI of the beacon signals, an application in the interactive light sensor network can calculate the position of each tracked object.

In various embodiments, real-time location data from all tracked devices may be accumulated on the service platform and used to provide global information to an application, such as heat maps showing congestion of tracked devices, route details of each tracked device, and number of times each tracked device entered or exited a specific area. The application may read the status of all dumpsters that are contracted by a particular waste-management company, and provide optimized navigation instructions to service vehicles that empty the dumpsters.

In various embodiments, real-time location data from all tracked devices may be accumulated on the service platform and used to provide global information to an application, such as heat maps showing congestion of tracked devices, route details of each tracked device, and number of times each tracked device entered or exited a specific area.

Sensors may communicate the status of monitored parking spaces over a local area network (LAN) to an access point that relays the status over an external network (such as the internet, cellular network, or additional LAN) to a sensor database. State changes may be sent to the indicators (such as video screens or indicating lights) from the sensor database over the same network. In some embodiments, the state changes may be sent to the indicators directly from the sensor modules. In some embodiments, each sensor and indicator may be connected to a single repeater and each repeater may be connected to an access point. Those skilled in the art will recognize that (1) if a repeater is beyond the range of an access point, it may communicate with an access point via other repeaters, and (2) redundant repeaters and access points may support standard network protection algorithms that re-route traffic in the event of a repeater or access point failure.

The operators may receive revenue for providing access to custom, aggregated, correlated, and/or specific data, such as data indicating energy usage (voltage and current), light status, environmental information (e.g., temperature), light presence, gas presence (e.g., carbon monoxide, etc.), accelerometer status, intrusion detector status, wireless signaling information (e.g., Bluetooth MAC addresses, RFID data), application-specific sensor data (e.g., intrusion sensor, vibration sensor, motion sensor, audio, people detection, vehicle detection, vehicle details sensor, etc.).

As an illustration of an exemplary scenario, an owner of a parking lot (or other real estate), which may include various lighting nodes that include sensors and that may be connected to a network, may have network access to a sensor database and thus may manage the availability of parking spaces in the parking lot and/or monitor the space occupancy. An application server also may have network access to the sensor database, and thus may manage the leasing of the spaces to subscribed users.

Other exemplary use cases of applications supported by embodiment service platform devices of the interactive light sensor network may include congestion-based navigation applications, real-time lighting on-demand applications, real-time sensor on-demand applications, a location-based problem reporting application, and emergency evacuation applications.

Example embodiments of a lighting node in a light sensor network include a sensor configured to detect an input from an environment; a network interface configured to receive sensor data from other nodes within the light sensor network over a local area network (LAN): a processor coupled to the sensor, the processor configured to read the sensor data from the input detected by the sensor; and a communication interface having a first transceiver and a second transceiver, the first transceiver being configured to exchange communication signals with a service platform over a wide area network (WAN) via a lighting gateway node and further configured to exchange communication signals with other nodes within the light sensor network over the LAN, the second transceiver being configured to receive beacon signals from beacon transmitting devices within a beacon communications range and further configured to transmit beacon signals to be received by beacon-enabled devices within the beacon communications range of the second transceiver, wherein the processor is configured to perform instructions included in the communication signals and the beacon signals.

In other embodiments, the communication signals are associated with at least one of the sensor data and beacon data associated with the lighting node or the other nodes within the light sensor network. In further embodiments, the beacon data includes unique beacon identification information and position coordinates of the lighting node or the other nodes within the light sensor network. The beacon signals may include a first beacon signal transmitted at a first time by the beacon transmitting device, and the first beacon signal being used to estimate a distance of the beacon transmitting device from the lighting node based on a received signal strength indicator (RSSI) of the first beacon signal. In some embodiments, the beacon data and the estimated distance of the beacon transmitting device from the lighting node are used to estimate a location of the beacon transmitting device.

In other embodiments, the lighting nodes includes a sensor controller and processor. The communication signals received from the service platform over the WAN via the lighting gateway node includes instructions to set a condition of the sensor controller at the lighting node, and the processor is configured to perform the instructions to set sensor condition values of the sensor controller at the lighting node.

In various embodiments, the first transceiver is configured to receive the communication signals from the other nodes within the light sensor network over the LAN, and further configured to retransmit the communication signals to another node within the light sensor network over the LAN. In further embodiments, the second transceiver periodically scans for the beacon signals transmitted by the beacon transmitting devices to receive the transmitted beacon signals within the beacon communications range.

Example embodiments of a system for a light sensor network includes a plurality of lighting nodes (LNs), wherein at least one of the LNs in the plurality of LNs includes an LN sensor, an LN processor, and a communication interface coupled to the LN processor, the LN processor being configured to read sensor data from the LN sensor and set sensor control values associated with the LN sensor. The communication interface has a first transceiver and a second transceiver. The first transceiver is configured to exchange communication signals to and from a service platform over a wide area network (WAN) via a lighting gateway node. The second transceiver is configured to receive beacon signals from a beacon transmitting device within a beacon communications range and further configured to transmit beacon signals to be received by a beacon-enabled device within the beacon communications range. The LN the processor is configured to perform instructions included in the communication signals and the beacon signals. A plurality of sensor controller nodes (SCNs) is positioned within a wireless communications range of one or more of the plurality of LNs. At least one of the SCNs in the plurality of SCNs includes an SCN sensor, and an SCN processor coupled to the SCN sensor and configured to read sensor data from the SCN sensor and set sensor control values associated with the SCN sensor.

In further embodiments, the communication signals are associated with the sensor data from the LN sensor or instructions to set sensor control values associated with the LN sensor.

In some embodiments, the communication interface of the at least one of the LNs is configured to transmit, to the service platform, a first communication signal including the sensor data from the LN sensor. The at least one LN includes an LN sensor controller that is coupled to the LN processor. A second communication signal received by the first transceiver from the service platform includes instructions to set the sensor control values based on the sensor data from the LN sensor. The LN processor is configured to execute the instructions to set the sensor control values at the LN sensor controller provided in the second communication signal.

In further embodiments, the system includes at least one of the SCNs having a wireless transceiver that is configured to provide a first wireless SCN signal to the communication interface of the at least one of the LNs. The first wireless SCN signal including the sensor data from the SCN sensor. The communication interface of the at least one of the LNs is configured to transmit a first communication signal including the sensor data from the SCN sensor to the service platform. At least one of the SCNs includes an SCN controller. The communication interface is configured to receive, from the service platform, a second communication signal including instructions to set sensor control values in response to the sensor data from the SCN sensor. The communication interface is configured to transmit a second wireless SCN signal to the wireless transceiver of the at least one SCN. The second wireless SCN signal including the instructions to set the sensor control values based on the sensor data from the SCN sensor an the LN processor is configured to execute the instructions to set the sensor control values of the SCN controller.

In another embodiment, the plurality of lighting nodes (LNs) and the plurality of sensor controller nodes (SCNs) are positioned within a wireless communications range of one or more of the plurality of LNs, which represents multiple LANs in the light sensor network. The multiple LANs may be associated with more than one owner. In other embodiments, the multiple LANs share the service platform, wherein the service platform provides access to data from the multiple LANs stored in databases of the service platform to be used by the same applications.

In an example embodiments, some of the plurality of lighting nodes represent nodes within the light sensor network associated with a lighting infrastructure and some of the plurality of sensor controller nodes represent nodes within the light sensor network that are remote from lighting fixtures within the lighting infrastructure.

In a further embodiment, a processor, representing at least one of the LN processor and the SCN processor, is configured to: enable a sensor, representing at least one of an LN sensor and an SCN sensor, to operate in an active state after a sensor timer has expired to query the sensor data, the sensor data indicating a sensor state; disable the sensor to operate in an inactive state after the sensor data is collected; reset the sensor timer; enable a transceiver to operate in an active state after a transmit timer has expired to transmit the sensor state; disable the transceiver to operate in an inactive state after the sensor state is transmitted; reset the transmit timer; and based on the transmitted sensor state, determine whether to enable or disable an indicator.

Example embodiments of a method of transmitting sensor data collected by a node in a light sensor network includes enabling a sensor, representing at least one of a lighting node (LN) sensor and a sensor controller node (SCN) sensor, to operate in an active state after a sensor timer has expired to query sensor data, the sensor data indicating a sensor state; disabling the sensor to operate in an inactive state after the sensor data is collected; resetting the sensor timer; enabling a transceiver to operate in an active state after a transmit timer has expired to transmit the sensor state; disabling the transceiver to operate in an inactive state after the sensor state is transmitted; resetting the transmit timer; and based on the transmitted sensor state, determining whether to enable or disable an indicator.

In other embodiment of the method, the indicator is a light-emitting diode (LED) light that indicates whether a parking space is occupied or not occupied. In another embodiment, the indicator is an LED light that provides navigation guidance to locate a parking space.

Example embodiments of a service platform include a plurality of databases for storing information received from a light sensor network that includes a plurality of lighting nodes and a plurality of sensor nodes, the information including sensor data and beacon data; a processor coupled to the plurality of databases, the processor being configured to access the information stored on the plurality of databases to support an application framework associated with multiple applications having corresponding mobile applications; and an interface coupled to the processor that is configured to transmit a first communication signal to a lighting node from the plurality of lighting nodes to provide instructions for the lighting node to generate an encoded wireless message for transmission to a beacon-enabled mobile device, the interface further configured to transmit a second communication signal to the beacon-enabled mobile device to provide instructions for the beacon-enabled mobile device to decode the encoded wireless message that was transmitted to the beacon-enabled mobile device from the lighting node, wherein the encoded wireless message that was decoded includes navigation data for one of the mobile applications for display on the beacon-enabled mobile device.

Example embodiments of a method of providing navigation instructions to a mobile device includes receiving data indicating a destination location inside a geofence, geofence having a boundary around multiple private beacon nodes and their associated beacon communications ranges, the multiple private beacon nodes being associated with a light sensor network; enabling a beacon transceiver of the mobile device to receive beacon signals; providing, to a mobile device located outside the geofence, the navigation instructions to the boundary of the geofence based on at least one of global positioning system (GPS) signals and beacon signals received by the mobile device from at least one public beacon device within a beacon communications range of the mobile device located outside the geofence; and providing, to a mobile device located inside the geofence, the navigation instructions to the destination location based on the beacon signals received by the mobile device from at least one private beacon node within the beacon communications range of the mobile device located inside the geofence and a virtual map including an area within the geofence.

In another embodiment providing, to the mobile device located inside the geofence, the navigation instructions to the destination location further comprises includes providing the navigation instructions to an unoccupied parking space for the destination location. In further embodiment, the navigation instructions to the unoccupied parking space for the destination location includes determining a location of the unoccupied parking space based at least one of time and distance from a current position of the mobile device.

In other embodiment, the method includes: determining the mobile device has reached the destination location; and disabling the beacon transceiver of the mobile device from receiving beacon signals.

In a further embodiment, the method includes downloading the virtual map from a software application platform, the virtual map including at least one of virtual lanes, lane directions, entry and exit points, and parking spaces for the area within the geofence.

In other embodiments, providing the navigation instructions to the boundary of the geofence includes presenting, on a user interface of the mobile device, the navigation instructions using an interactive mobile application. In another embodiment, providing the navigation instructions to the destination location further comprises presenting, on the user interface of the mobile device, the navigation instructions using the interactive mobile application.

In some embodiments, at least one of the private beacon nodes represents a lighting node or a sensor controller node within the light sensor network. In additional embodiments, each of the private beacon nodes includes a beacon transceiver.

In further embodiment, the method includes estimating a distance between the mobile device within the geofence and each of the private beacon nodes within the beacon communications range of the mobile device based on a received signal strength indicator (RSSI) of the received beacon signals. Another embodiment of the method includes estimating a location of the mobile device within the geofence based on the estimated distance between the mobile device and each of the private beacon nodes that transmits one of the beacon signals received by the mobile device and location information of each of the private beacon nodes that transmits one of the beacon signals received by the mobile device. In some embodiments, estimating the location of the mobile device within the geofence is based on a multilateration technique. In yet further embodiments, the multilateration technique applies a least-square method.

In another embodiment, the method includes recalculating the estimated location of the mobile device within the geofence based on the beacon signals received by the mobile device as the mobile device is traveling. In various embodiments, the virtual map is based on beacon data and provisioning data. In further embodiments, estimating a distance between the mobile device within the geofence and each of the private beacon nodes within the beacon communications range of the mobile device further includes determining the RSSI of the received beacon signals exceeds a threshold. In another embodiment, estimating a location of the mobile device within the geofence further includes determining there is a sufficient number of the received beacon signals to estimate the location of the mobile device within the geofence.

Example embodiments of a method of providing navigation instructions to a mobile device includes: receiving data indicating a destination location inside a geofence, the geofence having a boundary around multiple private beacon nodes and their associated beacon communications ranges, the multiple private beacon nodes being associated with a light sensor network; enabling a beacon transceiver of the mobile device to receive beacon signals; providing, to a mobile device located outside the geofence, the navigation instructions to the boundary of the geofence based on at least one of global positioning system (GPS) signals and beacon signals received by the mobile device from at least one public beacon device within a beacon communications range of the mobile device located outside the geofence; and providing, to a mobile device located inside the geofence, the navigation instructions to the destination location based on the beacon signals received by the mobile device from at least one private beacon node within the beacon communications range of the mobile device located inside the geofence and beacon location information associated with the multiple private beacon nodes. In a further embodiment, the method including downloading the beacon location information associated with the multiple private beacon devices from an application software platform.

Example embodiments of a method of tracking an object that includes a beacon transmitter includes providing, to a computing device, tracking information of the object outside a geofence based on at least one of global positioning system (GPS) signals and beacon signals transmitted by the object, the beacon signals including a first beacon signal transmitted at a first time and a second beacon signal transmitted at a second time, wherein the first beacon signal is transmitted by the object located outside the geofence and received by at least one public beacon device within a beacon communications range of the object; and providing, to the computing device, the tracking information of the object inside the geofence based on the beacon signals transmitted by the object and a virtual map including an area within the geofence, wherein the second beacon signal is received by at least one private beacon node within the beacon communications range of the object. In another embodiment, the method includes providing the tracking information for presentation on a user interface of the computing device by displaying a location based on the second beacon signal of the object tracked relative to the virtual map.

Example methods may be performed by a processor of a computing device of a service platform of an interactive light sensor network to utilize information from a plurality of lighting nodes within a lighting infrastructure to enable an interactive application framework for users. An embodiment method may include receiving, by a processor of the computing device, data reported by the plurality of lighting nodes, wherein the data may include sensor data, identifying useful data by analyzing the received data using predefined data related to the lighting infrastructure, storing the identified useful data over time, and transmitting the identified useful data to a mobile device of a user registered with the service platform. In some embodiments, identifying the useful data may include generating directions for the mobile device user to take a unique route within the lighting infrastructure based on a stored map of the lighting infrastructure. In some embodiments, generating the directions for the mobile device user to take the unique route within the lighting infrastructure may include receiving movement data from the mobile device, and determining the directions based on the received movement data from the mobile device. In some embodiments, the movement data may be based on one or more of information from sensors within the mobile device or a user input from the user. In some embodiments, the user input from the user may change a setting on an application associated with the computing device or indicate a requested destination. In some embodiments, determining the directions based on the received movement data from the mobile device may include determining whether the mobile device user may be moving within a vehicle based on the received movement data from the mobile device, generating a first set of directions for the mobile device user to take the unique route within the lighting infrastructure in response to determining the mobile device user may be moving within the vehicle, and generating a second set of directions for the mobile device user to take the unique route within the lighting infrastructure in response to determining the mobile device user may be not moving within the vehicle. In some embodiments, the lighting infrastructure may be a parking lot, and generating the directions for the mobile device user to take the unique route within the lighting infrastructure may include identifying that the received data reported by the plurality of lighting nodes indicates there may be a congested area in the lighting infrastructure, generating the directions for the mobile device user to take the unique route within the lighting infrastructure to avoid the congested area in response to identifying the congested area, wherein the unique route may be configured to move the mobile device user away from other users within the lighting infrastructure, and transmitting the generated directions to the mobile device via a wide area connection. In some embodiments, the generated directions may include a coupon to incentivize the mobile device user to park away from the identified congested area. In some embodiments, the generated directions may include information about different costs associated with different parking spaces within the lighting infrastructure, wherein a set of parking spaces associated with a predefined area may be associated with a high cost. In some embodiments, the method may further include transmitting instructions for displaying the generated directions to a congestion monitor device installed within the lighting infrastructure. In some embodiments, the method may further include determining an occupancy duration for a vehicle associated with the mobile device user that may be parked in a parking space within the lighting infrastructure, calculating a validation value based on the determining occupancy duration, and transmitting the calculated validation value and billing information associated with the mobile device user to a parking validation device. In some embodiments, the method may further include receiving authorization information from the mobile device and a second mobile device indicating that the parking space may be shared by users of the mobile device and the second mobile device, and determining a second occupancy duration for a second vehicle associated with the second mobile device user that may be parked in the parking space within the lighting infrastructure, and wherein calculating the validation value based on the determining occupancy duration may include calculating the validation value based on the determining occupancy duration and the second occupancy duration, and transmitting the calculated validation value and billing information associated with the mobile device user to the parking validation device may include transmitting the calculated validation value and billing information associated with the mobile device user and the second mobile device user to the parking validation device. In some embodiments, receiving the data reported by the plurality of lighting nodes may include receiving, by the processor of the computing device from at least some of the plurality of lighting nodes, parking space occupancy data of the plurality of lighting nodes, identifying the useful data for the mobile device user registered with the service platform may include identifying available parking space data based on the received parking space occupancy data, and transmitting the identified useful data to the mobile device may include transmitting the identified available parking space data to the mobile device, and the method may further include transmitting directions to cause the plurality of lighting nodes to control output units coupled to the plurality of lighting nodes to provide visual representations of the identified available parking space data within the lighting infrastructure, wherein the output units may be LED indicators. In some embodiments, identifying the useful data for a mobile device user registered with the service platform by analyzing the received data using predefined data related to the lighting infrastructure may include identifying that a reserved parking space associated with a user of the mobile device may be occupied by an authorized vehicle, and the method may further include transmitting a message to a parking authority device indicating the reserved parking space may be wrongfully occupied by the unauthorized vehicle. In some embodiments, identifying the useful data for a mobile device user registered with the service platform by analyzing the received data using predefined data related to the lighting infrastructure may include identifying that a vehicle parked within a reserved parking space associated with a user of the mobile device may be moved. In some embodiments, identifying that the vehicle parked within the reserved parking space associated with the user of the mobile device may be moved may include identifying that the vehicle may be moved by an unauthorized party based on the received data from the plurality of lighting nodes, and the method may further include transmitting a message instructing a gate device to lock in response to identifying that the vehicle may be moved by the unauthorized party. In some embodiments, the received data may indicate a level of fullness of each of a plurality of waste containers associated with the plurality of lighting nodes, and the method may further include determining whether a waste container associated with a first lighting node may be full based on the received data, generating directions to the location of the waste container based on the predefined data related to the lighting infrastructure, and transmitting the generated directions to a device used by maintenance personnel associated with the lighting infrastructure. In some embodiments, the first lighting node may be coupled to an accelerometer configured to detect displacement of a lid of the waste container. In some embodiments, the received data may indicate an identifier of a tracked object received by one of the plurality of lighting nodes, and wherein identifying the useful data by analyzing the received data using predefined data related to the lighting infrastructure may include identifying a location of the tracked object based on predefined location information of the one of the plurality of lighting nodes within the predefined data related to the lighting infrastructure and a signal strength. In some embodiments, the received data may include at least one of temperature sensor data and gas sensor data, and wherein identifying the useful data by analyzing the received data using predefined data related to the lighting infrastructure may include identifying a dangerous area within the lighting infrastructure based on the at least one of the temperature sensor data and the gas sensor data exceeding a predefined safety threshold, and generating directions for the mobile device user to avoid the dangerous area within the lighting infrastructure. In some embodiments, such identifying may include various operations for processing/analyzing/evaluating the received data, such as processing, by the processor of the computing device, the received data by at least one of analyzing or aggregating the received data, detecting, by the processor of the computing device, an occurrence of at least one of a plurality of predefined events based on the processing of the received data, identifying, by the processor of the computing device, a trend within the received data based on the processing of the received data, and predicting, by the processor of the computing device, a future occurrence of at least one of the plurality of predefined events based on the processing of the received data.

An embodiment system may include a service platform computing device configured with a first processor to support an application framework associated with a plurality of applications based on communications received via a wide area network, a plurality of lighting nodes within a lighting infrastructure, wherein each of the plurality of lighting nodes may include a lighting node processor configured with processor-executable instructions for performing operations for wirelessly exchanging information within a local area network that may be connected to the wide area network, and a mobile device of a user registered with the service platform computing device, the mobile device may include at least a mobile device processor configured with processor-executable instructions for performing operations for executing at least one of the plurality of applications and communicating with the service platform computing device via the wide area network, wherein the service platform computing device processor may be configured with processor-executable instructions for performing operations that may include receiving data reported by the plurality of lighting nodes, wherein the data may include sensor data, identifying useful data related to one of the plurality of applications by analyzing the received data using predefined data related to the lighting infrastructure, storing the identified useful data over time in one or more databases, and transmitting the identified useful data to the mobile device of a user registered with the service platform via the wide area network. In some embodiments, the service platform computing device may be configured to support an application programming interface for exchanging data related to the one or more databases. In some embodiments, the one or more databases store at least one of control settings related to the plurality of lighting nodes, location information of the plurality of lighting nodes, identifiers of the plurality of lighting nodes, and tracking data for tracked objects. In some embodiments, each of the plurality of lighting nodes may be coupled to one or more sensors configured to obtain sensor data for reporting to the service platform computing device. In some embodiments, the one or more sensors may include at least one of a magnetometer to measure a proximity of a large metal object, a photo sensor to monitor light levels and to detect object shadows, a radio, an accelerometer to measure a position of the lighting node, a current sensor to measure electrical power consumption, a gas sensor, a temperature sensor, a humidity sensor, an air pressure sensor, a motion detector, an occupancy sensor, and an intrusion detector. In some embodiments, each lighting node of the plurality of lighting nodes may include at least one of an electrical switch to enable or disable a light source, an AC/DC mechanism to change a dimming state of the light source, a color control mechanism to adjust a color setting of the light source, an HVAC control mechanism for controlling temperature settings or fan settings related to an HVAC unit, an indicator LED, a lock control mechanism, and a battery. In some embodiments, the at least one mobile device may be further configured to automatically transmit data to the service platform computing device that indicates a presence of the mobile device within the lighting infrastructure, and the service platform computing device may be configured to adjust one or more parameters associated with the plurality of lighting nodes based on the indicated presence of the mobile device. In some embodiments, the useful data the service platform computing device may be configured to transmit to the mobile device may include at least one of a location of a tracked device, a coupon, historical sensor data, real-time sensor data, aggregated data based on user requests, and parking space availability data. In some embodiments, the presence of the mobile device within the lighting infrastructure may be based on a beacon signal transmitted by one or more of the plurality of lighting nodes and received at the mobile device. In some embodiments, each of the plurality of lighting nodes may be configured to exchange data within the local area network via signals using a Bluetooth® Low Energy communication protocol or a Wi-Fi® communication protocol. In some embodiments, the signals may be configured to be transmitted at varied signal strengths based on commands from the service platform computing device. In some embodiments, each of the plurality of lighting nodes may be attached to an AC power source and configured to transmit data at a high repetition rate and high transmit power. In some embodiments, each lighting node of the plurality of lighting nodes may be configured to transmit beacon signals for reception by the mobile device when the mobile device may be within the lighting infrastructure. In some embodiments, each lighting node in the plurality of lighting nodes may be configured to transmit data with traffic-dependent frequency, wherein the traffic-dependent frequency may be based on occupancy sensor data indicating traffic in the lighting infrastructure, and the traffic-dependent frequency controls the time intervals between transmitting data by the plurality of lighting nodes. In some embodiments, the mobile device may be configured to determine a real-time location based on the data received from the plurality of lighting nodes. In some embodiments, the mobile device may be configured to transmit the determined real-time location to the service platform computing device, and wherein the service platform computing device may be configured to store the determined real-time location in the one or more databases. In some embodiments, each of the plurality of lighting nodes may be configured to control a coupled indicator to indicate whether an associated parking space may be available based on occupancy sensor data. In some embodiments, sensor data from the plurality of lighting nodes may be transmitted to the service platform computing device via a gateway device. In some embodiments, the service platform computing device may be configured to transmit control parameters to any of the plurality of lighting nodes via the wide area network.

In some embodiments, the service platform computing device may be configured with processor-executable instructions for performing operations such that transmitting the identified useful data to the mobile device may include transmitting the identified useful data to the mobile device in response to determining that sensor data from the plurality of lighting nodes exceeds a predefined threshold associated with the mobile device. In some embodiments, each of the plurality of lighting nodes may include one or more photovoltaic receptors configured to provide power in response to receiving light energy from a remote optical beam device, wherein the optical beam device may be fixed or scanning. In some embodiments, each of the plurality of lighting nodes may be configured to transmit a message to the optical beam device that indicates that a current power level may be below a threshold for the each of the plurality of lighting nodes and a signal strength used by the optical beam device to accurately point the optical beam. In some embodiments, the optical beam may be a laser and the one or more photovoltaic receptors may be a photocell. In some embodiments, each in the plurality of lighting nodes may include a battery configured to power the node during a wired-power failure, wherein the wired-power failure may include a loss of power from an AC/DC power source connected to each lighting node of the plurality of lighting nodes. In some embodiments, the mobile device may be configured to receive and transmit to the service platform computing device a user input, and wherein the service platform computing device may be configured to transmit messages to the plurality of lighting nodes in response to the user input. In some embodiments, the user input indicates one of the plurality of lighting nodes may not be functioning properly. In some embodiments, the plurality of lighting nodes may be configured to enter a sleep mode based on data from an occupancy sensor. In some embodiments, the plurality of lighting nodes may be configured to enter a sleep mode periodically. In some embodiments, the service platform computing device may be further configured to transmit messages via the wide area network that control a building management service (BMS) device associated with the lighting infrastructure, wherein the building management service device may be configured to perform operations for managing at least one of a heating system, a ventilation system, and an air conditioning system within the lighting infrastructure. In some embodiments, each of the plurality of lighting nodes may be configured to use sensor data from a coupled proximity sensor to monitor whether vehicles may be close to hitting obstacles within the lighting infrastructure. In some embodiments, each of the plurality of lighting nodes may be configured to transmit messages based on the monitoring, and wherein the mobile device may be configured to receive the transmitted messages based on the monitoring. In some embodiments, the service platform computing device may be configured to store data indicating whether users opt in to various services so that privacy is not compromised.

An example method for a computing device of a lighting node within a lighting infrastructure associated with an interactive light sensor network to provide data for use by a mobile device may include one or more of the following operations: obtaining, by a processor of the computing device, sensor data from one or more sensors coupled to the lighting node, transmitting, by the processor of the computing device, the obtained sensor data within a field in a broadcast message, advertising, by the processor of the computing device, an availability to be wirelessly connected to a neighboring node within the lighting infrastructure, establishing, by the processor of the computing device, a wireless connection with the neighboring node based on one of the advertised availability or a received connection request, receiving, by the processor of the computing device, a software download from the neighboring node via the established wireless connection, and performing one or more of the following based on the obtained sensor data: transmitting, by the processor of the computing device, the obtained sensor data to the neighboring node via the established wireless connection, changing, by the processor of the computing device, control settings of one or more of the sensors in response to the obtained sensor data, and changing, by the processor of the computing device, the control settings of the one or more of the sensors in response to receiving a broadcast request from the neighboring node.

In some embodiments, a processor of a lighting node may be configured to perform various operations in a time-shared manner, such as operations for measuring and reporting sensor data from coupled sensors by transmitting the sensor data to a gateway that is logically connected to a service platform, transmitting beacon signals that may be used by receiving devices (e.g., mobile devices) within the lighting infrastructure for locationing, transmitting beacon signals that may be used by the receiving devices to receive other messages (e.g., coupons, control values or settings, etc., from a service platform computing device, etc.), scanning for beacon signals transmitted by other devices within the lighting infrastructure, tracking devices transmitting beacon signals, making wireless connections to a remote devices to download data/software to be loaded onto the lighting node and/or the remote device, and relaying messages from one or more neighboring wireless nodes within the lighting infrastructure with filtering to avoid repeating the messages.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art, the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the," is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present inventive subject matter is not intended to be limited to the embodiments shown herein but is to be accorded the widest scope consistent with the following claims and the principles and novel features disclosed herein.

What is claimed is:

1. A method of providing navigation instructions to a mobile device, comprising:
    receiving data indicating a destination location inside a geofence, the geofence having a boundary around multiple private beacon nodes and their associated beacon communications ranges, the multiple private beacon nodes being associated with a light sensor network;
    enabling a beacon transceiver of the mobile device to receive beacon signals;
    providing, to a mobile device located outside the geofence, the navigation instructions to the boundary of the geofence based on at least one of global positioning system (GPS) signals and beacon signals received by the mobile device from at least one public beacon device within a beacon communications range of the mobile device located outside the geofence; and
    providing, to a mobile device located inside the geofence, the navigation instructions to the destination location based on the beacon signals received by the mobile device from at least one private beacon node within the beacon communications range of the mobile device located inside the geofence and a virtual map including an area within the geofence.

2. The method of claim 1, wherein providing, to the mobile device located inside the geofence, the navigation instructions to the destination location further comprises:
    providing the navigation instructions to an unoccupied parking space for the destination location.

3. The method of claim 2, wherein providing the navigation instructions to the unoccupied parking space for the destination location further comprises:
    determining a location of the unoccupied parking space based at least one of time and distance from a current position of the mobile device.

4. The method of claim 2, further comprising:
    determining the mobile device has reached the destination location; and
    disabling the beacon transceiver of the mobile device from receiving beacon signals.

5. The method of claim 1, further comprising:
    downloading the virtual map from a software application platform, the virtual map including at least one of virtual lanes, lane directions, entry and exit points, and parking spaces for the area within the geofence.

6. The method of claim 1,
    wherein providing, to the mobile device located outside the geofence, the navigation instructions to the boundary of the geofence further comprises presenting, on a user interface of the mobile device, the navigation instructions using an interactive mobile application; and wherein providing, to the mobile device located within the geofence, the navigation instructions to the destination location further comprises presenting, on the user interface of the mobile device, the navigation instructions using the interactive mobile application.

7. The method of claim 1, wherein at least one of the private beacon nodes represents a lighting node or a sensor controller node within the light sensor network.

8. The method of claim 1, wherein each of the private beacon nodes includes a beacon transceiver.

9. The method of claim 1, further comprising:
estimating a distance between the mobile device within the geofence and each of the private beacon nodes within the beacon communications range of the mobile device based on a received signal strength indicator (RSSI) of the received beacon signals.

10. The method of claim 9, further comprising:
estimating a location of the mobile device within the geofence based on the estimated distance between the mobile device and each of the private beacon nodes that transmits one of the beacon signals received by the mobile device and location information of each of the private beacon nodes that transmits one of the beacon signals received by the mobile device.

11. The method of claim 10, wherein estimating the location of the mobile device within the geofence is based on a multilateration technique.

12. The method of claim 11, wherein the multilateration technique applies a least-square method.

13. The method of claim 10, further comprising:
recalculating the estimated location of the mobile device within the geofence based on the beacon signals received by the mobile device as the mobile device is traveling.

14. The method of claim 1, wherein the virtual map is based on beacon data and provisioning data.

15. The method of claim 9, wherein estimating a distance between the mobile device within the geofence and each of the private beacon nodes within the beacon communications range of the mobile device further comprises:
determining the RSSI of the received beacon signals exceeds a threshold.

16. The method of claim 10, wherein estimating a location of the mobile device within the geofence further comprises:
determining there is a sufficient number of the received beacon signals to estimate the location of the mobile device within the geofence.

17. A method of providing navigation instructions to a mobile device, comprising:
receiving data indicating a destination location inside a geofence, the geofence having a boundary around multiple private beacon nodes and their associated beacon communications ranges, the multiple private beacon nodes being associated with a light sensor network;
enabling a beacon transceiver of the mobile device to receive beacon signals;
providing, to a mobile device located outside the geofence, the navigation instructions to the boundary of the geofence based on at least one of global positioning system (GPS) signals and beacon signals received by the mobile device from at least one public beacon device within a beacon communications range of the mobile device located outside the geofence; and
providing, to a mobile device located inside the geofence, the navigation instructions to the destination location based on the beacon signals received by the mobile device from at least one private beacon node within the beacon communications range of the mobile device located inside the geofence and beacon location information associated with the multiple private beacon nodes.

18. The method of claim 17, further comprising:
downloading the beacon location information associated with the multiple private beacon devices from an application software platform.

19. A method of tracking an object that includes a beacon transmitter, comprising:
providing, to a computing device, tracking information of the object outside a geofence based on at least one of global positioning system (GPS) signals and beacon signals transmitted by the object, the beacon signals including a first beacon signal transmitted at a first time and a second beacon signal transmitted at a second time, wherein the first beacon signal is transmitted by the object located outside the geofence and received by at least one public beacon device within a beacon communications range of the object; and
providing, to the computing device, the tracking information of the object inside the geofence based on the beacon signals transmitted by the object and a virtual map including an area within the geofence, wherein the second beacon signal is received by at least one private beacon node within the beacon communications range of the object.

20. The method of claim 19, wherein providing, to the computing device, the tracking information inside the geofence further comprises:
providing the tracking information for presentation on a user interface of the computing device by displaying a location based on the second beacon signal of the object tracked relative to the virtual map.

* * * * *